US008751971B2

(12) United States Patent
Fleizach

(10) Patent No.: US 8,751,971 B2
(45) Date of Patent: Jun. 10, 2014

(54) DEVICES, METHODS, AND GRAPHICAL USER INTERFACES FOR PROVIDING ACCESSIBILITY USING A TOUCH-SENSITIVE SURFACE

(75) Inventor: Christopher Brian Fleizach, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 13/221,833

(22) Filed: Aug. 30, 2011

(65) Prior Publication Data
US 2012/0311508 A1 Dec. 6, 2012

Related U.S. Application Data

(60) Provisional application No. 61/493,515, filed on Jun. 5, 2011.

(51) Int. Cl.
*G06F 3/033* (2013.01)
*G06F 3/048* (2013.01)
*G06F 3/0488* (2013.01)
*G06F 3/01* (2006.01)
*G06F 3/0482* (2013.01)

(52) U.S. Cl.
CPC .......... *G06F 3/04883* (2013.01); *G06F 3/017* (2013.01); *G06F 3/0482* (2013.01)
USPC ........................... 715/863; 715/810; 715/817

(58) Field of Classification Search
CPC .... G06F 3/04883; G06F 3/017; G06F 3/0482
USPC .......................................... 715/863, 810, 817
See application file for complete search history.

(56) References Cited

U.S. PATENT DOCUMENTS 4,746,770 A 5/1988 McAvinney
5,053,758 A 10/1991 Cornett et al.
(Continued)

FOREIGN PATENT DOCUMENTS

DE 43 40 679 6/1995
EP 0 776 097 A2 11/1996
(Continued)

OTHER PUBLICATIONS

American Thermoform Corp., "Touch Screen, Talking Tactile Tablet," downloaded Jul. 30, 2008, http://www.americanthermoform.com/tactiletablet.htm, 2 pages.
(Continued)

*Primary Examiner* — David Phantana Angkool
(74) *Attorney, Agent, or Firm* — Morrison & Foerster LLP

(57) ABSTRACT

An electronic device presents a first user interface element of a first type and a second user interface element of a second type. In a sighted mode, the device detects a first interaction with the first user interface element, and performs an operation in accordance with sighted-mode gesture responses for the first user interface element. The device detects a second interaction with the second user interface element, and performs an operation in accordance with sighted-mode gesture responses for the second user interface element. In an accessible mode, the device detects a third interaction with the first user interface element, and performs an operation in accordance with accessible-mode gesture responses for the first user interface element. The device detects a series of interactions with the second user interface element; and, for each interaction, performs an operation in accordance with the sighted-mode gesture responses for the second user interface element.

33 Claims, 34 Drawing Sheets

(56) References Cited

U.S. PATENT DOCUMENTS

| | | | |
|---|---|---|---|
| 5,119,079 A | 6/1992 | Hube et al. | |
| 5,327,528 A | 7/1994 | Hidaka et al. | |
| 5,488,204 A * | 1/1996 | Mead et al. | 178/18.06 |
| 5,502,803 A | 3/1996 | Yoshida et al. | |
| 5,761,485 A | 6/1998 | Munyan | |
| 5,832,528 A | 11/1998 | Kwatinetz et al. | |
| 5,943,043 A | 8/1999 | Furuhata et al. | |
| 6,046,722 A | 4/2000 | McKiel, Jr. | |
| 6,073,036 A | 6/2000 | Heikkinen et al. | |
| 6,088,023 A | 7/2000 | Louis et al. | |
| 6,115,482 A | 9/2000 | Sears et al. | |
| 6,128,007 A | 10/2000 | Seybold | |
| 6,211,856 B1 | 4/2001 | Choi et al. | |
| 6,246,983 B1 | 6/2001 | Zou et al. | |
| 6,384,743 B1 | 5/2002 | Vanderheiden | |
| 6,396,523 B1 | 5/2002 | Segal et al. | |
| 6,442,523 B1 | 8/2002 | Siegel | |
| 6,446,041 B1 | 9/2002 | Reynar et al. | |
| 6,466,203 B2 | 10/2002 | Van Ee | |
| 6,489,951 B1 | 12/2002 | Wong et al. | |
| 6,664,989 B1 | 12/2003 | Snyder et al. | |
| 6,765,557 B1 | 7/2004 | Segal et al. | |
| 6,926,609 B2 | 8/2005 | Martin | |
| 7,020,841 B2 * | 3/2006 | Dantzig et al. | 715/727 |
| 7,062,437 B2 | 6/2006 | Kovales et al. | |
| 7,098,896 B2 | 8/2006 | Kushler et al. | |
| 7,187,394 B2 | 3/2007 | Chandane | |
| 7,250,938 B2 | 7/2007 | Kirkland et al. | |
| 7,376,523 B2 | 5/2008 | Sullivan et al. | |
| 7,408,538 B2 | 8/2008 | Hinckley et al. | |
| 7,479,949 B2 | 1/2009 | Jobs et al. | |
| 7,603,621 B2 * | 10/2009 | Toyama et al. | 715/707 |
| 7,614,008 B2 * | 11/2009 | Ording | 715/773 |
| 7,637,421 B1 | 12/2009 | Trocme | |
| 7,886,229 B2 * | 2/2011 | Pachet | 715/726 |
| 7,944,437 B2 | 5/2011 | Imamura | |
| 8,059,101 B2 | 11/2011 | Westerman et al. | |
| 8,103,554 B2 | 1/2012 | Tom | |
| 8,237,666 B2 | 8/2012 | Soo et al. | |
| 8,411,590 B2 | 4/2013 | Wang | |
| 8,448,083 B1 | 5/2013 | Migos et al. | |
| 8,448,095 B1 * | 5/2013 | Haussila et al. | 715/863 |
| 8,452,600 B2 * | 5/2013 | Fleizach | 704/260 |
| 8,466,873 B2 * | 6/2013 | Vertegaal et al. | 345/156 |
| 8,493,344 B2 * | 7/2013 | Fleizach et al. | 345/173 |
| 2002/0046195 A1 | 4/2002 | Martin et al. | |
| 2002/0120455 A1 | 8/2002 | Nakara | |
| 2002/0133350 A1 | 9/2002 | Cogliano | |
| 2003/0020754 A1 | 1/2003 | Berman | |
| 2003/0046082 A1 | 3/2003 | Siegel | |
| 2004/0263491 A1 | 12/2004 | Ishigki | |
| 2005/0134578 A1 | 6/2005 | Chambers et al. | |
| 2005/0216867 A1 | 9/2005 | Marvit et al. | |
| 2006/0119588 A1 | 6/2006 | Yoon et al. | |
| 2006/0230340 A1 | 10/2006 | Parsons et al. | |
| 2006/0242607 A1 | 10/2006 | Hudson | |
| 2007/0011011 A1 | 1/2007 | Cogliano | |
| 2007/0033543 A1 | 2/2007 | Ngari et al. | |
| 2007/0220444 A1 * | 9/2007 | Sunday et al. | 715/788 |
| 2007/0230748 A1 | 10/2007 | Foss | |
| 2007/0236475 A1 | 10/2007 | Wherry | |
| 2007/0262964 A1 | 11/2007 | Zotov et al. | |
| 2007/0268270 A1 | 11/2007 | Onodera et al. | |
| 2007/0268317 A1 | 11/2007 | Banay | |
| 2008/0027726 A1 | 1/2008 | Hansen et al. | |
| 2008/0114566 A1 | 5/2008 | Slotznick et al. | |
| 2008/0122796 A1 | 5/2008 | Jobs et al. | |
| 2008/0126937 A1 * | 5/2008 | Pachet | 715/720 |
| 2008/0140413 A1 | 6/2008 | Millman et al. | |
| 2008/0165141 A1 | 7/2008 | Christie | |
| 2008/0300874 A1 | 12/2008 | Gavalda et al. | |
| 2008/0316183 A1 | 12/2008 | Westerman et al. | |
| 2009/0222770 A1 | 9/2009 | Chang | |
| 2009/0235203 A1 | 9/2009 | Iizuka | |
| 2009/0303187 A1 | 12/2009 | Pallakoff | |
| 2009/0313020 A1 | 12/2009 | Koivunen | |
| 2010/0001953 A1 | 1/2010 | Yamamoto et al. | |
| 2010/0063880 A1 | 3/2010 | Atsmon et al. | |
| 2010/0070281 A1 | 3/2010 | Conkie et al. | |
| 2010/0231541 A1 | 9/2010 | Cruz-Hernandez et al. | |
| 2010/0283742 A1 | 11/2010 | Lam | |
| 2010/0289757 A1 | 11/2010 | Budelli | |
| 2010/0306718 A1 | 12/2010 | Shim et al. | |
| 2010/0309147 A1 | 12/2010 | Fleizach et al. | |
| 2010/0309148 A1 | 12/2010 | Fleizach et al. | |
| 2010/0313125 A1 | 12/2010 | Fleizach et al. | |
| 2010/0324903 A1 | 12/2010 | Kurzweil et al. | |
| 2011/0050594 A1 | 3/2011 | Kim et al. | |
| 2011/0083104 A1 | 4/2011 | Minton | |
| 2011/0157028 A1 | 6/2011 | Stallings et al. | |
| 2011/0264452 A1 | 10/2011 | Venkataramu et al. | |
| 2011/0298723 A1 | 12/2011 | Fleizach et al. | |
| 2011/0302519 A1 | 12/2011 | Fleizach et al. | |
| 2011/0310026 A1 | 12/2011 | Davis et al. | |
| 2013/0191910 A1 * | 7/2013 | Dellinger et al. | 726/19 |
| 2013/0191911 A1 * | 7/2013 | Dellinger et al. | 726/19 |

FOREIGN PATENT DOCUMENTS

| | | |
|---|---|---|
| EP | 1 942 398 A1 | 7/2008 |
| JP | 63 271516 | 11/1988 |
| JP | 01 283621 | 11/1989 |
| JP | 02 244214 | 9/1990 |
| JP | 7 321889 | 12/1995 |
| JP | 09 190436 | 7/1997 |
| JP | 2001 147775 | 5/2001 |
| JP | 2003 316254 | 11/2003 |
| JP | 2004 151614 | 5/2004 |
| JP | 2005 010894 | 1/2005 |
| JP | 2006 501567 | 1/2006 |
| JP | 2006 134090 | 5/2006 |
| JP | 2007 095024 | 4/2007 |
| JP | 2008 508600 | 3/2008 |
| JP | 2009 093291 | 4/2009 |
| WO | WO 92/08183 | 5/1992 |

OTHER PUBLICATIONS

Apple.com, "VoiceOver," May 2009, http://www.apple.com/accessibility/vocieover, 5 pages.

Apple Inc., "iPad User Guide," Apple Inc., © 2010, 154 pages.

Appshopper, "GDial Free—Speed Dial with Gesture," appshopper.com, Mar. 25, 2009, http://appshopper.com/utilities/gdial-free-speed-dial-with-gesture, 2 pages.

CNET, "Sony Ericsson W910," posts, the earnest of which is Oct. 17, 2007, 4 pages, http://news.cnet.com/crave/?keyword=Sony+Ericsson+W910.

Esther, "GarageBand," AppleVis, Mar. 11, 2011, http://www.applevis.com/app-directory/music/garageband, 4 pages.

Immersion, "Haptics: Improving the Mobile User Experience through Touch," Immersion Corporation White Paper, © 2007 Immersion Corporation, 12 pages, http://www.immersion.com/docs/haptics_mobile-ue_nov07v1.pdf.

Jaques, R., "HP unveils Pocket PC for blind users," vnunet.com, Jul. 5, 2004, http://www.vnunet.com/vnunet/news/2125404/hp-unveils-pocket-pc-blind-users, 3 pages.

Joe, "Gesture commander-Amazing feature exclusive to Dolphin Browser," dolphin-browser.com, Jul. 27, 2010, http://dolphin-browser.com/2010/07/amazing-feature-exclusive-to-dolphin-browser-gesture-commander/, 3 pages.

Kane et al., "Slide Rule: Making Mobile Touch Screens Accessible to Blind People Using Multi-Touch Interaction Techniques," Proceedings of ACM SIGACCESS Conference on Computers and Accessibility, Halifax, Nova Scotia, Canada, Oct. 2008, 8 pages.

Kendrick, D., "The Touch That Means So Much; Training Materials for Computer Users Who Are Deaf-Blind," AFB AccessWorld, Mar. 2005, vol. 6, No. 2, http://www.afb.org/afbpress/pub.asp?DocID=aw060207, 9 pages.

(56) References Cited

OTHER PUBLICATIONS

Microsoft, "Pocket PC Device for Blind Users Debuts during National Disability Employment Awareness Month," Microsoft.com PressPass, Oct. 16, 2002, http://www.microsoft.com/presspass/features/2002/oct02/10-16ndeam.mspx, 4 pages.
Okada et al., "CounterVision: A Screen Reader with Multi-Access Interface for GUI," Proceedings of Technology and Persons With Disabilities Conference, Center on Disabilities, CSU Northridge, Mar. 1997, http://www.csun.edu/cod/conf/1997/proceedings/090.htm, 6 pages.
Raman, T., "Eyes-Free User Interaction," Google Research, Feb. 9, 2009, http://emacspeak.sf.net/raman, 25 pages.
Tiresias.org, "Touchscreens," tiresias.org, Jul. 15, 2008, http://www.tiresias.org/research/guidelines/touch/htm.
Touch Usability, "Mobile," Mar. 12, 2009, http://www.touchusability.com/mobile/, 9 pages.
Vanderheiden, G., "Use of audio-haptic interface techniques to allow nonvisual access to touchscreen appliances," September, Oct. 1995, http://trace.wisc.edu/docs/touchscreen/chi_conf.htm, 9 pages.
U.S. Appl. No. 10/826,878, filed Apr. 16 2004, 61 pages (Migos).
U.S. Appl. No. 10/956,720, filed Oct. 1, 2004, 75 pages (Seymour).
U.S. Appl. No. 11/298,977, filed Dec. 9, 2005, 33 pages (Seymour).
U.S. Appl. No. 11/643,257, filed Dec. 20, 2006, 44 pages (Seymour).
U.S. Appl. No. 11/643,389, filed Dec. 20, 2006, 43 pages (Seymour).
U.S. Appl. No. 11/686,295, filed Mar. 14, 2007, 40 pages (Seymour).
International Search Report and Written Opinion dated Jun. 22, 2011, received in International Application No. PCT/US2010/034109, which corresponds to U.S. Appl. No. 12/565,744, 17 pages (Fleizach).
Office Action dated May 25, 2012, received in U.S. Appl. No. 12/565,744, 16 pages (Fleizach).
Office Action dated Jul. 12, 2012, received in U.S. Appl. No. 12/565,745, 8 pages (Fleizach).
Office Action dated Dec. 21, 2011, received in U.S. Appl. No. 12/795,633, 9 pages (Fleizach).
European Search Report and Written Opinion dated Jun. 29, 2012, received in European Patent Application No. 12154613.9, which corresponds to U.S. Appl. No. 12/565,744, 6 pages (Fleizach).
International Search Report and Written Opinion dated Aug. 30, 2012, received in International Application No. PCT/US2012/040703, which corresponds to U.S. Appl. No. 13/172,479, 11 pages (Fleizach).
Office Action dated Aug. 30, 2012, received in U.S. Appl. No. 12/795,633, 13 pages (Fleizach).
Invitation to Pay Additional Fees dated Jul. 22, 2013, received in International Patent Application No. PCT/US2013/033589, which corresponds to U.S. Appl. No. 13/710,385, 6 pages (Fleizach).
Office Action dated Mar. 26, 2013, received in Australian Patent Application No. 2012200071, which corresponds to U.S. Appl. No. 13/710,385, 4 pages (Fleizach).
Notice of Acceptance dated Jun. 19, 2013, received in Australian Patent Application No. 2012200071, which corresponds to U.S. Appl. No. 12/565,744, 2 pages (Fleizach).
Office Action dated Apr. 10, 2013, received in Australian Patent Application No. 2012200073, which corresponds to U.S. Appl. No. 12/565,744, 4 pages (Fleizach).
Office Action dated May 31, 2013, received in Japanese Patent Application No. 2012 513959, which corresponds to U.S. Appl. No. 12/565,744, 3 pages (Fleizach).
Office Action dated May 7, 2013, received in European Patent Application No. 12 154 613.9, which corresponds to U.S. Appl. No. 12/565,744 6 pages (Fleizach).
Office Acton dated May 31, 2013, received in Japanese Patent Application No. 2012-024483, which corresponds to U.S. Appl. No. 12/565,744, 2 pages (Fleizach).
Office Action dated May 27, 2013, received in Japanese Patent Application No. 2012 024484, which corresponds to U.S. Appl. No. 12/565,744, 5 pages (Fleizach).
Office Action dated May 7, 2013, received in Korean Patent Application No. 10-2012-7000663 which corresponds to U.S. Appl. No. 12/565,744, 1 page (Fleizach).
Notice of Allowance dated Mar. 15, 2013, received in U.S. Appl. No. 12/565,745, 7 pages (Fleizach).
Office Action dated Jul. 19, 2013. received in U.S. Appl. No. 12/555,746, 22 pages (Fleizasch).
Office Action dated Apr. 25, 2013, received in U.S. Appl. No, 12/795,633, 14 pages, (Fleizach)
Office Action dated Mar. 7, 2013; received in U.S. Appl. No. 12/795,635, 50 pages (Fleizach).
Office Action dated Jul. 25, 2013, received in U.S. Appl. No. 12/795,635, 46 pages (Fleizach).
Notice of Allowance dated Feb. 11, 2013, received in U.S. Appl. No. 12/859,158, 14 pages (Fleizach).
Office Action dated Feb. 13, 2013, received in Australian Patent Application No. 2010259191, which corresponds to U.S. Appl. No. 12/565,744, 3 pages (Fleizach).
Frantz et al., "Design case history: Speak & Spell learns to talk," IEEE Spectrum, Feb. 1982, 5 pages.
Law et al., "Ez Access Strategies for Cross-Disability Access to Kiosks, Telephones and VCRs," DINF (Disability Information Resources), Feb. 16, 1998, http://www.dinf.ne.jp/doc/english/US_Eu/conf/csun_98/csun98_074.html, 6 pages.
Vanderheiden, G., "Universal Design and Assistive Technology in Communication and Information Technologies: Alternatives or Complements?" Assistive Technology: The Official Journal of RESNA, 1998, vol. 10, No. 1, 9 pages.
Vintage, "TSI Speech + & other speaking calculators," Vintage Calculators Web Museum, retrieved from the internet May 4, 2012, http://www.vintagecalculators.com/html/speech_.html, 6 pages.
Extended Search Report dated Sep. 27, 2012, received in European Patent Application No. 12154609.7, which corresponds to U.S. Appl. No. 12/565,744, 7 pages (Fleizach).
Final Office Action dated Dec. 6, 2012, received in U.S. Appl. No. 12/565,744, 18 pages (Fleizach).
Office Action dated Nov. 20, 2012, received in European Patent Application No. 10719502.6, which corresponds to U.S. Appl. No. 12/565,744, 5 pages (Fleizach).
Notice of Allowance dated Nov. 26, 2012, received in U.S. Appl. No. 12/565,745, 9 pages (Fleizach).
International Search Report and Written Opinion dated Sep. 25, 2013, received in International Patent Application No. PCT/US2013/033589, which corresponds to U.S. Appl. No. 13/710,385, 20 pages (Fleizach).
Office Action dated Dec. 3, 2013, received in U.S. Appl. No. 12/565,744, 20 pages (Fleizach).
Notice of Acceptance dated Jul. 8, 2013, received in Australian Patent Application No. 2012200073, which corresponds to U.S. Appl. No. 12/565,744, 2 pages (Fleizach).
Notice of Allowance dated Nov. 20, 2013, received in U.S. Appl. No. 12/795,633, 14 pages (Fleizach).

* cited by examiner

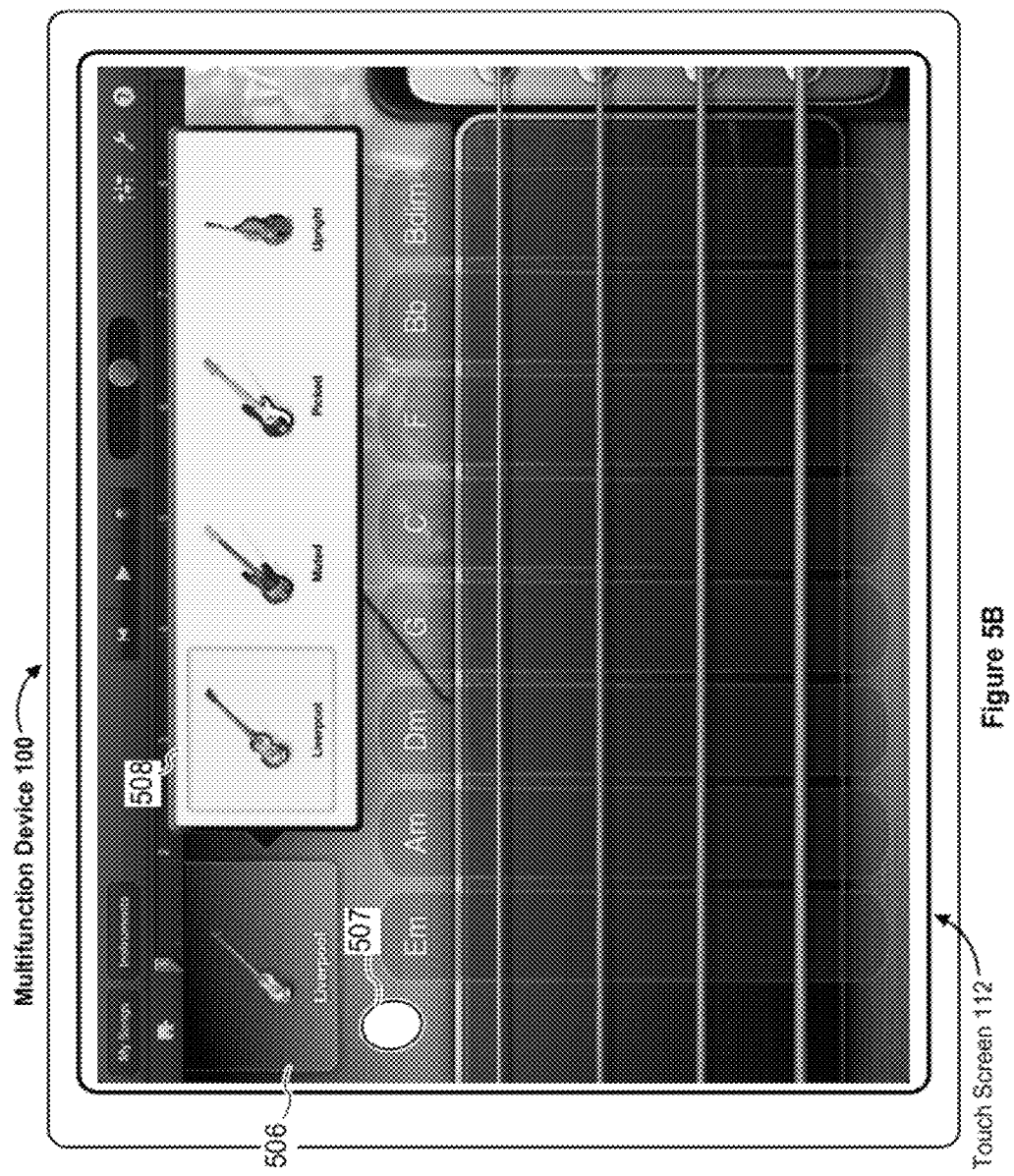

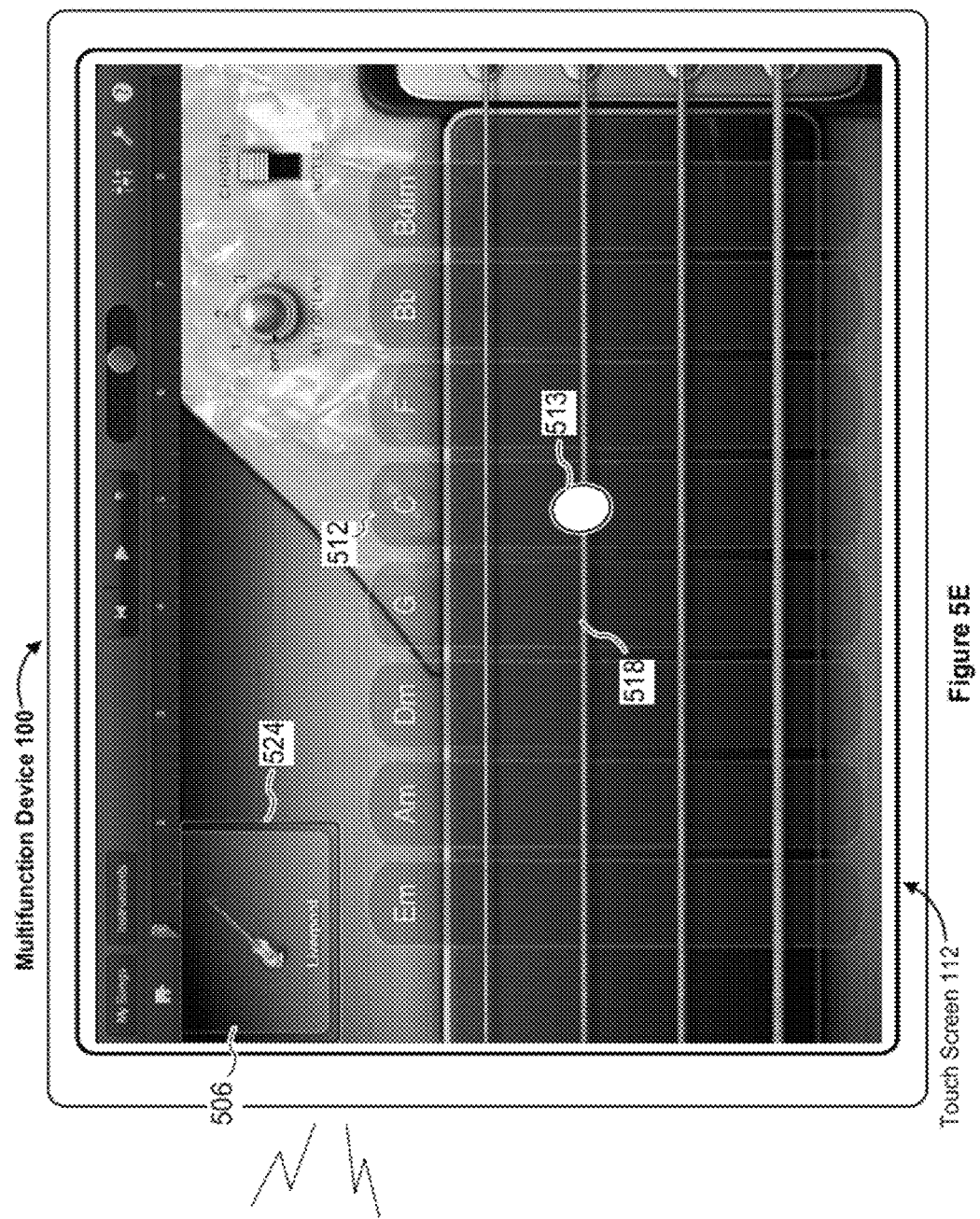

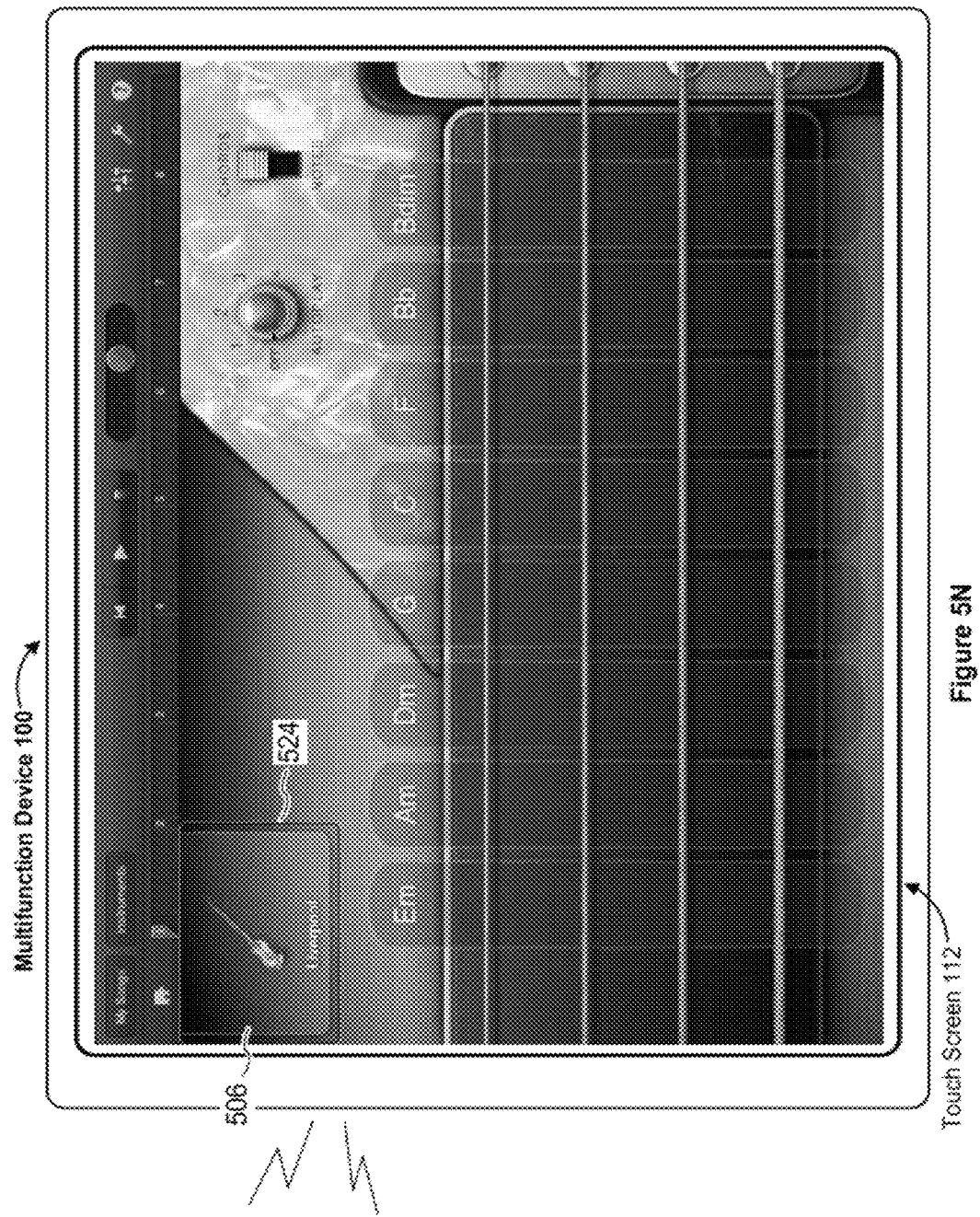

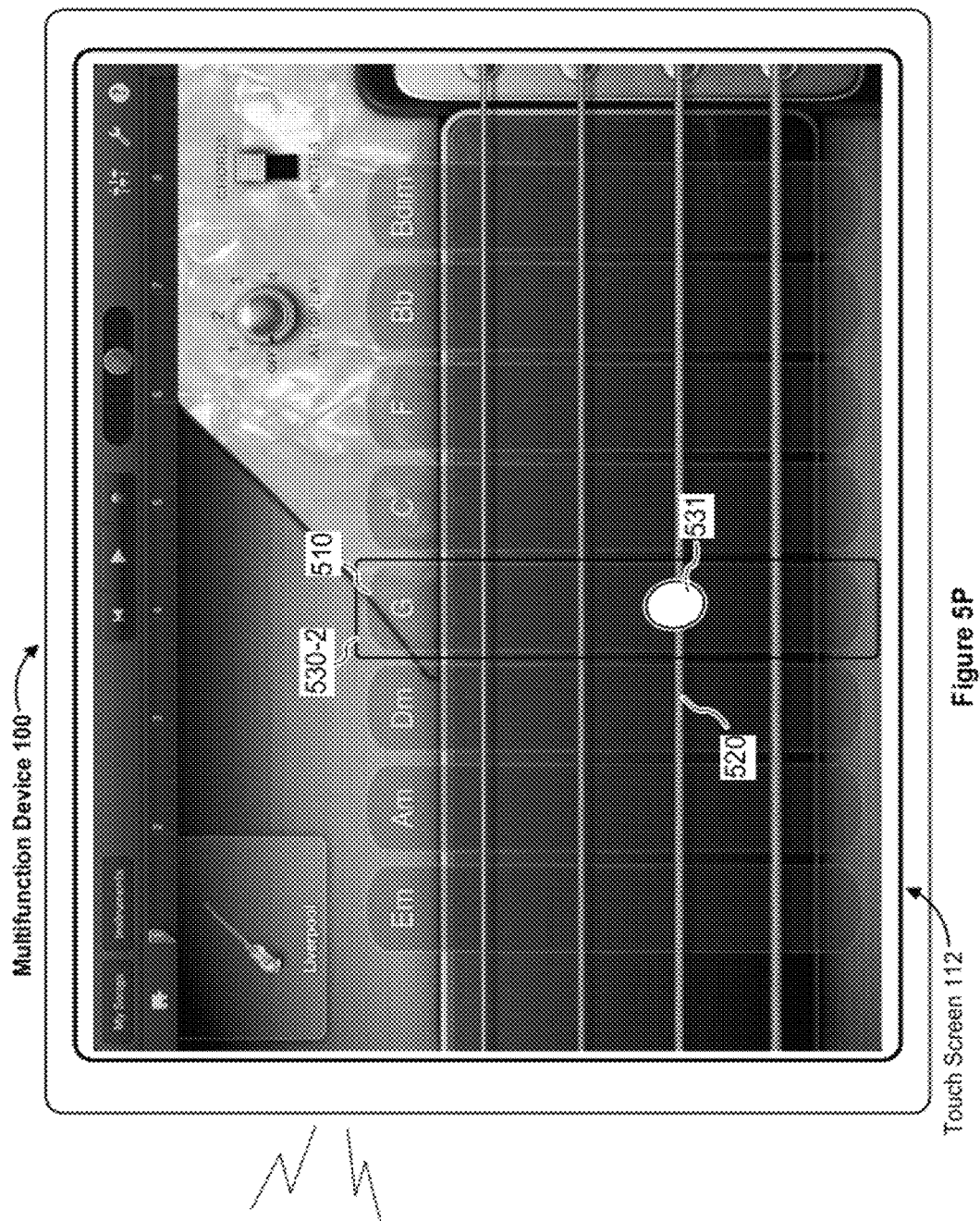

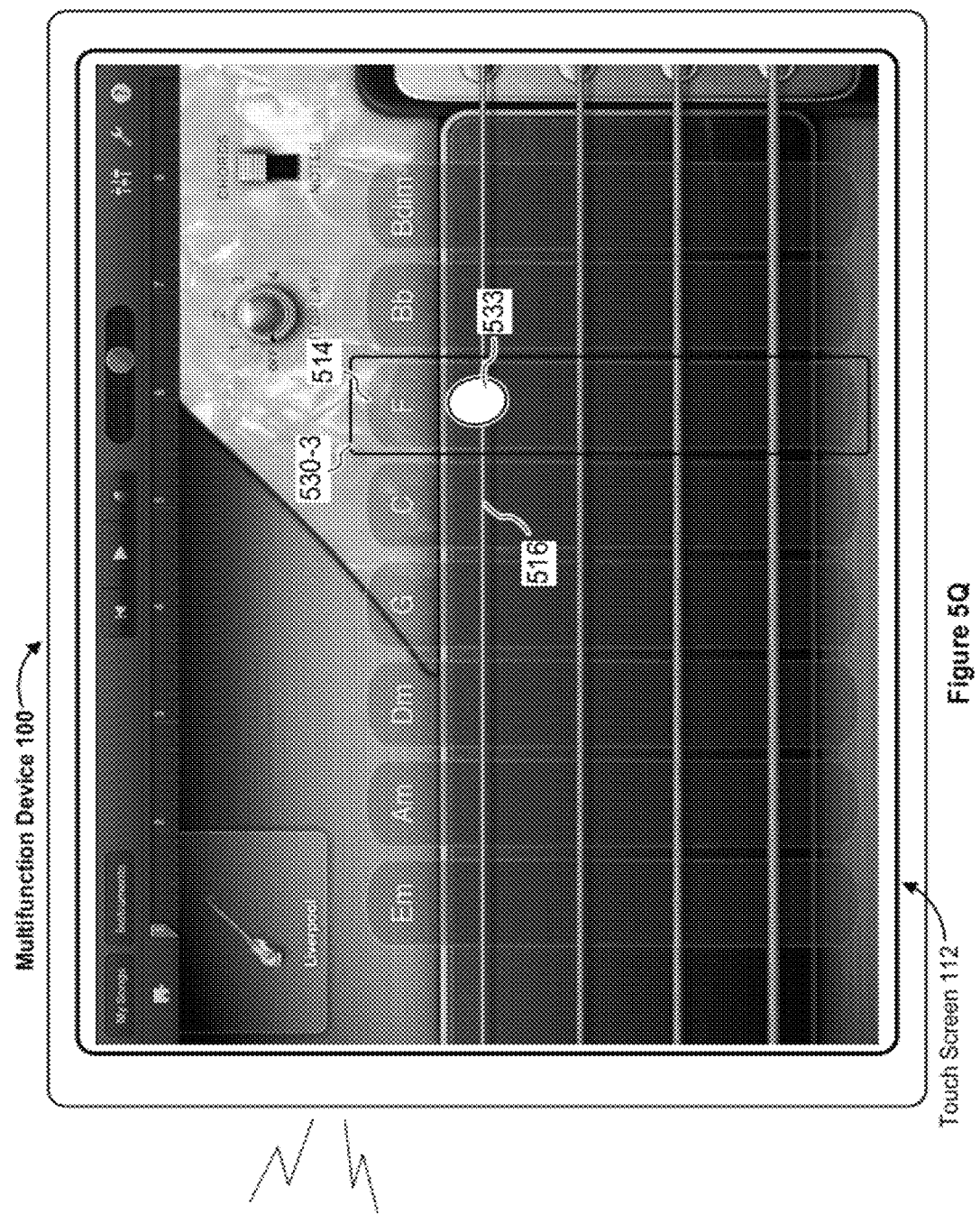

626 While the electronic device is operating in the first accessible mode, detect an input. In response to detecting the input, change from the first accessible mode to a second accessible mode distinct from the first accessible mode.

628 While the electronic device is operating in a second accessible mode distinct from the first accessible mode: detect a fourth interaction with the user interface element of the first accessible-response type. In response to detecting the fourth interaction with the user interface element of the first accessible-response type, perform an operation in accordance with a set of one or more second-accessible-mode gesture responses for the user interface element of the first accessible-response type. Detect a fifth interaction with the user interface element of the second accessible-response type. In response to detecting the fifth interaction with the user interface element of the second accessible-response type, perform an operation in accordance with a set of one or more second-accessible-mode gesture responses for the user interface element of the second accessible-response type.

630 The set of one or more second-accessible-mode gesture responses for the user interface element of the first accessible-response type is the same as the set of one or more first-accessible-mode gesture responses for the user interface element of the first accessible-response type

702 Present in an application one or more user interface elements of a first accessible-response type and one or more user interface elements of a second accessible-response type distinct from the first accessible-response type For a respective user interface element of the first accessible-response type:

704 When the electronic device is operating in a sighted mode, respond to detected interactions with the respective user interface element of the first accessible-response type by performing operations in accordance with a respective set of one or more sighted-mode gesture responses for the respective user interface element of the first accessible-response type

706 When the electronic device is operating in a first accessible mode, respond to detected interactions with the respective user interface element of the first accessible-response type by performing operations in accordance with a respective set of one or more first-accessible-mode gesture responses for the respective user interface element of the first accessible-response type

Figure 7A

702 Present in an application one or more user interface elements of a first accessible-response type and one or more user interface elements of a second accessible-response type distinct from the first accessible-response type

For a respective user interface element of the second accessible-response type:

708 When the electronic device is operating in the sighted mode, respond to detected interactions with the respective user interface element of the second accessible-response type by performing operations in accordance with a respective set of one or more sighted-mode gesture responses for the respective user interface element of the second accessible-response type 710 When the electronic device is operating in the first accessible mode, prior to detecting the series of interactions with the respective user interface element of the second accessible-response type, respond to detecting an initial interaction while in the first accessible mode with the respective user interface element of the second accessible-response type by outputting audible accessibility information associated with the respective user interface element of the second accessible-response type 712 The audible accessibility information associated with the respective user interface element of the second accessible-response type is audible accessibility information about the respective user interface element of the second accessible-response type itself 714 The audible accessibility information associated with the respective user interface element of the second accessible-response type is audible accessibility information about a group of user interface elements of the second accessible-response type that includes the respective user interface element of the second accessible-response type 716 When the electronic device is operating in the first accessible mode, respond to each interaction in a series of detected interactions with the respective user interface element of the second accessible-response type by performing operations in accordance with the respective set of one or more sighted-mode gesture responses for the respective user interface element of the second accessible-response type

Figure 7B

702 Present in an application one or more user interface elements of a first accessible-response type and one or more user interface elements of a second accessible-response type distinct from the first accessible-response type

718 The presenting includes: presenting audible accessibility information in accordance with the respective set of one or more first-accessible-mode gesture responses for the respective user interface element of the first accessible-response type; and presenting standard audible information in accordance with at least one of the one or more respective sighted-mode gesture responses for the respective user interface element of the second accessible-response type 720 For the respective user interface element of the first accessible-response type, when the electronic device is operating in a second accessible mode distinct from the first accessible mode, respond to detected interactions with the respective user interface element of the first accessible-response type by performing operations in accordance with a respective set of one or more second-accessible-mode gesture responses for the respective user interface element of the first accessible-response type.
For the respective user interface element of the second accessible-response type, when the electronic device is operating in the second accessible mode, respond to detected interactions with the respective user interface element of the second accessible-response type in accordance with a respective set of one or more second-accessible-mode gesture responses for the respective user interface element of the second accessible-response type.

722 The respective set of one or more second-accessible-mode gesture responses for the user interface element of the first accessible-response type is the same as the respective set of one or more first-accessible-mode gesture responses for the user interface element of the first accessible-response type 724 While the electronic device is operating in the first accessible mode, detect an input. In response to detecting the input, change from the first accessible mode to a second accessible mode distinct from the first accessible mode.

Figure 7C

DEVICES, METHODS, AND GRAPHICAL USER INTERFACES FOR PROVIDING ACCESSIBILITY USING A TOUCH-SENSITIVE SURFACE

RELATED APPLICATIONS

This application claims priority to U.S. Provisional Application Ser. No. 61/493,515, filed Jun. 5, 2011, entitled "Devices, Methods, and Graphical User Interfaces for Providing Accessibility Using a Touch-Sensitive Surface," which is incorporated by reference herein in its entirety.

This application is related to U.S. Provisional Application Ser. No. 61/184,825, filed Jun. 7, 2009, entitled "Devices, Methods, and Graphical User Interfaces for Providing Accessibility Using a Touch-Sensitive Surface"; U.S. application Ser. No. 12/565,744, filed Sep. 23, 2009, entitled "Devices, Methods, and Graphical User Interfaces for Providing Accessibility Using a Touch-Sensitive Surface"; U.S. application Ser. No. 12/565,745, filed Sep. 23, 2009, entitled "Devices, Methods, and Graphical User Interfaces for Providing Accessibility Using a Touch-Sensitive Surface"; and U.S. application Ser. No. 12/565,746, filed Sep. 23, 2009, entitled "Devices, Methods, and Graphical User Interfaces for Providing Accessibility Using a Touch-Sensitive Surface," which are all incorporated by reference herein in their entirety.

TECHNICAL FIELD

This relates generally to electronic devices for people with impaired vision, and more particularly, to electronic devices that provide accessibility using a touch-sensitive surface, such as a touch screen display or a track pad.

BACKGROUND

The use of touch-sensitive surfaces as input devices for computers and other electronic devices has increased significantly in recent years. As the use of these touch-sensitive surfaces has increased, the need for touch-based navigation methods that provide accessible navigation feedback has also increased (e.g., audible feedback, haptic feedback, and/or Braille output), especially for people with impaired vision. For example, low-vision users, blind users, dyslexic users or others with learning disabilities, or even sighted users who simply want or need to use a device without looking at the device during operation can benefit from accessibility user interfaces that permit touch-based navigation among user interface elements on the device. For blind users in particular, an effective accessibility interface is not merely an option: it is required to use these devices without assistance from sighted users.

Unfortunately, existing accessibility interfaces on devices with touch-sensitive surfaces remain cumbersome and inefficient. Navigation and activation of user interface elements is often difficult, thereby creating a significant cognitive burden on a user with impaired vision. In addition, existing accessibility methods take longer than necessary, thereby wasting energy. This latter consideration is particularly important in battery-operated devices.

SUMMARY

Accordingly, there is a need for electronic devices with touch-sensitive surfaces (e.g., touch screen displays and/or track pads) with faster, more efficient touch-based accessibility methods and interfaces. Such methods and interfaces may complement or replace existing accessibility methods for navigating and interacting with user interface objects. Such methods and interfaces reduce the cognitive burden on a user with impaired vision and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: presenting in an application one or more user interface elements of a first accessible-response type and one or more user interface elements of a second accessible-response type distinct from the first accessible-response type. The method also includes, while the electronic device is operating in a sighted mode: detecting a first interaction with a user interface element of the first accessible-response type; in response to detecting the first interaction with the user interface element of the first accessible-response type, performing an operation in accordance with a set of one or more sighted-mode gesture responses for the user interface element of the first accessible-response type; detecting a second interaction with a user interface element of the second accessible-response type; and, in response to detecting the second interaction with the user interface element of the second accessible-response type, performing an operation in accordance with a set of one or more sighted-mode gesture responses for the user interface element of the second accessible-response type. The method furthermore includes, while the electronic device is operating in a first accessible mode: detecting a third interaction with the user interface element of the first accessible-response type; in response to detecting the third interaction with the user interface element of the first accessible-response type, performing an operation in accordance with a set of one or more first-accessible-mode gesture responses for the user interface element of the first accessible-response type; detecting a series of interactions with the user interface element of the second accessible-response type; and, in response to detecting each interaction in the series of interactions with the user interface element of the second accessible-response type, performing an operation in accordance with the set of one or more sighted-mode gesture responses for the user interface element of the second accessible-response type.

In accordance with some embodiments, an electronic device includes a display, a touch-sensitive surface, one or more processors, memory, and one or more programs. The one or more programs are stored in the memory and configured to be executed by the one or more processors. The one or more programs include instructions for presenting in an application one or more user interface elements of a first accessible-response type and one or more user interface elements of a second accessible-response type distinct from the first accessible-response type. The one or more programs include instructions for, while the electronic device is operating in a sighted mode: detecting a first interaction with a user interface element of the first accessible-response type; in response to detecting the first interaction with the user interface element of the first accessible-response type, performing an operation in accordance with a set of one or more sighted-mode gesture responses for the user interface element of the first accessible-response type; detecting a second interaction with a user interface element of the second accessible-response type; and, in response to detecting the second interaction with the user interface element of the second accessible-response type, performing an operation in accordance with a set of one or more sighted-mode gesture responses for the user interface element of the second accessible-response type. The one or more programs include instructions for, while the electronic device is operating in a first accessible mode: detecting a third interaction with the user interface element of the first accessible-response type; in response to detecting the third interaction with the user interface element of the first accessible-response type, performing an operation in accordance with a set of one or more first-accessible-mode gesture responses for the user interface element of the first accessible-response type; detecting a series of interactions with the user interface element of the second accessible-response type; and, in response to detecting each interaction in the series of interactions with the user interface element of the second accessible-response type, performing an operation in accordance with the set of one or more sighted-mode gesture responses for the user interface element of the second accessible-response type.

In accordance with some embodiments, a computer readable storage medium has stored therein instructions which when executed by an electronic device with a display and a touch-sensitive surface, cause the device to present in an application one or more user interface elements of a first accessible-response type and one or more user interface elements of a second accessible-response type distinct from the first accessible-response type. The instructions cause the device to, while the electronic device is operating in a sighted mode: detect a first interaction with a user interface element of the first accessible-response type; in response to detecting the first interaction with the user interface element of the first accessible-response type, perform an operation in accordance with a set of one or more sighted-mode gesture responses for the user interface element of the first accessible-response type; detect a second interaction with a user interface element of the second accessible-response type; and, in response to detecting the second interaction with the user interface element of the second accessible-response type, perform an operation in accordance with a set of one or more sighted-mode gesture responses for the user interface element of the second accessible-response type. The instructions cause the device to, while the electronic device is operating in a first accessible mode: detect a third interaction with the user interface element of the first accessible-response type; in response to detecting the third interaction with the user interface element of the first accessible-response type, perform an operation in accordance with a set of one or more first-accessible-mode gesture responses for the user interface element of the first accessible-response type; detect a series of interactions with the user interface element of the second accessible-response type; and, in response to detecting each interaction in the series of interactions with the user interface element of the second accessible-response type, perform an operation in accordance with the set of one or more sighted-mode gesture responses for the user interface element of the second accessible-response type.

In accordance with some embodiments, a graphical user interface on an electronic device with a display, a touch-sensitive surface, a memory, and one or more processors to execute one or more programs stored in the memory includes one or more user interface elements of a first accessible-response type and one or more user interface elements of a second accessible-response type distinct from the first accessible-response type in an application. While the electronic device is operating in a sighted mode: in response to detecting a first interaction with a user interface element of the first accessible-response type, an operation is performed in accordance with a set of one or more sighted-mode gesture responses for the user interface element of the first accessible-response type; and, in response to detecting a second interaction with a user interface element of the second accessible-response type, an operation is performed in accordance with a set of one or more sighted-mode gesture responses for the user interface element of the second accessible-response type. While the electronic device is operating in a first accessible mode: in response to detecting a third interaction with the user interface element of the first accessible-response type, an operation is performed in accordance with a set of one or more first-accessible-mode gesture responses for the user interface element of the first accessible-response type; a series of interactions with the user interface element of the second accessible-response type is detected; and, in response to detecting each interaction in the series of interactions with the user interface element of the second accessible-response type, an operation is performed in accordance with the set of one or more sighted-mode gesture responses for the user interface element of the second accessible-response type.

In accordance with some embodiments, an electronic device includes: a display; a touch-sensitive surface; and means for presenting in an application one or more user interface elements of a first accessible-response type and one or more user interface elements of a second accessible-response type distinct from the first accessible-response type. The electronic device includes means, enabled while the electronic device is operating in a sighted mode, including: means for detecting a first interaction with a user interface element of the first accessible-response type; means, enabled in response to detecting the first interaction with the user interface element of the first accessible-response type, for performing an operation in accordance with a set of one or more sighted-mode gesture responses for the user interface element of the first accessible-response type; means for detecting a second interaction with a user interface element of the second accessible-response type; and, means, enabled in response to detecting the second interaction with the user interface element of the second accessible-response type, for performing an operation in accordance with a set of one or more sighted-mode gesture responses for the user interface element of the second accessible-response type. The electronic device includes means, enabled while the electronic device is operating in a first accessible mode, including: means for detecting a third interaction with the user interface element of the first accessible-response type; means, enabled in response to detecting the third interaction with the user interface element of the first accessible-response type, for performing an operation in accordance with a set of one or more first-accessible-mode gesture responses for the user interface element of the first accessible-response type; means for detecting a series of interactions with the user interface element of the second accessible-response type; and, means, enabled in response to detecting each interaction in the series of interactions with the user interface element of the second accessible-response type, for performing an operation in accordance with the set of one or more sighted-mode gesture responses for the user interface element of the second accessible-response type.

In accordance with some embodiments, an information processing apparatus for use in an electronic device with a display and a touch-sensitive surface includes means for presenting in an application one or more user interface elements of a first accessible-response type and one or more user interface elements of a second accessible-response type distinct from the first accessible-response type. The information processing apparatus includes means, enabled while the electronic device is operating in a sighted mode, including: means for detecting a first interaction with a user interface element of the first accessible-response type; means, enabled in response to detecting the first interaction with the user interface element of the first accessible-response type, for performing an operation in accordance with a set of one or more sighted-mode gesture responses for the user interface element of the first accessible-response type; means for detecting a second interaction with a user interface element of the second accessible-response type; and, means, enabled in response to detecting the second interaction with the user interface element of the second accessible-response type, for performing an operation in accordance with a set of one or more sighted-mode gesture responses for the user interface element of the second accessible-response type. The information processing apparatus includes means, enabled while the electronic device is operating in a first accessible mode, including: means for detecting a third interaction with the user interface element of the first accessible-response type; means, enabled in response to detecting the third interaction with the user interface element of the first accessible-response type, for performing an operation in accordance with a set of one or more first-accessible-mode gesture responses for the user interface element of the first accessible-response type; means for detecting a series of interactions with the user interface element of the second accessible-response type; and, means, enabled in response to detecting each interaction in the series of interactions with the user interface element of the second accessible-response type, for performing an operation in accordance with the set of one or more sighted-mode gesture responses for the user interface element of the second accessible-response type.

In accordance with some embodiments, a method is performed at an electronic device with a display and a touch-sensitive surface. The method includes presenting in an application one or more user interface elements of a first accessible-response type and one or more user interface elements of a second accessible-response type distinct from the first accessible-response type. The method also includes, for a respective user interface element of the first accessible-response type: when the electronic device is operating in a sighted mode, responding to detected interactions with the respective user interface element of the first accessible-response type by performing operations in accordance with a respective set of one or more sighted-mode gesture responses for the respective user interface element of the first accessible-response type, and when the electronic device is operating in a first accessible mode, responding to detected interactions with the respective user interface element of the first accessible-response type by performing operations in accordance with a respective set of one or more first-accessible-mode gesture responses for the respective user interface element of the first accessible-response type. The method furthermore includes, for a respective user interface element of the second accessible-response type: when the electronic device is operating in the sighted mode, responding to detected interactions with the respective user interface element of the second accessible-response type by performing operations in accordance with a respective set of one or more sighted-mode gesture responses for the respective user interface element of the second accessible-response type, and when the electronic device is operating in the first accessible mode, responding to each interaction in a series of detected interactions with the respective user interface element of the second accessible-response type by performing operations in accordance with the respective set of one or more sighted-mode gesture responses for the respective user interface element of the second accessible-response type.

In accordance with some embodiments, an electronic device includes a display, a touch-sensitive surface, one or more processors, memory, and one or more programs. The one or more programs are stored in the memory and configured to be executed by the one or more processors. The one or more programs include instructions for presenting in an application one or more user interface elements of a first accessible-response type and one or more user interface elements of a second accessible-response type distinct from the first accessible-response type. The one or more programs include instructions for, for a respective user interface element of the first accessible-response type: when the electronic device is operating in a sighted mode, responding to detected interactions with the respective user interface element of the first accessible-response type by performing operations in accordance with a respective set of one or more sighted-mode gesture responses for the respective user interface element of the first accessible-response type, and when the electronic device is operating in a first accessible mode, responding to detected interactions with the respective user interface element of the first accessible-response type by performing operations in accordance with a respective set of one or more first-accessible-mode gesture responses for the respective user interface element of the first accessible-response type. The one or more programs include instructions for, for a respective user interface element of the second accessible-response type: when the electronic device is operating in the sighted mode, responding to detected interactions with the respective user interface element of the second accessible-response type by performing operations in accordance with a respective set of one or more sighted-mode gesture responses for the respective user interface element of the second accessible-response type, and when the electronic device is operating in the first accessible mode, responding to each interaction in a series of detected interactions with the respective user interface element of the second accessible-response type by performing operations in accordance with the respective set of one or more sighted-mode gesture responses for the respective user interface element of the second accessible-response type.

In accordance with some embodiments, a computer readable storage medium has stored therein instructions which when executed by an electronic device with a display and a touch-sensitive surface, cause the device to present in an application one or more user interface elements of a first accessible-response type and one or more user interface elements of a second accessible-response type distinct from the first accessible-response type. The instructions cause the device to, for a respective user interface element of the first accessible-response type: when the electronic device is operating in a sighted mode, respond to detected interactions with the respective user interface element of the first accessible-response type by performing operations in accordance with a respective set of one or more sighted-mode gesture responses for the respective user interface element of the first accessible-response type, and when the electronic device is operating in a first accessible mode, respond to detected interactions with the respective user interface element of the first accessible-response type by performing operations in accordance with a respective set of one or more first-accessible-mode gesture responses for the respective user interface element of the first accessible-response type. The instructions cause the device to, for a respective user interface element of the second accessible-response type: when the electronic device is operating in the sighted mode, respond to detected interactions with the respective user interface element of the second accessible-response type by performing operations in accordance with a respective set of one or more sighted-mode gesture responses for the respective user interface element of the second accessible-response type, and when the electronic device is operating in the first accessible mode, respond to each interaction in a series of detected interactions with the respective user interface element of the second accessible-response type by performing operations in accordance with the respective set of one or more sighted-mode gesture responses for the respective user interface element of the second accessible-response type.

In accordance with some embodiments, a graphical user interface on an electronic device with a display, a touch-sensitive surface, a memory, and one or more processors to execute one or more programs stored in the memory includes one or more user interface elements of a first accessible-response type and one or more user interface elements of a second accessible-response type distinct from the first accessible-response type in an application. For a respective user interface element of the first accessible-response type: when the electronic device is operating in a sighted mode, in response to detected interactions with the respective user interface element of the first accessible-response type, operations are performed in accordance with a respective set of one or more sighted-mode gesture responses for the respective user interface element of the first accessible-response type; and when the electronic device is operating in a first accessible mode, in response to detected interactions with the respective user interface element of the first accessible-response type, operations are performed in accordance with a respective set of one or more first-accessible-mode gesture responses for the respective user interface element of the first accessible-response type. For a respective user interface element of the second accessible-response type: when the electronic device is operating in the sighted mode, in response to detected interactions with the respective user interface element of the second accessible-response type, operations are performed in accordance with a respective set of one or more sighted-mode gesture responses for the respective user interface element of the second accessible-response type; and when the electronic device is operating in the first accessible mode, in response to each interaction in a series of detected interactions with the respective user interface element of the second accessible-response type, operations are performed in accordance with the respective set of one or more sighted-mode gesture responses for the respective user interface element of the second accessible-response type.

In accordance with some embodiments, an electronic device includes: a display; a touch-sensitive surface; and means for presenting in an application one or more user interface elements of a first accessible-response type and one or more user interface elements of a second accessible-response type distinct from the first accessible-response type. The electronic device includes, for a respective user interface element of the first accessible-response type: means, enabled when the electronic device is operating in a sighted mode, for responding to detected interactions with the respective user interface element of the first accessible-response type by performing operations in accordance with a respective set of one or more sighted-mode gesture responses for the respective user interface element of the first accessible-response type; and means, enabled when the electronic device is operating in a first accessible mode, for responding to detected interactions with the respective user interface element of the first accessible-response type by performing operations in accordance with a respective set of one or more first-accessible-mode gesture responses for the respective user interface element of the first accessible-response type. The electronic device includes, for a respective user interface element of the second accessible-response type: means, enabled when the electronic device is operating in the sighted mode, for responding to detected interactions with the respective user interface element of the second accessible-response type by performing operations in accordance with a respective set of one or more sighted-mode gesture responses for the respective user interface element of the second accessible-response type; and means, enabled when the electronic device is operating in the first accessible mode, for responding to each interaction in a series of detected interactions with the respective user interface element of the second accessible-response type by performing operations in accordance with the respective set of one or more sighted-mode gesture responses for the respective user interface element of the second accessible-response type.

In accordance with some embodiments, an information processing apparatus for use in an electronic device with a display and a touch-sensitive surface includes means for presenting in an application one or more user interface elements of a first accessible-response type and one or more user interface elements of a second accessible-response type distinct from the first accessible-response type. The information processing apparatus includes, for a respective user interface element of the first accessible-response type: means, enabled when the electronic device is operating in a sighted mode, for responding to detected interactions with the respective user interface element of the first accessible-response type by performing operations in accordance with a respective set of one or more sighted-mode gesture responses for the respective user interface element of the first accessible-response type; and means, enabled when the electronic device is operating in a first accessible mode, for responding to detected interactions with the respective user interface element of the first accessible-response type by performing operations in accordance with a respective set of one or more first-accessible-mode gesture responses for the respective user interface element of the first accessible-response type. The information processing apparatus includes, for a respective user interface element of the second accessible-response type: means, enabled when the electronic device is operating in the sighted mode, for responding to detected interactions with the respective user interface element of the second accessible-response type by performing operations in accordance with a respective set of one or more sighted-mode gesture responses for the respective user interface element of the second accessible-response type; and means, enabled when the electronic device is operating in the first accessible mode, for responding to each interaction in a series of detected interactions with the respective user interface element of the second accessible-response type by performing operations in accordance with the respective set of one or more sighted-mode gesture responses for the respective user interface element of the second accessible-response type.

In accordance with some embodiments, a method is performed at an electronic device with a display and a touch-sensitive surface. The method includes presenting in an application one or more user interface elements of a first accessible-response type and one or more user interface elements of a second accessible-response type distinct from the first accessible-response type. The method includes: detecting a first finger input on the touch-sensitive surface; and, in response to detecting the first finger input: placing a current focus on a user interface element of a first accessible-response type, and outputting audible accessibility information associated with the user interface element of a first accessible-response type. The method includes: detecting a second finger input on the touch-sensitive surface; and, in response to detecting the second finger input: changing the current focus from the user interface element of a first accessible-response type to a set of one or more user interface elements of a second accessible-response type distinct from the first accessible-response type, and outputting audible accessibility information associated with the set of one or more user interface elements of the second accessible-response type. The method includes after outputting the audible accessibility information associated with the set of one or more user interface elements of the second accessible-response type, detecting a series of finger inputs on the touch-sensitive surface. The method includes, in response to detecting the series of finger inputs, when the application is in a first accessibility mode: executing a corresponding series of actions associated with the set of one or more user interface elements of the second accessible-response type, and foregoing outputting audible accessibility information associated with the set of one or more user interface elements of the second accessible-response type. The method includes, when the application is in a second accessibility mode distinct from the first accessibility mode: executing a corresponding series of actions associated with the set of one or more user interface elements of the second accessible-response type, and outputting audible accessibility information associated with the set of one or more user interface elements of the second accessible-response type.

In accordance with some embodiments, an electronic device includes a display, a touch-sensitive surface, one or more processors, memory, and one or more programs. The one or more programs are stored in the memory and configured to be executed by the one or more processors. The one or more programs include instructions for presenting in an application one or more user interface elements of a first accessible-response type and one or more user interface elements of a second accessible-response type distinct from the first accessible-response type. The one or more programs include instructions for: detecting a first finger input on the touch-sensitive surface; and, in response to detecting the first finger input: placing a current focus on a user interface element of a first accessible-response type; and outputting audible accessibility information associated with the user interface element of a first accessible-response type. The one or more programs include instructions for: detecting a second finger input on the touch-sensitive surface; and, in response to detecting the second finger input: changing the current focus from the user interface element of a first accessible-response type to a set of one or more user interface elements of a second accessible-response type distinct from the first accessible-response type; and outputting audible accessibility information associated with the set of one or more user interface elements of the second accessible-response type. The one or more programs include instructions for, after outputting the audible accessibility information associated with the set of one or more user interface elements of the second accessible-response type, detecting a series of finger inputs on the touch-sensitive surface. The one or more programs include instructions for, in response to detecting the series of finger inputs, when the application is in a first accessibility mode: executing a corresponding series of actions associated with the set of one or more user interface elements of the second accessible-response type; and foregoing outputting audible accessibility information associated with the set of one or more user interface elements of the second accessible-response type. The one or more programs include instructions for, when the application is in a second accessibility mode distinct from the first accessibility mode: executing a corresponding series of actions associated with the set of one or more user interface elements of the second accessible-response type; and outputting audible accessibility information associated with the set of one or more user interface elements of the second accessible-response type.

In accordance with some embodiments, a computer readable storage medium has stored therein instructions which when executed by an electronic device with a display and a touch-sensitive surface, cause the device to present in an application one or more user interface elements of a first accessible-response type and one or more user interface elements of a second accessible-response type distinct from the first accessible-response type. The instructions cause the device to: detect a first finger input on the touch-sensitive surface; and, in response to detecting the first finger input: place a current focus on a user interface element of a first accessible-response type; and output audible accessibility information associated with the user interface element of a first accessible-response type. The instructions cause the device to: detect a second finger input on the touch-sensitive surface; and, in response to detecting the second finger input: change the current focus from the user interface element of a first accessible-response type to a set of one or more user interface elements of a second accessible-response type distinct from the first accessible-response type; and output audible accessibility information associated with the set of one or more user interface elements of the second accessible-response type. The instructions cause the device to, after outputting the audible accessibility information associated with the set of one or more user interface elements of the second accessible-response type, detect a series of finger inputs on the touch-sensitive surface. The instructions cause the device to, in response to detecting the series of finger inputs, when the application is in a first accessibility mode: execute a corresponding series of actions associated with the set of one or more user interface elements of the second accessible-response type, and forego outputting audible accessibility information associated with the set of one or more user interface elements of the second accessible-response type. The instructions cause the device to, when the application is in a second accessibility mode distinct from the first accessibility mode: execute a corresponding series of actions associated with the set of one or more user interface elements of the second accessible-response type; and output audible accessibility information associated with the set of one or more user interface elements of the second accessible-response type.

In accordance with some embodiments, a graphical user interface on an electronic device with a display, a touch-sensitive surface, a memory, and one or more processors to execute one or more programs stored in the memory includes one or more user interface elements of a first accessible-response type and one or more user interface elements of a second accessible-response type distinct from the first accessible-response type in an application. In response to detecting a first finger input on the touch-sensitive surface: a current focus is placed on a user interface element of a first accessible-response type; and audible accessibility information associated with the user interface element of a first accessible-response type is output. In response to detecting a second finger input on the touch-sensitive surface: the current focus is changed from the user interface element of a first accessible-response type to a set of one or more user interface elements of a second accessible-response type distinct from the first accessible-response type, and audible accessibility information associated with the set of one or more user interface elements of the second accessible-response type is output. After outputting the audible accessibility information associated with the set of one or more user interface elements of the second accessible-response type, a series of finger inputs on the touch-sensitive surface is detected. In response to detecting the series of finger inputs, when the application is in a first accessibility mode: a corresponding series of actions associated with the set of one or more user interface elements of the second accessible-response type is executed; and outputting audible accessibility information associated with the set of one or more user interface elements of the second accessible-response type is foregone. When the application is in a second accessibility mode distinct from the first accessibility mode: a corresponding series of actions associated with the set of one or more user interface elements of the second accessible-response type is executed; and audible accessibility information associated with the set of one or more user interface elements of the second accessible-response type is output.

In accordance with some embodiments, an electronic device includes: a display; a touch-sensitive surface; and means for presenting in an application one or more user interface elements of a first accessible-response type and one or more user interface elements of a second accessible-response type distinct from the first accessible-response type. The electronic device includes: means for detecting a first finger input on the touch-sensitive surface; and means, enabled in response to detecting the first finger input, including: means for placing a current focus on a user interface element of a first accessible-response type, and means for outputting audible accessibility information associated with the user interface element of a first accessible-response type. The electronic device includes: means for detecting a second finger input on the touch-sensitive surface; and means, enabled in response to detecting the second finger input, including: means for changing the current focus from the user interface element of a first accessible-response type to a set of one or more user interface elements of a second accessible-response type distinct from the first accessible-response type, and means for outputting audible accessibility information associated with the set of one or more user interface elements of the second accessible-response type. The electronic device includes means, enabled after outputting the audible accessibility information associated with the set of one or more user interface elements of the second accessible-response type, for detecting a series of finger inputs on the touch-sensitive surface. The electronic device includes means, enabled in response to detecting the series of finger inputs, including means enabled when the application is in a first accessibility mode, which includes: means for executing a corresponding series of actions associated with the set of one or more user interface elements of the second accessible-response type, and means for foregoing outputting audible accessibility information associated with the set of one or more user interface elements of the second accessible-response type. The electronic device includes means, enabled when the application is in a second accessibility mode distinct from the first accessibility mode, including: means for executing a corresponding series of actions associated with the set of one or more user interface elements of the second accessible-response type, and means for outputting audible accessibility information associated with the set of one or more user interface elements of the second accessible-response type.

In accordance with some embodiments, an information processing apparatus for use in an electronic device with a display and a touch-sensitive surface includes means for presenting in an application one or more user interface elements of a first accessible-response type and one or more user interface elements of a second accessible-response type distinct from the first accessible-response type. The information processing apparatus includes: means for detecting a first finger input on the touch-sensitive surface; and means, enabled in response to detecting the first finger input, including: means for placing a current focus on a user interface element of a first accessible-response type, and means for outputting audible accessibility information associated with the user interface element of a first accessible-response type. The information processing apparatus includes: means for detecting a second finger input on the touch-sensitive surface; and means, enabled in response to detecting the second finger input, including: means for changing the current focus from the user interface element of a first accessible-response type to a set of one or more user interface elements of a second accessible-response type distinct from the first accessible-response type, and means for outputting audible accessibility information associated with the set of one or more user interface elements of the second accessible-response type. The information processing apparatus includes means, enabled after outputting the audible accessibility information associated with the set of one or more user interface elements of the second accessible-response type, for detecting a series of finger inputs on the touch-sensitive surface. The information processing apparatus includes means, enabled in response to detecting the series of finger inputs, including means enabled when the application is in a first accessibility mode, which includes: means for executing a corresponding series of actions associated with the set of one or more user interface elements of the second accessible-response type, and means for foregoing outputting audible accessibility information associated with the set of one or more user interface elements of the second accessible-response type. The information processing apparatus includes means, enabled when the application is in a second accessibility mode distinct from the first accessibility mode, including: means for executing a corresponding series of actions associated with the set of one or more user interface elements of the second accessible-response type, and means for outputting audible accessibility information associated with the set of one or more user interface elements of the second accessible-response type.

In accordance with some embodiments, an electronic device includes an output unit configured to present in an application one or more user interface elements of a first accessible-response type and one or more user interface elements of a second accessible-response type distinct from the first accessible-response type; a touch-sensitive surface unit configured to receive user interaction with user interface elements; and a processing unit coupled to the output unit and the touch-sensitive surface unit. The processing unit is configured to, while the electronic device is operating in a sighted mode: detect a first interaction with a user interface element of the first accessible-response type; in response to detecting the first interaction with the user interface element of the first accessible-response type, perform an operation in accordance with a set of one or more sighted-mode gesture responses for the user interface element of the first accessible-response type; detect a second interaction with a user interface element of the second accessible-response type; and, in response to detecting the second interaction with the user interface element of the second accessible-response type, perform an operation in accordance with a set of one or more sighted-mode gesture responses for the user interface element of the second accessible-response type. The processing unit is configured to, while the electronic device is operating in a first accessible mode: detect a third interaction with the user interface element of the first accessible-response type; in response to detecting the third interaction with the user interface element of the first accessible-response type, perform an operation in accordance with a set of one or more first-accessible-mode gesture responses for the user interface element of the first accessible-response type; detect a series of interactions with the user interface element of the second accessible-response type; and, in response to detecting each interaction in the series of interactions with the user interface element of the second accessible-response type, perform an operation in accordance with the set of one or more sighted-mode gesture responses for the user interface element of the second accessible-response type.

In accordance with some embodiments, an electronic device includes an output unit configured to present in an application one or more user interface elements of a first accessible-response type and one or more user interface elements of a second accessible-response type distinct from the first accessible-response type; a touch-sensitive surface unit configured to receive user interaction with user interface elements; and a processing unit coupled to the output unit and the touch-sensitive surface unit. The processing unit is configured to, for a respective user interface element of the first accessible-response type: when the electronic device is operating in a sighted mode, respond to detected interactions with the respective user interface element of the first accessible-response type by performing operations in accordance with a respective set of one or more sighted-mode gesture responses for the respective user interface element of the first accessible-response type, and when the electronic device is operating in a first accessible mode, respond to detected interactions with the respective user interface element of the first accessible-response type by performing operations in accordance with a respective set of one or more first-accessible-mode gesture responses for the respective user interface element of the first accessible-response type. The processing unit is configured to, for a respective user interface element of the second accessible-response type: when the electronic device is operating in the sighted mode, respond to detected interactions with the respective user interface element of the second accessible-response type by performing operations in accordance with a respective set of one or more sighted-mode gesture responses for the respective user interface element of the second accessible-response type, and when the electronic device is operating in the first accessible mode, respond to each interaction in a series of detected interactions with the respective user interface element of the second accessible-response type by performing operations in accordance with the respective set of one or more sighted-mode gesture responses for the respective user interface element of the second accessible-response type.

In accordance with some embodiments, an electronic device includes an output unit configured to present in an application one or more user interface elements of a first accessible-response type and one or more user interface elements of a second accessible-response type distinct from the first accessible-response type; a touch-sensitive surface unit configured to receive user interaction with user interface elements; and a processing unit coupled to the output unit and the touch-sensitive surface unit. The processing unit is configured to: detect a first finger input on the touch-sensitive surface unit; and, in response to detecting the first finger input: place a current focus on a user interface element of a first accessible-response type, and output audible accessibility information associated with the user interface element of a first accessible-response type. The processing unit is configured to: detect a second finger input on the touch-sensitive surface unit; and, in response to detecting the second finger input: change the current focus from the user interface element of a first accessible-response type to a set of one or more user interface elements of a second accessible-response type distinct from the first accessible-response type, and output audible accessibility information associated with the set of one or more user interface elements of the second accessible-response type. The processing unit is configured to, after outputting the audible accessibility information associated with the set of one or more user interface elements of the second accessible-response type, detect a series of finger inputs on the touch-sensitive surface unit; and, in response to detecting the series of finger inputs, when the application is in a first accessibility mode: execute a corresponding series of actions associated with the set of one or more user interface elements of the second accessible-response type, and forego outputting audible accessibility information associated with the set of one or more user interface elements of the second accessible-response type. The processing unit is configured to, when the application is in a second accessibility mode distinct from the first accessibility mode: execute a corresponding series of actions associated with the set of one or more user interface elements of the second accessible-response type, and output audible accessibility information associated with the set of one or more user interface elements of the second accessible-response type.

Thus, electronic devices with displays and touch-sensitive surfaces are provided with new and improved accessibility methods and user interfaces, thereby increasing the effectiveness, efficiency, and user satisfaction with such devices. Such methods and interfaces may complement or replace existing accessibility methods.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6C are flow diagrams illustrating a method of providing accessibility using a touch-sensitive surface in accordance with some embodiments.

FIGS. 7A-7C are flow diagrams illustrating a method of providing accessibility using a touch-sensitive surface in accordance with some embodiments.

DESCRIPTION OF EMBODIMENTS

Figure 1A:
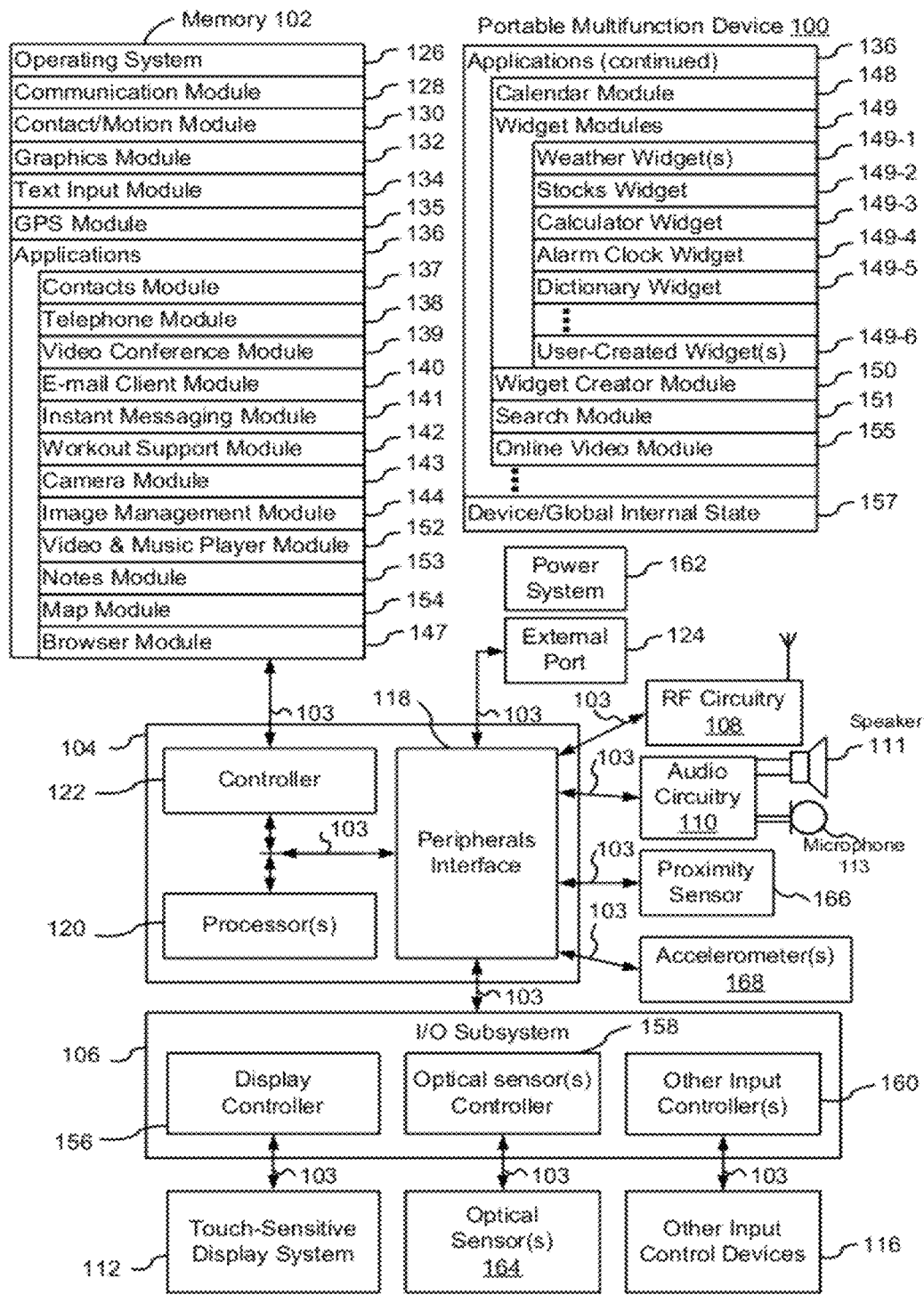
FIG. 1A is a block diagram illustrating a portable multifunction device with a touch-sensitive display in accordance with some embodiments.

Described below are devices and methods that enable users with impaired vision to more efficiently navigate and use electronic devices with touch-based user interfaces.

Some existing electronic devices with touch-based user interfaces (e.g., devices with touch-sensitive surfaces such as touch screens and/or touch pads) include a screen reader accessibility mode that outputs audible accessibility information about the user interface elements that a user's finger contacts as the finger is moved over the touch-sensitive surface (e.g., VoiceOver mode on the iPhone®, iPod Touch®, and iPad® devices from Apple Inc. of Cupertino, Calif.). This mode enables a user with impaired vision to determine how the user interface elements are arranged in the user interface.

But, after the user has learned where certain user interface elements are located, repeated output of the audible accessibility information can hinder the use of these elements. For example, in a music application (e.g., GarageBand from Apple Inc. of Cupertino, Calif.), once a user has explored the user interface for a virtual guitar and knows where the guitar strings are located on the touch-sensitive surface, then repeated output of audible accessibility information about the guitar strings each time contact is made with a guitar string is unnecessary and makes playing the virtual guitar difficult, if not impossible.

The user could work around this problem by turning off the screen reader mode and just using the standard, sighted mode. But then the user would not hear audible accessibility information for other user interface elements that the user may want to interact with while using the virtual guitar, such as control buttons and menu items.

For the methods and devices disclosed herein, these problems are overcome by having two different types of user interface elements and two different screen reader accessibility modes (along with a standard sighted mode). The type of user interface element to which a particular user interface element belongs is typically defined by an application developer at the time the application is designed.

For a first type of element, such as control buttons and menu items, the elements respond to inputs in both screen reader accessibility modes by outputting audible information about the elements. For a second type of element, such as the strings and chords in a guitar string area of a virtual guitar, in a first accessibility mode (e.g., a so-called direct touch screen reader mode) the element may respond to an initial input by outputting audible accessibility information (e.g., "Guitar string area. This is a direct touch area."), but subsequent interactions with these elements will produce responses as if the device was operating in a sighted mode (e.g., without additional audible accessibility information, which would interfere with the user operating the guitar string area in a standard manner).

However, the user may also change from the first accessibility mode to a second accessibility mode (e.g., a so-called exploratory screen reader mode), where audible accessibility information about the second type of user interface element (as well as the first type of user interface element) will be output repeatedly, to allow the user to determine where these elements are located. This allows a user with impaired vision to explore the user interface and quickly identify user interface elements of the second accessible-response type (or a group of user interface elements of the second accessible-response type) without having to switch modes between an accessible mode and a sighted mode.

The direct touch screen reader mode can be used with many types of user interface elements, including virtual musical instruments (e.g., virtual guitars, drums, keyboards, etc.), Chinese handwriting keyboards, custom vibration recorder screens, and camera screens that auto focus where your finger touches.

Below, FIGS. 1A-1B, 2, and 3 provide a description of exemplary devices. FIGS. 4A-4B and 5A-5Q illustrate exemplary user interfaces for providing accessibility using a touch-sensitive surface. FIGS. 6A-6C, 7A-7C, and 8A-8B are flow diagrams illustrating methods of providing accessibility using a touch-sensitive surface. The user interfaces in FIGS. 5A-5Q are used to illustrate the processes illustrated by the flow diagrams in FIGS. 6A-6C, 7A-7C, and 8A-8B.

Exemplary Devices

Reference will now be made in detail to embodiments, examples of which are illustrated in the accompanying drawings. In the following detailed description, numerous specific details are set forth in order to provide a thorough understanding of the embodiments. However, it will be apparent to one of ordinary skill in the art that the other embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first user interface element could be termed a second user interface element, and, similarly, a second user interface element could be termed a first user interface element, without changing the meaning of the description, so long as all occurrences of the first user interface element are renamed consistently and all occurrences of the second user interface element are renamed consistently. The first user interface element and the second user interface element are both user interface elements, but they are not the same user interface element.

The terminology used in the description of the embodiments herein is for the purpose of describing particular embodiments only and is not intended to be limiting of the embodiments. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
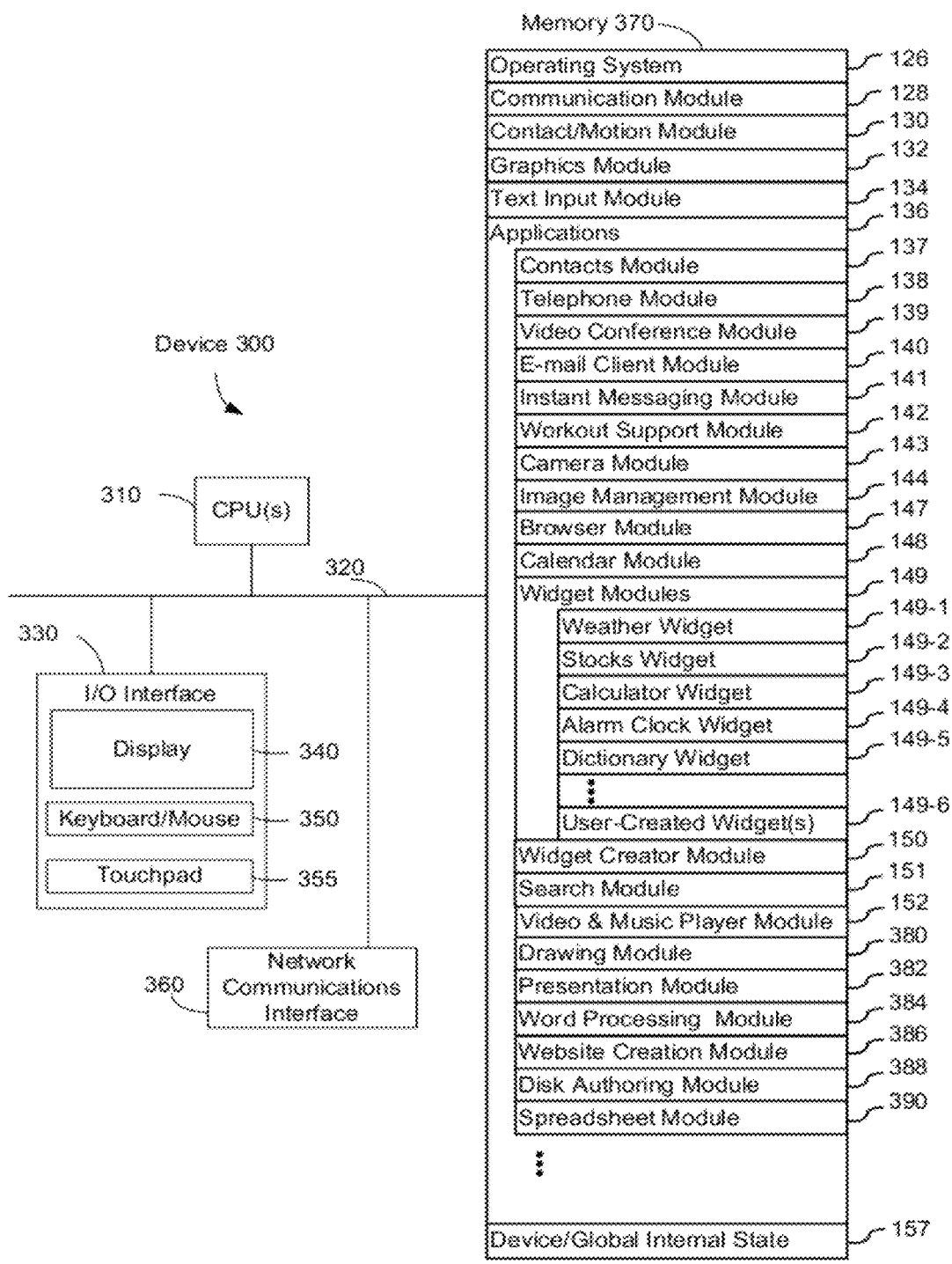
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
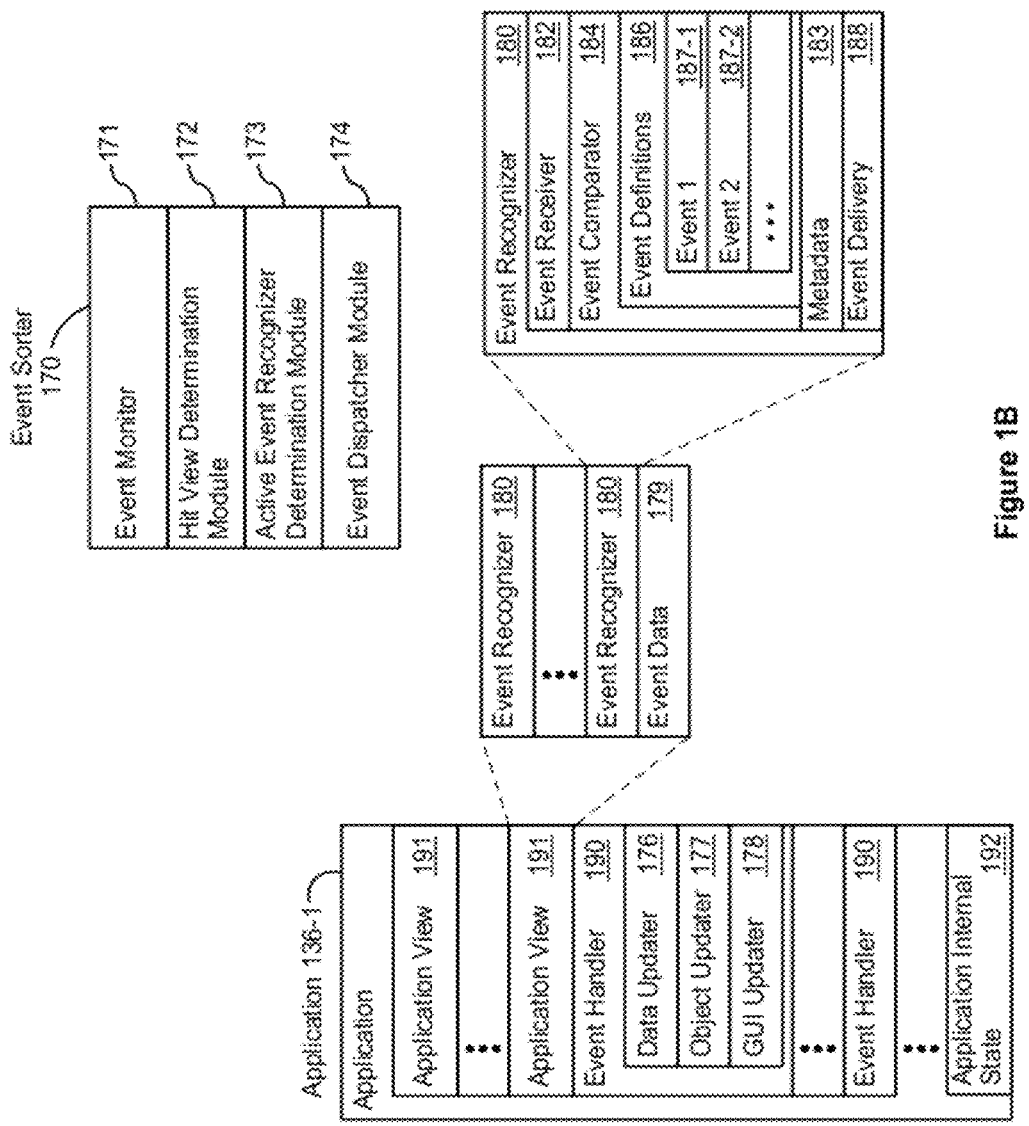
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
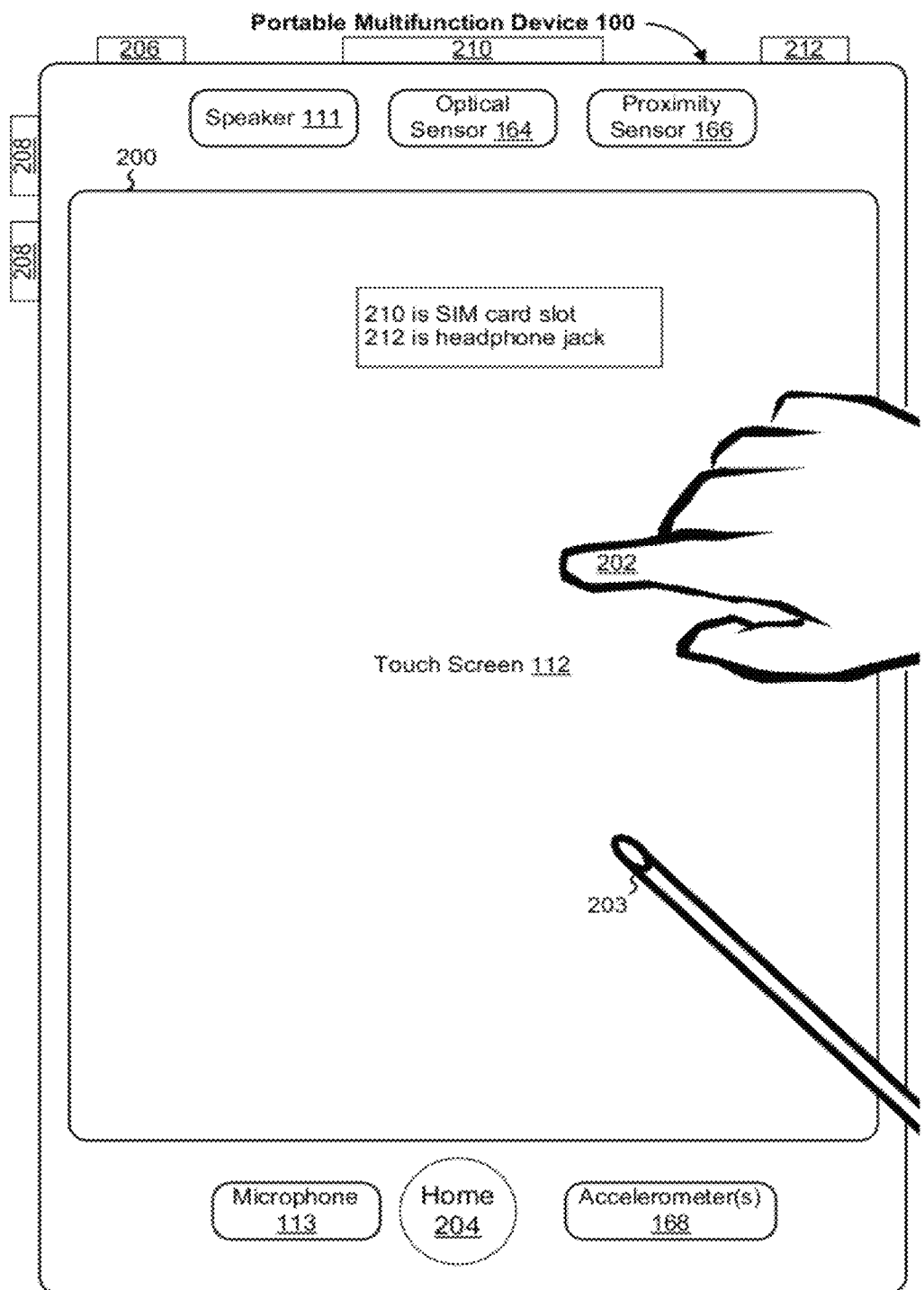
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1A) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
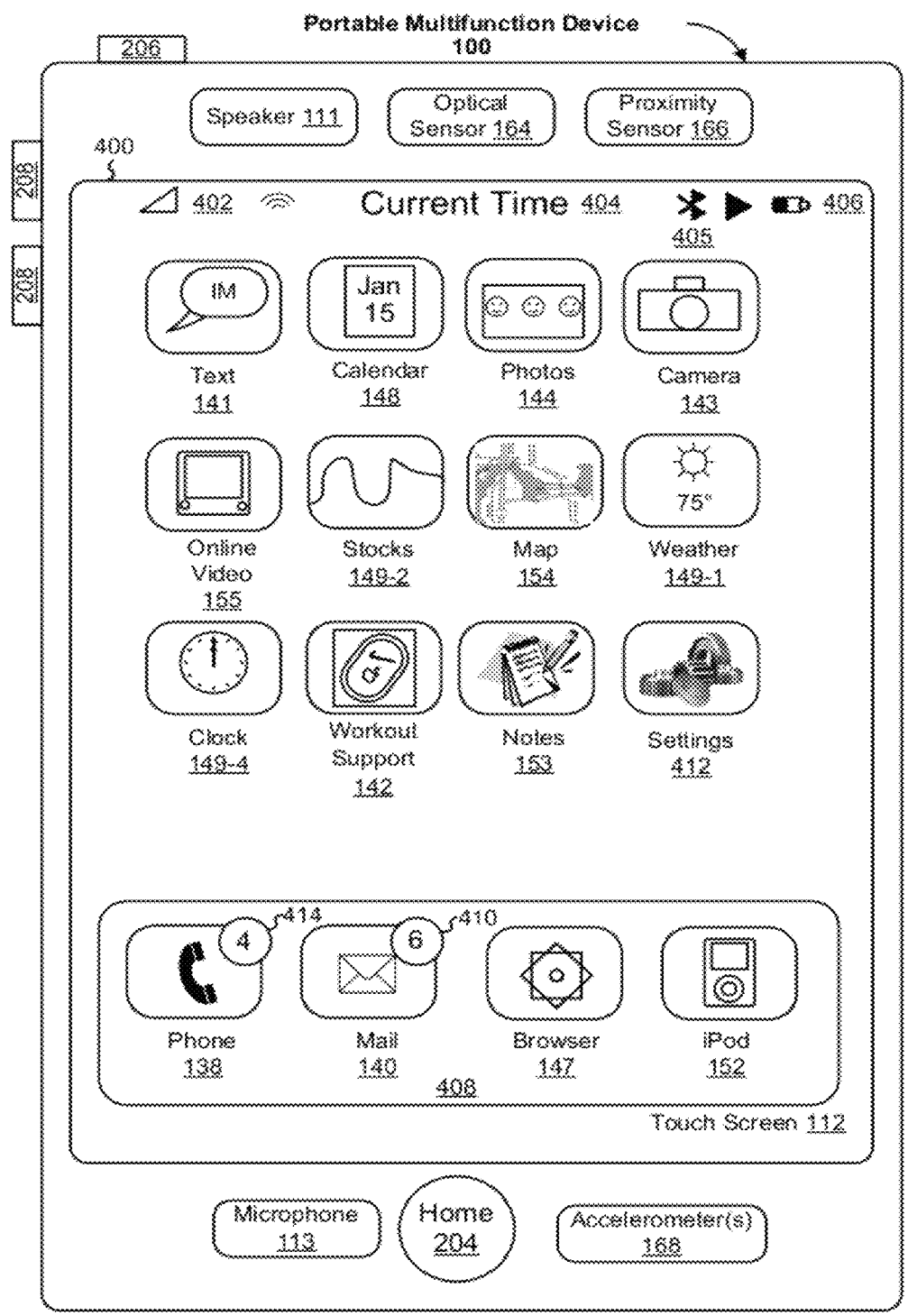
FIG. 4A illustrates an exemplary user interface for a menu of applications on a portable multifunction device in accordance with some embodiments.
Figure 5A:
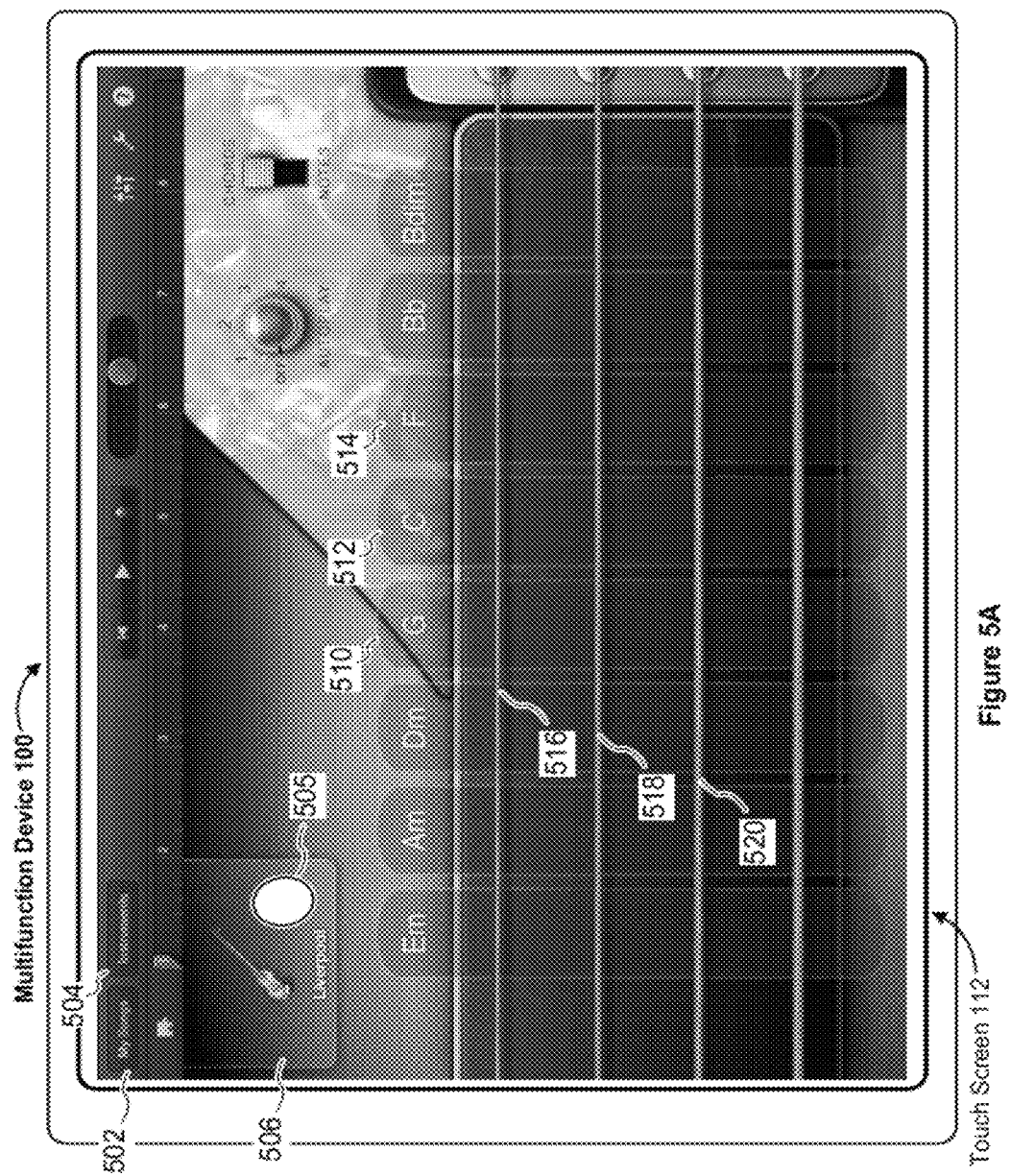
FIGS. 5A-5Q illustrate exemplary user interfaces for providing accessibility using a touch-sensitive surface in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
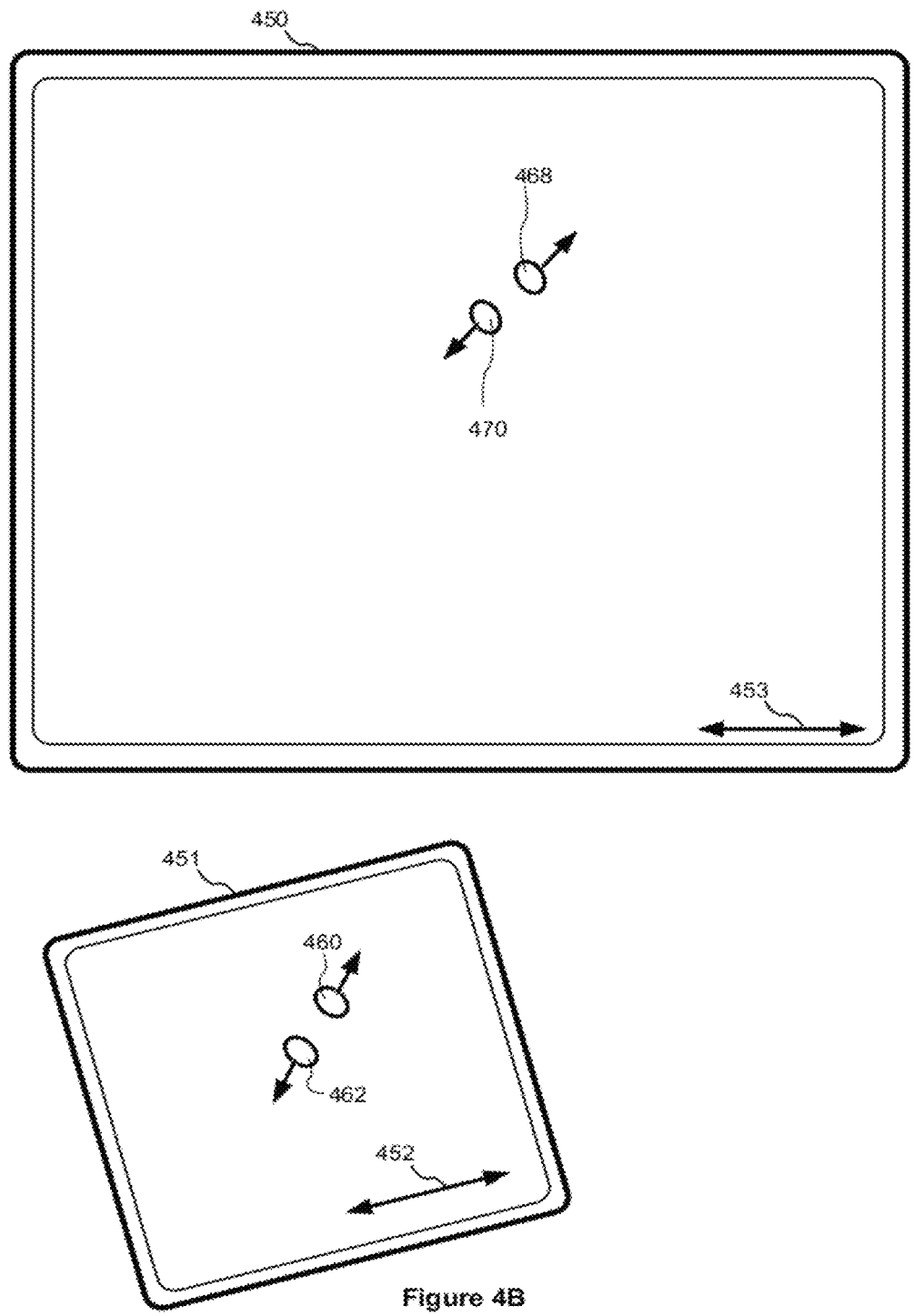
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 (FIG. 3) or portable multifunction device 100 (FIG. 1A).

FIGS. 5A-5Q illustrate exemplary accessibility user interfaces for an electronic device with a touch-sensitive surface in accordance with some embodiments. The user interfaces in these figures are used to illustrate the processes described below, including the processes in FIGS. 6A-6C, 7A-7C, and 8A-8B.

Audible Navigation

The exemplary user interfaces depicted in FIGS. 5A-5Q include accessibility interfaces for touch-based navigation among, and touch-based activation of, user interface elements on an electronic device. The exemplary user interfaces depicted in FIGS. 5A-5Q include a "current focus," which is not visually depicted. Some of these exemplary user interfaces also include a visually displayed "accessibility cursor." The accessibility cursor indicates where the current focus is. The current focus is associated with a specific user interface element, which, if selected, would cause the device to execute an action associated with that specific user interface element. For example, in FIG. 5E, both the displayed accessibility cursor 524 and the current focus are on or at instrument sound icon 506, so if that icon were activated, the device running the user interface would display a plurality of instrument sound icons 508 (e.g., FIG. 5B).

Although in some embodiments an accessibility cursor is displayed visually in the user interface, the accessibility cursor is not displayed visually in other embodiments. Indeed, in some embodiments, there is no requirement that a user interface is visually displayed at all. In those embodiments, audible and/or tactile feedback (e.g., Braille keyboards), which may be communicatively attached to or disposed in the device, is provided to a user so that the user may perform touch-based navigation among non-displayed user interface elements according to methods disclosed herein. In the exemplary user interfaces in FIGS. 5A-5Q, however, the current focus is at or on the same user interface element where the accessibility cursor (e.g., 524, FIG. 5E) is positioned (when the accessibility cursor is displayed).

Further, in some embodiments, some or all of the exemplary gestures contained in Table 1 may be utilized in accessibility interfaces as set forth herein. In Table 1, a gesture on the "touch-sensitive surface" refers to gestures performed on a touch screen display, a track pad, or other touch-sensitive surface.

TABLE 1

Exemplary accessibility gestures

| Detected Gesture | Response to Detected Gesture |
|---|---|
| Navigation and Reading | |
| Single-finger tap on the touch-sensitive surface. | Speak the name of the user interface element or item where the current focus is set. |
| Single-finger flick right on the touch-sensitive surface. | Move the current focus to the next user interface element. |

TABLE 1-continued

Exemplary accessibility gestures

| Detected Gesture | Response to Detected Gesture |
| --- | --- |
| Single-finger flick left on the touch-sensitive surface. | Move the current focus to the previous user interface element. |
| Single-finger flick down on the touch-sensitive surface. | Output audible indicia concerning the user interface element where the current focus is set and advance the current focus by one navigable unit. For example: read the name of an element and advance the current focus to the next element; speak a word and advance the current focus to the next word; or speak an individual character in the element and advance the current focus to the next character in the element. |
| Single-finger flick up on the touch-sensitive surface. | Output audible indicia concerning the user interface element where the current focus is set and move the current focus backward by one navigable unit. For example: read the name of an element and move the current focus to the previous element; speak a word and move the current focus to the previous word; or speak an individual character in the element and move the current focus to the previous character in the element. |
| Two-finger single tap on the touch-sensitive surface. | Toggle output of current accessibility information, e.g., toggle between pausing and playing audible accessibility information. |
| Two-finger flick upward on the touch-sensitive surface, i.e., a two-finger flick toward the top of the touch-sensitive surface. | Read all displayed information from the top of the display (e.g., text and/or names of user interface elements). |
| Two-finger flick downward on the touch-sensitive surface, i.e., a two-finger flick toward the bottom of the touch-sensitive surface. | Read all displayed information from the location of the current focus on the display (e.g., text and/or names of user interface elements). |
| Three-finger flick upward on the touch-sensitive surface, i.e., a three-finger flick toward the top of the touch-sensitive surface. | Scroll forward/upward one page/screen of material, e.g., a document or list slides up on the display, revealing a next page/screen of material. |
| Three-finger flick downward on the touch-sensitive surface, i.e., a three-finger flick toward the bottom of the touch-sensitive surface. | Scroll backward/downward one page/screen of material, e.g., a document or list slides down on the display, revealing a previous page/screen of material. |
| Three-finger flick right on the touch-sensitive surface. | Display the previous page/screen of user interface elements. |
| Three-finger flick left on the touch-sensitive surface. | Display the next page/screen of user interface elements. |
| Three-finger single tap on the touch-sensitive surface. | Output audible document section indicia that correspond to the currently displayed section of the document, e.g., spoken words that correspond to the displayed document section, such as "page 2 of 22." |
| Three-finger double tap on the touch-sensitive surface. | Toggle between providing audible output and muting the audible output. |
| Selection and Activation | |
| Single-finger double tap on the touch-sensitive surface. | Perform an action associated with the user interface element that has the current focus (e.g., select a key on a keyboard for text entry; activate a selected item; run an application, etc.). |
| Split tapping, i.e., while touching an item (or a point corresponding to the item) with one finger, tap the touch-sensitive surface with another finger. | Perform an action associated with the touched item (which has the current focus as a result of the touch) |
| Single-finger double tap, with the second tap remaining in contact with the touch-sensitive surface for a predefined period, e.g., a period of time between 0.05 and 1.5 seconds. | Enable pass-through of gestures to a standard, non-accessibility user interface. In some embodiments, select a special character from a group of special characters, e.g., selecting accented characters such as a Spanish-language ñ. |

TABLE 1-continued

Exemplary accessibility gestures

| Detected Gesture | Response to Detected Gesture |
|---|---|
| Two-finger double tap on the touch-sensitive surface. | Depending on application(s) running: Answer or end a telephone call. Play or pause media content playback. Take a picture with a camera. Start or pause recording with an application such as a video camera or an audio recording tool. Manage accepting and rejecting completion candidates, e.g., completion candidate words suggested when typing, or completion candidates for selecting Asian-language characters such as Kanji. |
| Two-finger triple tap on the touch-sensitive surface. | Toggle output of accessibility information on and off, e.g., mute or speak audible accessibility information. |
| Three-finger triple tap on the touch-sensitive surface. | Toggle a privacy screen on and off, i.e., toggle display of a "screen curtain" or blank screen that prevents viewing of displayed content and user interface elements. |

The accessibility gestures in Table 1 are merely exemplary. In some embodiments, the responses to opposite gestures (e.g., a rightward gesture versus the corresponding leftward gesture, or an upward gesture versus the corresponding downward gesture) may be reversed from those shown in Table 1. For example, a single-finger flick right may move the current focus to the previous element and a single-finger flick left may move the current focus to the next element. In some embodiments, the responses to opposite gestures are user configurable, e.g., via a settings or options menu.

Other non-limiting examples of responses to detected gestures include switching from a first accessible mode to a second accessible mode, or from the second accessible mode to the first accessible mode in response to a two-finger rotor gesture (described in more detail below) or a two-finger rotor gesture followed by a single-finger flick up or down on the touch-sensitive surface.

Navigation Settings Gestures

Some accessibility navigation gestures discussed herein navigate among text-based user interface elements for reading or for entering text. Some gestures permit navigation among user interface elements on web pages. Still other gestures permit manipulation of controls, such as moving settings on clocks, temperature gauges, volume settings, etc.

In some embodiments, a common gesture may be used to change settings for how accessible navigation of text, web pages, and/or controls is performed (e.g., in response to up or down single-finger flick or swipe gestures, Table 1). For example, a two-finger rotation or twisting gesture on the touch-sensitive surface may be used to "turn" a virtual dial, rotor, or knob to choose between options (referred to hereinafter as a "rotor" or "rotor control" and gestures of this type may be referred to herein as "rotor gestures"). This "rotor" control acts as an invisible dial for changing the response of the device to the detection of certain navigation gestures in the accessibility user interface.

The effect of the rotor control depends on usage context, i.e., what type of content is currently being navigated with the accessibility user interface. For example, when reading text in an email, the rotor may switch the accessible navigation from one level of navigation resolution to another, such as changing from character-by-character navigation to word-by-word navigation. Additionally, the rotor changes the emission of audible text output to reflect the new accessible navigation resolution. Thus, text corresponding to the content is spoken word-by-word or character-by-character in response to navigation gestures, in accordance with the current accessible navigation resolution. As another example, the rotor may be used to alter the accessible navigation and emission of audible text output when browsing a webpage. For example, in response to one or more rotor gestures, the device may be set to navigate and speak text corresponding to the web page word-by-word, navigate and speak text corresponding to the web page character-by-character, navigate amongst web page headers and speak text indicating what the web page's headers are, navigate amongst the links on the web page and speak those links on the web page (all of them, just visited links, or just links not yet visited), navigate amongst the form elements on the webpage and speak the form elements from the web page, or navigate amongst images on the web page and speak descriptions of those images.

Table 2 describes exemplary rotor options depending on the navigation context within the accessibility user interface.

TABLE 2

Exemplary navigation settings options

| Navigation Context | Parameters/Options Changes |
|---|---|
| Reading text | Select and hear text by character, word, sentence, line, paragraph, or page |
| Web page browsing | Select and hear text by character, word, sentence, line, paragraph, page, headers, links, form elements, links visited, links not visited, or descriptions of images |
| Entering text | Move insertion point (text cursor) and hear text by character, by word, and/or hear suggested auto-completion text |
| Changing control values | Select and hear value by character or by word. Adjust value of control objects; date formats; time formats; language settings; units of measure; temperature scales; splitter user interface elements (i.e., a single line user interface element that controls how much space a view has compared to another view within an application, such as in an email application, the splitter line between the email messages table and the email message preview content window); horizontal, vertical, or circular sliders; or other types of controls that have a range of either continuous or discrete values. |

TABLE 2-continued

Exemplary navigation settings options

| Navigation Context | Parameters/Options Changes |
|---|---|
| User interface elements | Move to user interface elements that are above or below the current focus (i.e., the currently selected user interface element). |
| Type of accessible mode | Switch among a plurality of accessible modes (e.g., switch from a first accessible mode to a second accessible mode, or from the second accessible mode to the first accessible mode, etc.). |

In some embodiments, a rotor-based gesture includes a first finger contact and a second finger contact that are separated by a distance, where the distance between the first finger contact and the second finger contact includes a center point, and the first finger contact and the second finger contact rotate on the touch screen display around the center point. In essence, as discussed above, this rotation gesture simulates turning or twisting a knob in one direction or the other. As the gesture progresses, the simulated knob turning changes the current navigable unit type.

In some embodiments, a rotor-based gesture includes placing a first finger contact on a touch-sensitive surface, concurrently placing a second finger contact on the touch-sensitive surface, and rotating the second finger contact about the first finger contact while the first finger contact remains stationary. In this embodiment, the first finger contact acts as a center point for the rotation by the second finger contact.

For example, consider an accessible electronic device with a touch-sensitive surface where text is being read to a user one navigable "unit" at a time in response to that user's navigation requests on the touch-sensitive surface, i.e., each of the user's navigation requests results in one unit being read to the user, viz. character-by-character, word-by-word, line-by-line, etc. Changing the navigable unit type is accomplished by a navigation settings gesture, such as the rotor gesture. In some embodiments, the rotor gesture toggles the navigable unit setting between reading the text character-by-character and reading the text word-by-word. In some embodiments, the rotor gesture changes the navigation unit type by sequencing through unit types from smallest to largest (or vice-versa), e.g., characters are the smallest navigable unit type, then words, sentences, lines, paragraphs, and pages.

Other non-limiting examples of navigable units that may be adjusted are: web content, e.g., headers, links, visited links, etc; configuration settings, e.g., date formats, time formats, language settings, units of measure, temperature scales; splitter user interface elements (i.e., a single line user interface element that controls how much space a view has compared to another view within an application, such as in an email application, the splitter line between the email messages table and the email message preview content window); horizontal, vertical, or circular sliders; or other types of controls that have a range of either continuous or discrete values.

In some embodiments, the navigation settings are adjusted by a gesture performed in a location-independent fashion on the touch-sensitive surface of the accessible system. Thus, because the system is designed for accessibility use, one need not contact any specific portion of the touch sensitive surface, or any specific user interface element to adjust the current navigable unit type. In some embodiments, gestures that adjust the rotor are independent of contacting any user interface elements.

Figure 5C:
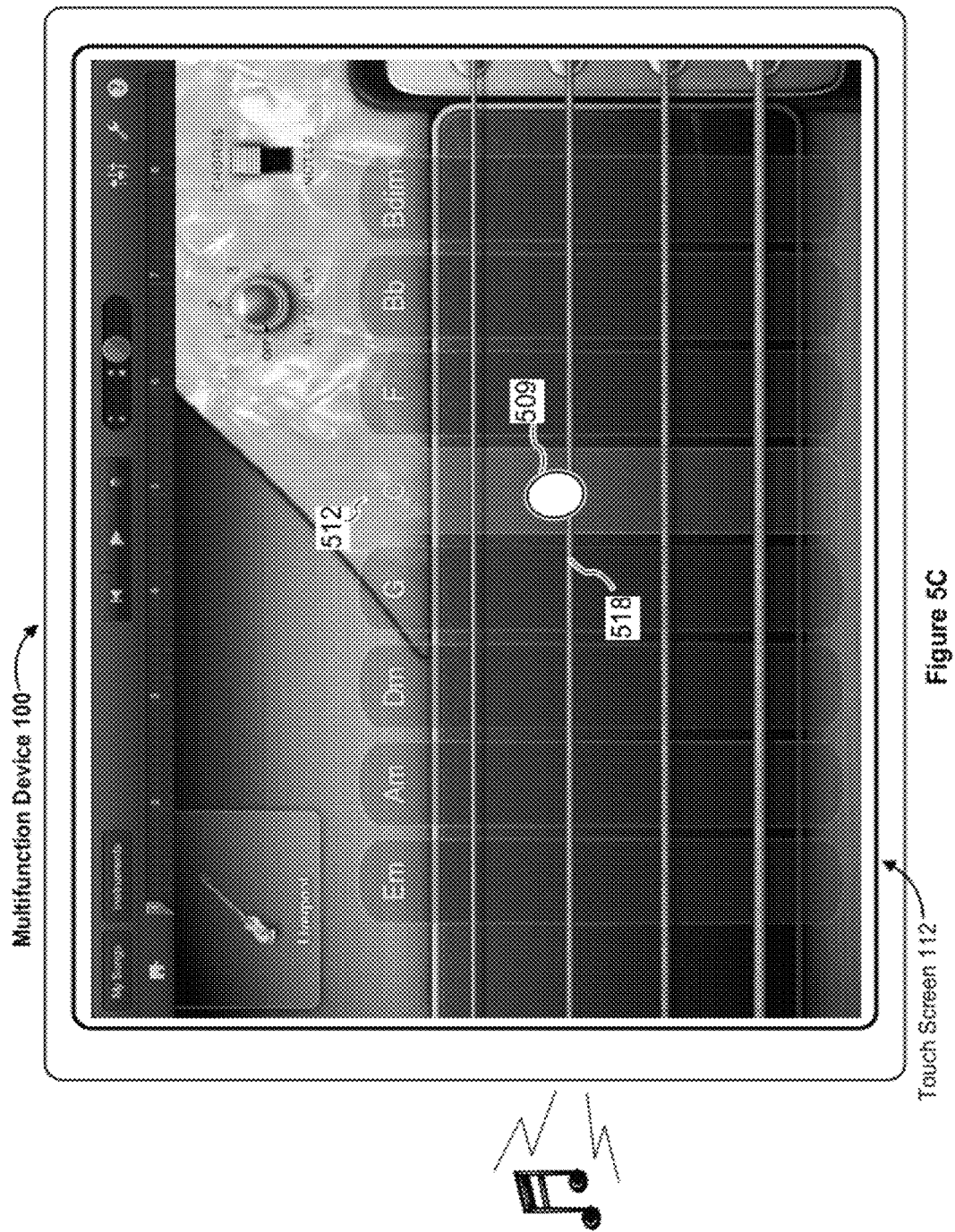

FIGS. 5A-5C illustrate operations of an electronic device operating in a standard, sighted mode.

FIG. 5A illustrates a user interface of a virtual musical instrument application displayed on a display of the electronic device. The user interface includes a plurality of user interface elements of a first accessible-response type (e.g., "My Songs" button 502, "Instruments" button 504, and instrument sound icon 506). The user interface also includes a graphical representation of at least a portion of a musical instrument (e.g., a bass guitar) with a plurality of user interface elements of a second accessible-response type (e.g., guitar chords 510, 512, and 514 and guitar strings 516, 518, and 520).

FIG. 5A also illustrates tap gesture 505 detected at a location corresponding to instrument sound icon 506.

In FIG. 5B, in response to tap gesture 505 (FIG. 5A) at the location corresponding to instrument sound icon 506, popup menu 508 including instrument sound icons is displayed. Because the device is operating in a sighted mode, no audible accessibility information is output concerning instrument sound icon 506. In addition, tap gesture 507 is detected at a location that does not correspond to popup menu 508.

FIG. 5C illustrates that, in response to tap gesture 507 (FIG. 5B) at the location that does not corresponding to popup menu 508 (FIG. 5B), popup menu 508 ceases to be displayed.

In FIG. 5C, tap gesture 509 is detected at a location that corresponds to guitar chord 512 and guitar string 518. In response, sound that corresponds to guitar chord 512 and guitar string 518 is generated (or played). Because the device is operating in a sighted mode, no audible accessibility information is output concerning guitar chord 512 and guitar string 518.

FIGS. 5D-5J illustrate operations of the electronic device operating in a first accessible mode (sometimes called a direct touch screen reader mode). The device may switch from the sighted mode to the first accessible mode in response to a user changing the device settings (e.g., in a settings menu). In some instances the device may be configured to switch from the sighted mode to the first accessible mode in response to a predefined input (e.g., pressing home button 204 three times in a row, FIG. 2).

Figure 5D:
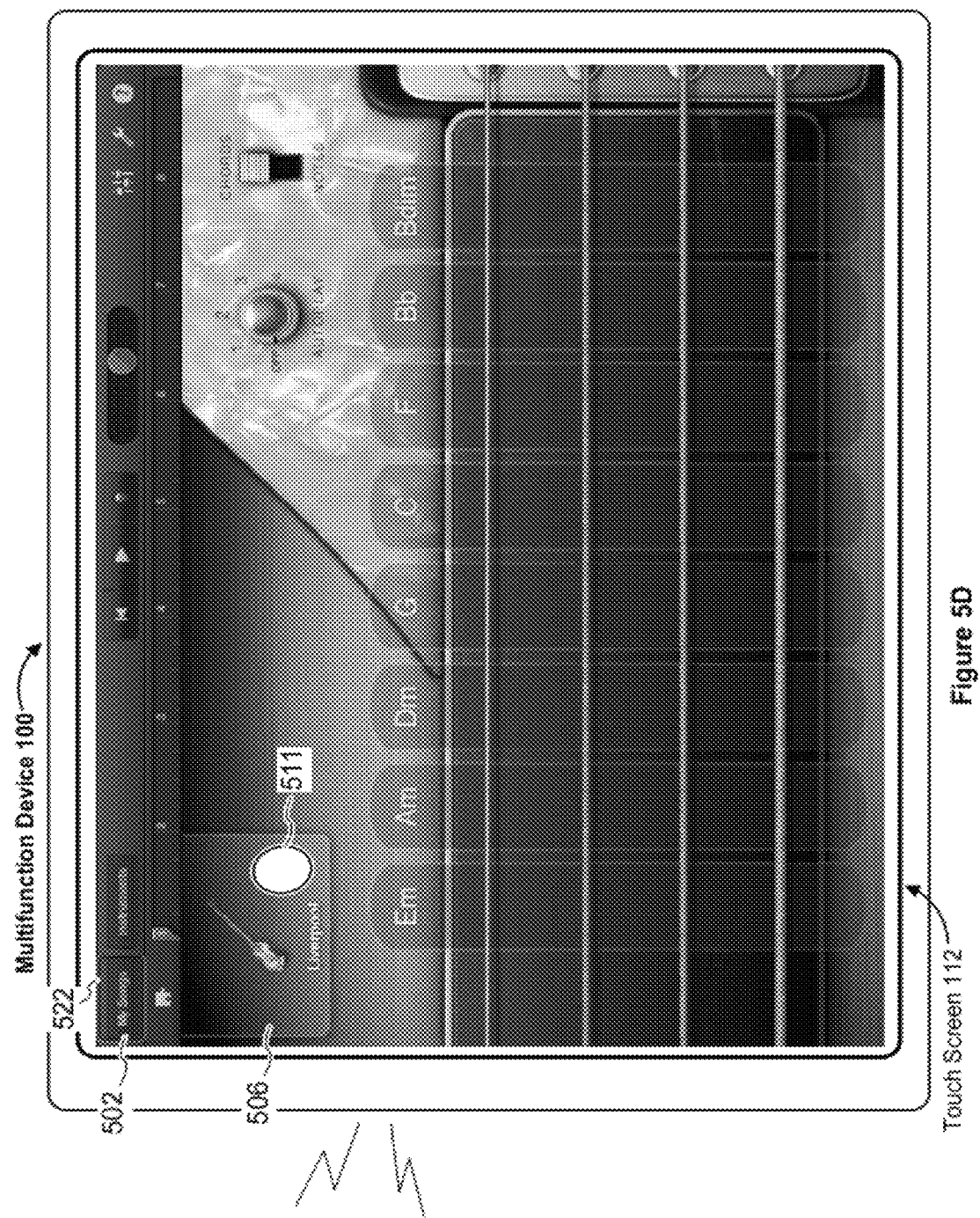

FIG. 5D illustrates that accessibility cursor 522 is displayed around button 502. In addition, audible accessibility information about button 502 is played (e.g., outputting "My Songs button").

Also in FIG. 5D, tap gesture 511 is detected at a location that corresponds to icon 506.

FIG. 5E illustrates that in response to detecting tap gesture 511 (FIG. 5D) at the location that corresponds to icon 506, accessibility cursor 522 (FIG. 5D) is replaced with accessibility cursor 524 around icon 506. In addition, audible accessibility information about icon 506 is played (e.g., outputting "instrument sound icon" and/or "Liverpool guitar"). Note that the response to tap gesture 511 in the first accessibility mode is different from the response to tap gesture 505 at the same location in the sighted mode.

FIG. 5E also illustrates that tap gesture 513 is detected at a location that corresponds to guitar chord 512 and guitar string 518.

Figure 5F:
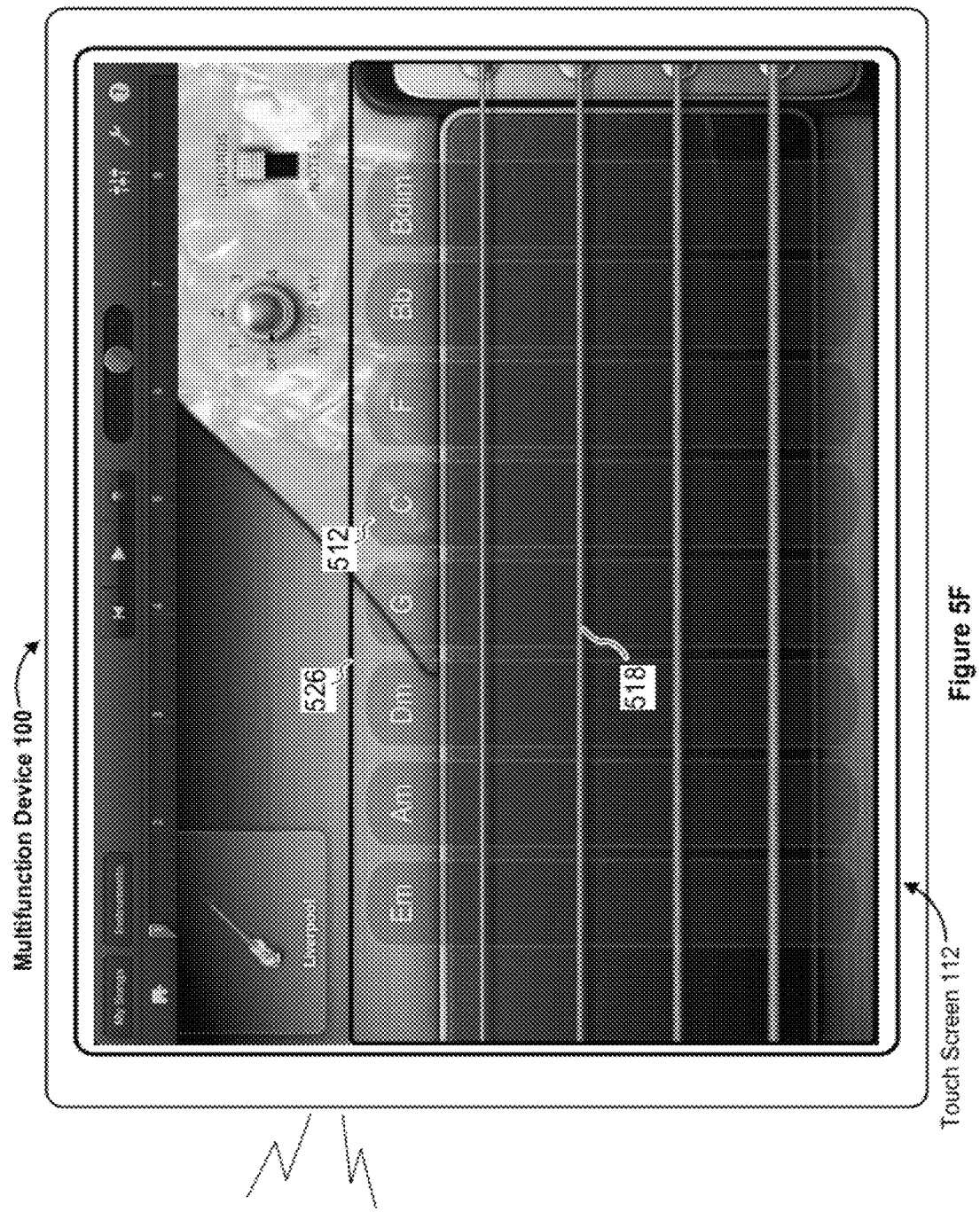

In FIG. 5F, accessibility cursor 524 (FIG. 5E) is replaced with accessibility cursor 526 around a guitar string area that includes the displayed guitar strings and guitar chord indicators. In addition, audible accessibility information about the guitar string area is played (e.g., outputting "Guitar string area. This is a direct touch area.").

Figure 5G:
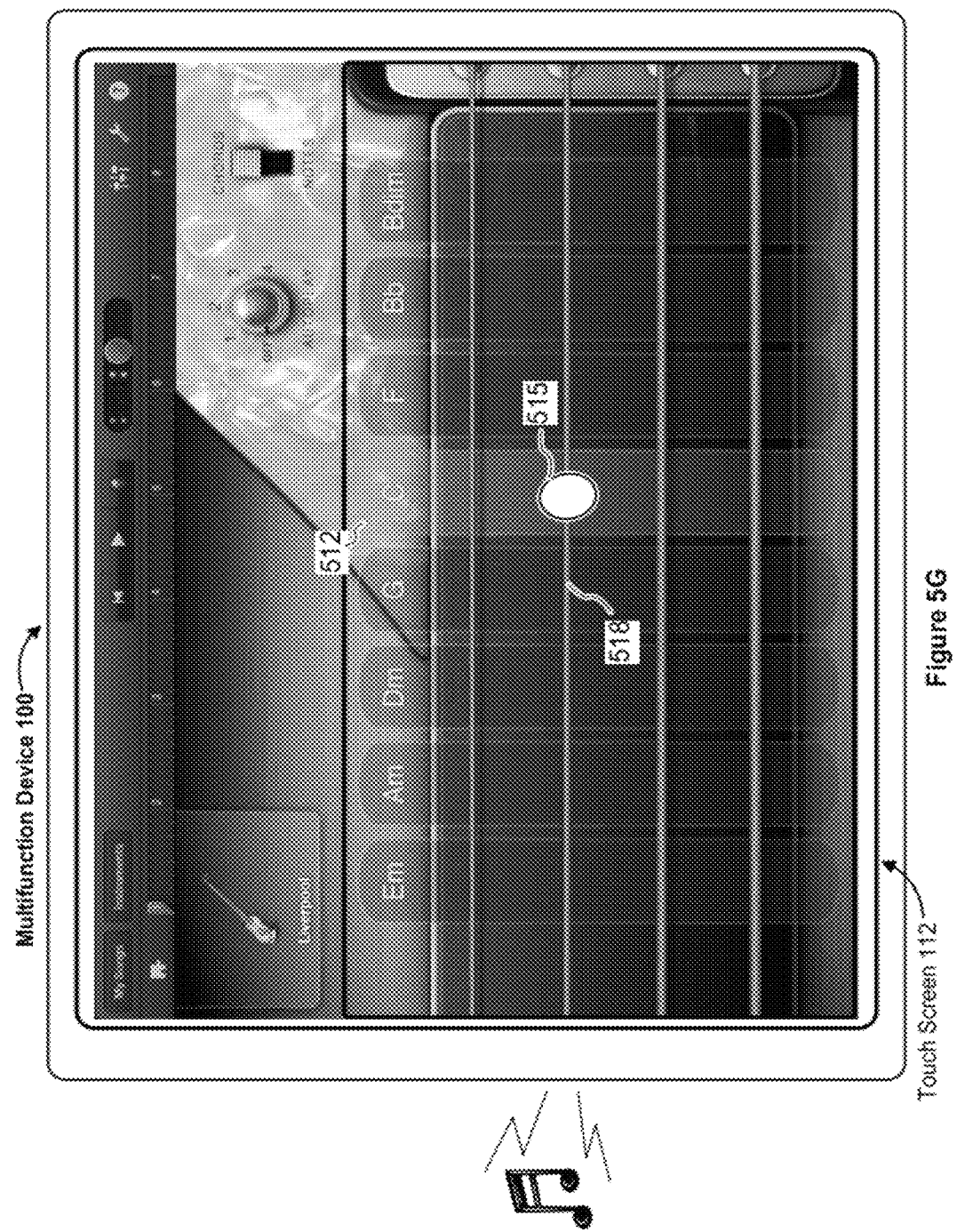

FIG. 5G illustrates that, after tap gesture 513 is detected, tap gesture 515 is detected at a location that corresponds to guitar chord 512 and guitar string 518. In response, sound that corresponds to guitar chord 512 and guitar string 518 is generated (or played) as in the sighted mode, without outputting audible accessibility information (e.g., about the guitar string area, guitar chord 512 and/or guitar string 518).

Figure 5H:
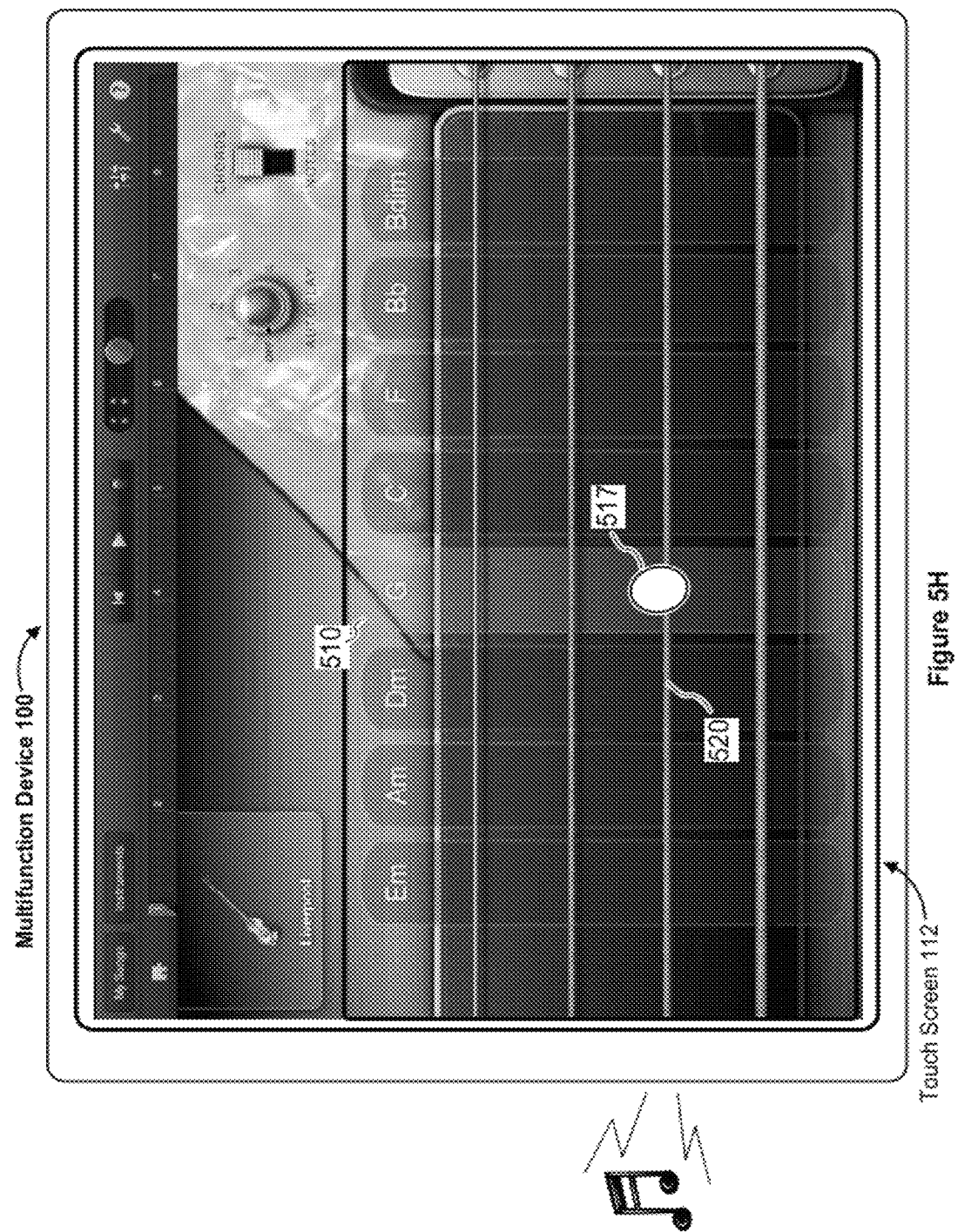

In FIG. 5H, tap gesture 517 is detected at a location that corresponds to guitar chord 510 and guitar string 520. In response, sound that corresponds to guitar chord 510 and guitar string 520 is generated (or played) as in the sighted mode, without outputting audible accessibility information (e.g., about the guitar string area, guitar chord 510 and/or guitar string 520).

Figure 5I:
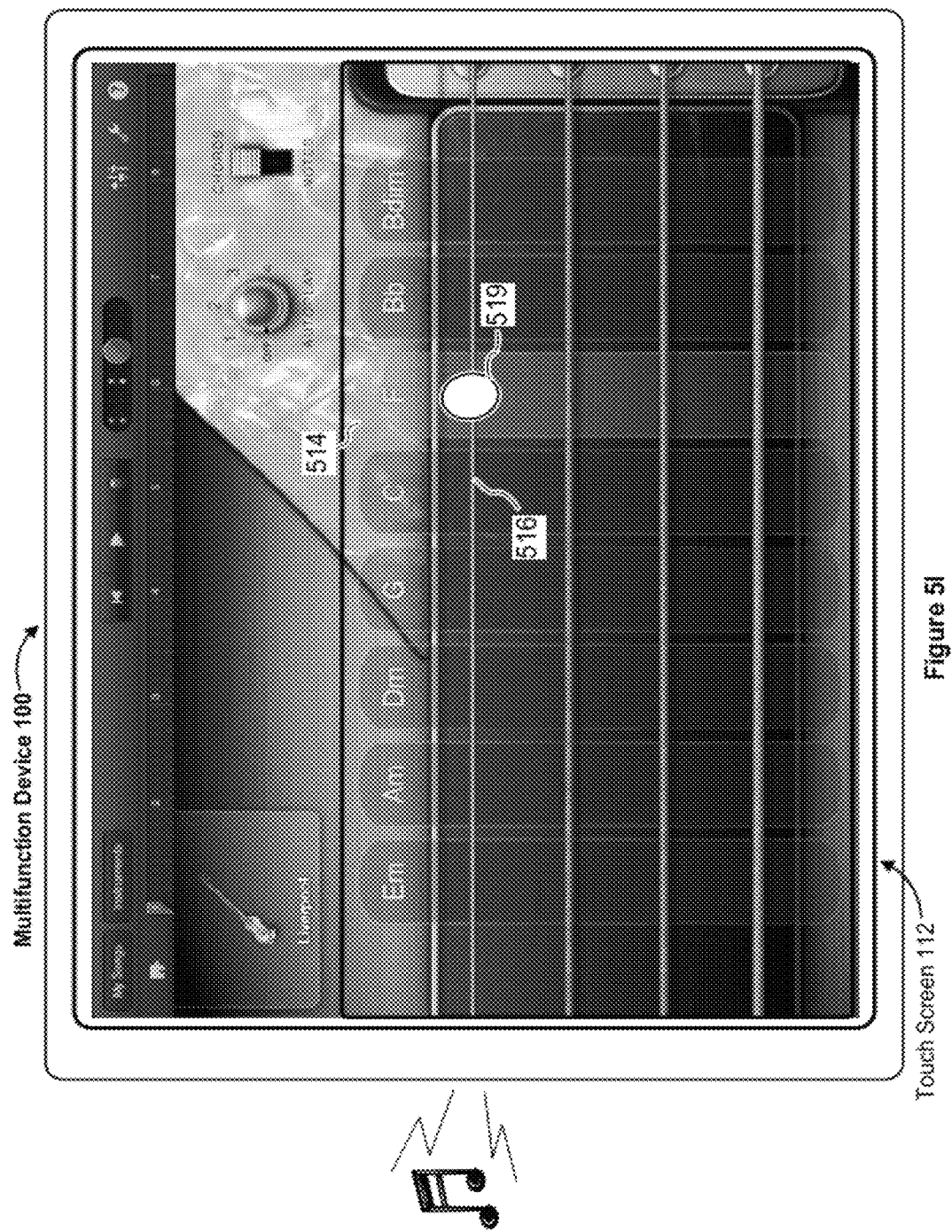

FIG. 5I illustrates that tap gesture 519 is detected at a location that corresponds to guitar chord 514 and guitar string 516. In response, sound that corresponds to guitar chord 514 and guitar string 516 is generated (or played) as in the sighted mode, without outputting audible accessibility information (e.g., about the guitar string area, guitar chord 514 and/or guitar string 516).

Figure 5J:
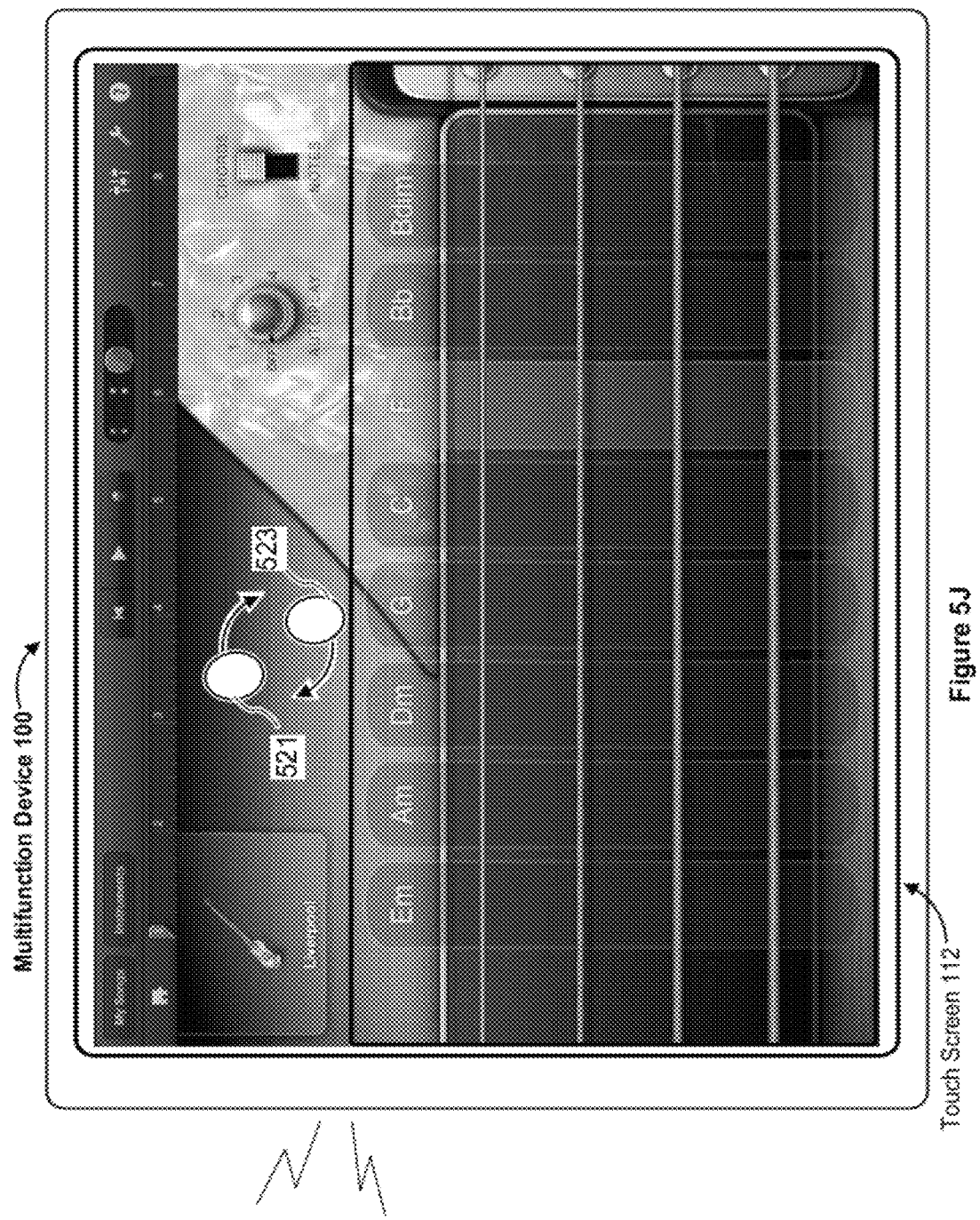

In FIG. 5J, a two-finger rotation gesture including finger contacts 521 and 523 is detected on touch screen 112.

Figure 5K:
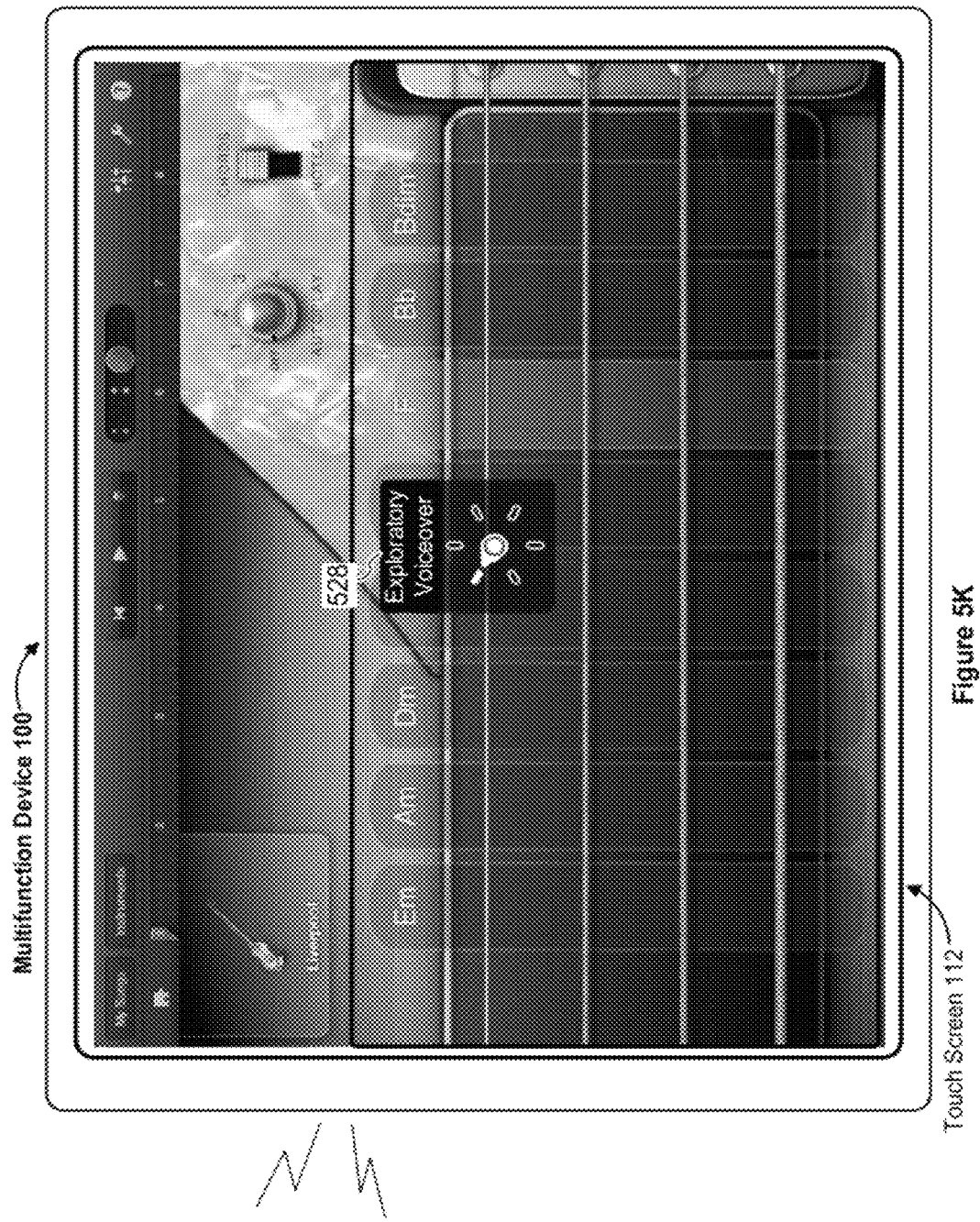

FIG. 5K illustrates that in response to the two-finger rotation gesture (FIG. 5J), the device switches from the first accessible mode (e.g., the direct touch screen reader mode) to a second accessible mode (e.g., sometimes called an exploratory screen reader mode, such as Exploratory Voiceover 528). Typically, audible accessibility information about the second accessible mode is played (e.g., outputting "Exploratory voice over mode").

Figure 5L:
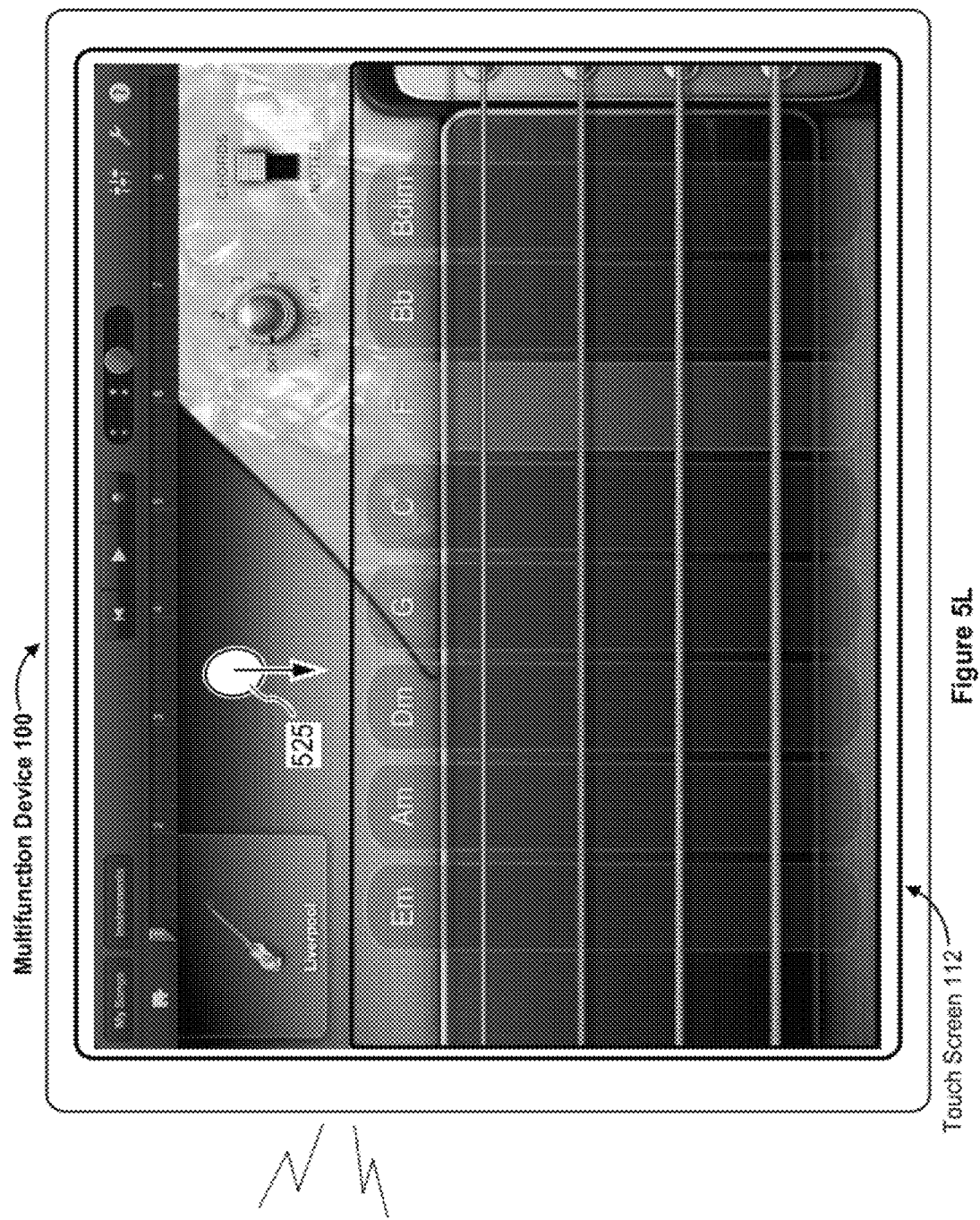

FIG. 5L illustrates an alternative embodiment for switching from the first accessible mode to the second accessible mode. In this embodiment, an additional gesture after the two-finger rotation gesture (FIG. 5J) is needed to switch between the first accessible mode and the second accessible mode. For example, single-finger swipe-down gesture 525 may be used to switch from the first accessible mode to the second accessible mode. Similarly, a single-finger swipe-up gesture (not shown) may be used to switch from the second accessible mode to the first accessible mode. Alternatively, the single-finger swipe-up gesture may be used to switch from the second accessible mode to the first accessible mode, and the single-finger swipe-down gesture 525 may be used to switch from the first accessible mode to the second accessible mode. In some instances, the single-finger swipe-up gesture alternates the mode of the device between the first accessible mode and the second accessible mode. For example, a first single-finger swipe-up gesture may be used to switch the device from the first accessible mode to the second accessible mode, and a second subsequent single-finger swipe-up gesture may be used to switch the device from the second accessible mode to the first accessible mode. Similarly, the single-finger swipe-down gesture may also alternate the mode of the device between the first accessible mode and the second accessible mode.

FIGS. 5M-5Q illustrate operations of the electronic device operating in the second accessible mode (e.g., the exploratory screen reader mode).

Figure 5M:
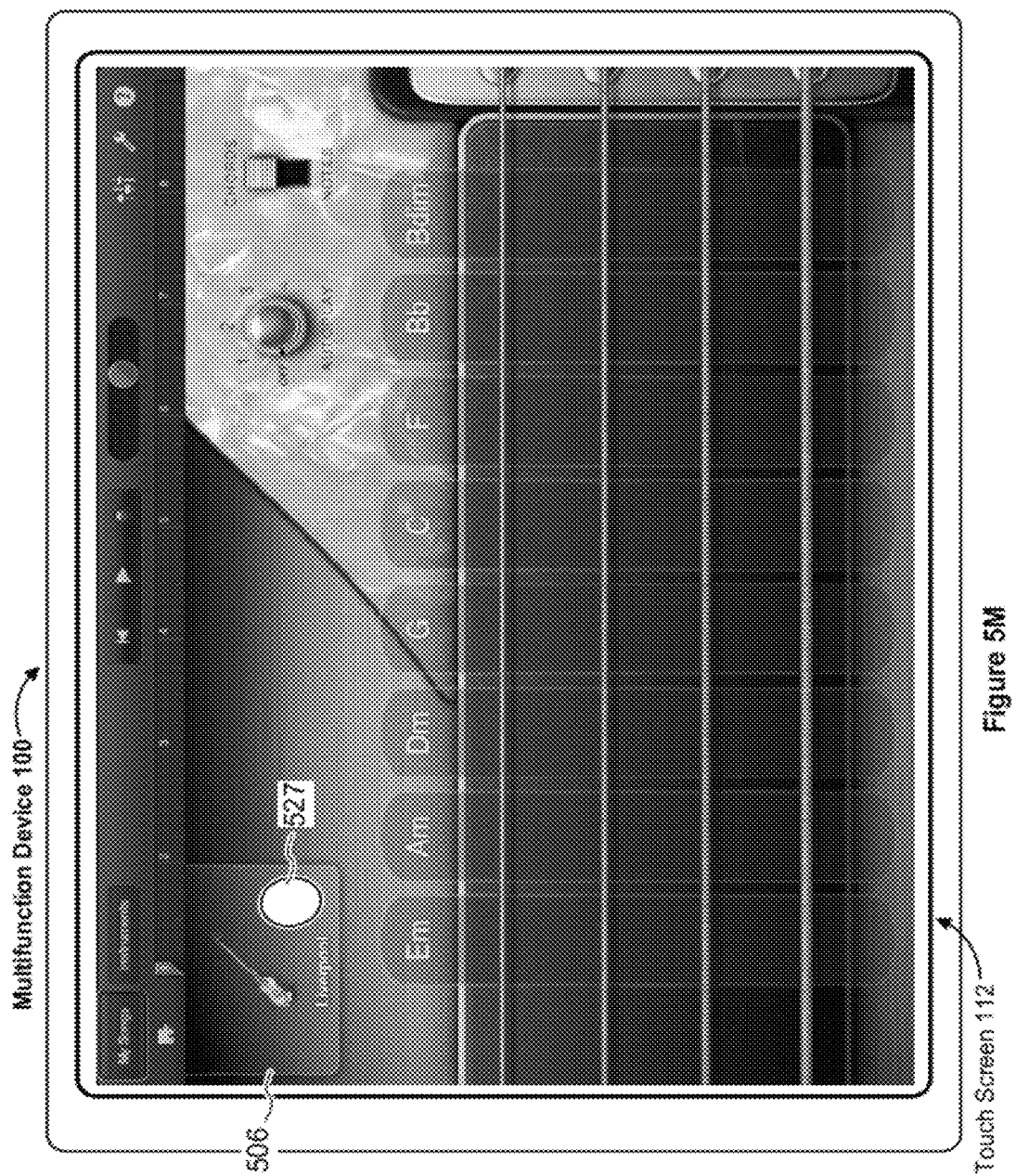

In FIG. 5M, the device is operating in the second accessible mode in response to the two-finger rotation gesture (FIG. 5K) or a swipe gesture 525 (FIG. 5L). In FIG. 5M, tap gesture 527 is detected at a location that corresponds to icon 506.

FIG. 5N illustrates that, in response to tap gesture 527 (FIG. 5M), accessibility cursor 524 is displayed around icon 506. In addition, audible accessibility information about icon 506 is played (e.g., outputting "instrument sound icon" and/or "Liverpool guitar"). In this example, the response to the tap gesture on icon 506 is the same in the first accessible mode and the second accessible mode (but different from the response in the sighted mode).

Figure 5O:
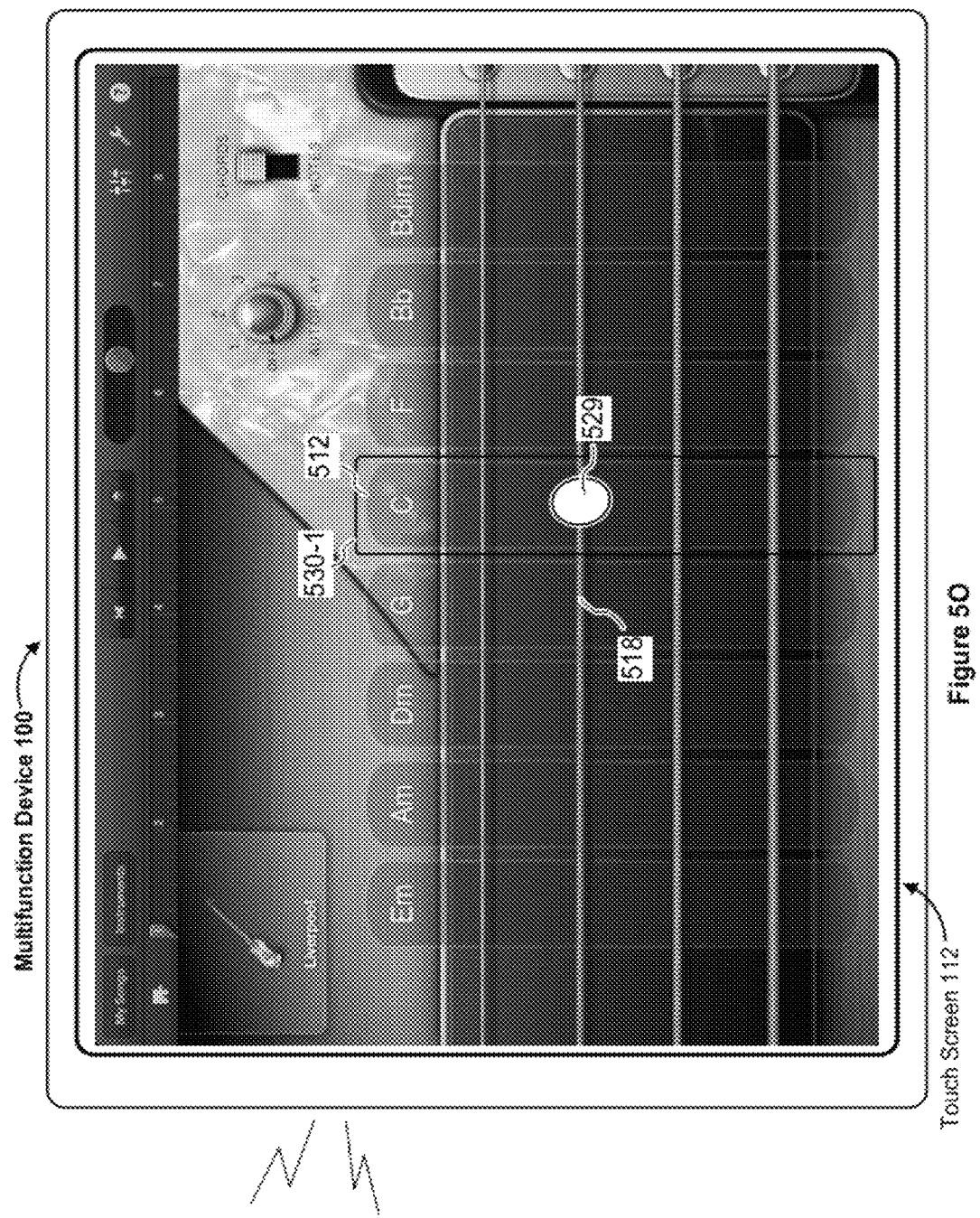

In FIG. 5O, tap gesture 529 is detected at a location that corresponds to guitar chord 512 and guitar string 518. In response, accessibility cursor 530-1 is displayed around guitar chord indicator 512. In addition, audible accessibility information that corresponds to guitar chord 512 is generated (e.g., outputting "C chord"). In the second accessible mode, additional input may be required to output the standard sound of the C chord, but this mode allows the user to explore in more detail the user interface elements that make up the guitar string area (e.g., by listening to audible accessibility information about each of the user interface elements as the user's finger moves around in the guitar string area).

FIG. 5P illustrates that tap gesture 531 is detected at a location that corresponds to guitar chord 510 and guitar string 520. In response, accessibility cursor 530-2 is displayed around guitar chord indicator 510. In addition, audible accessibility information that corresponds to guitar chord 510 is generated (e.g., outputting "G chord"). In the second accessible mode, additional input may be required to output the standard sound of the G chord (e.g., split tapping or a single-finger double tap gesture anywhere on the touch-sensitive surface, as described in Table 1 above).

FIG. 5Q illustrates that tap gesture 533 is detected at a location that corresponds to guitar chord 514 and guitar string 516. In response, accessibility cursor 530-3 is displayed around guitar chord indicator 514. In addition, audible accessibility information that corresponds to guitar chord 514 is generated (e.g., outputting "F chord"). In the second accessible mode, additional input may be required to output the standard sound of the F chord.

Figure 6A:
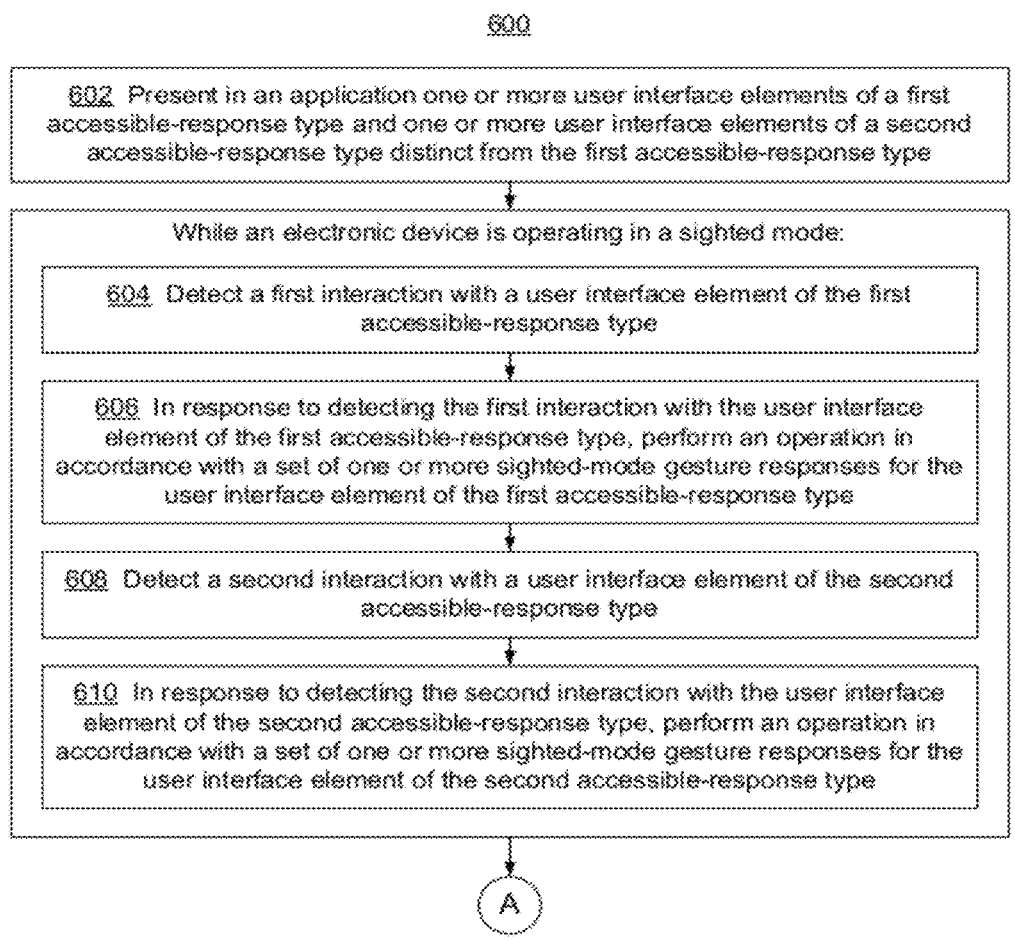
Figure 6B:
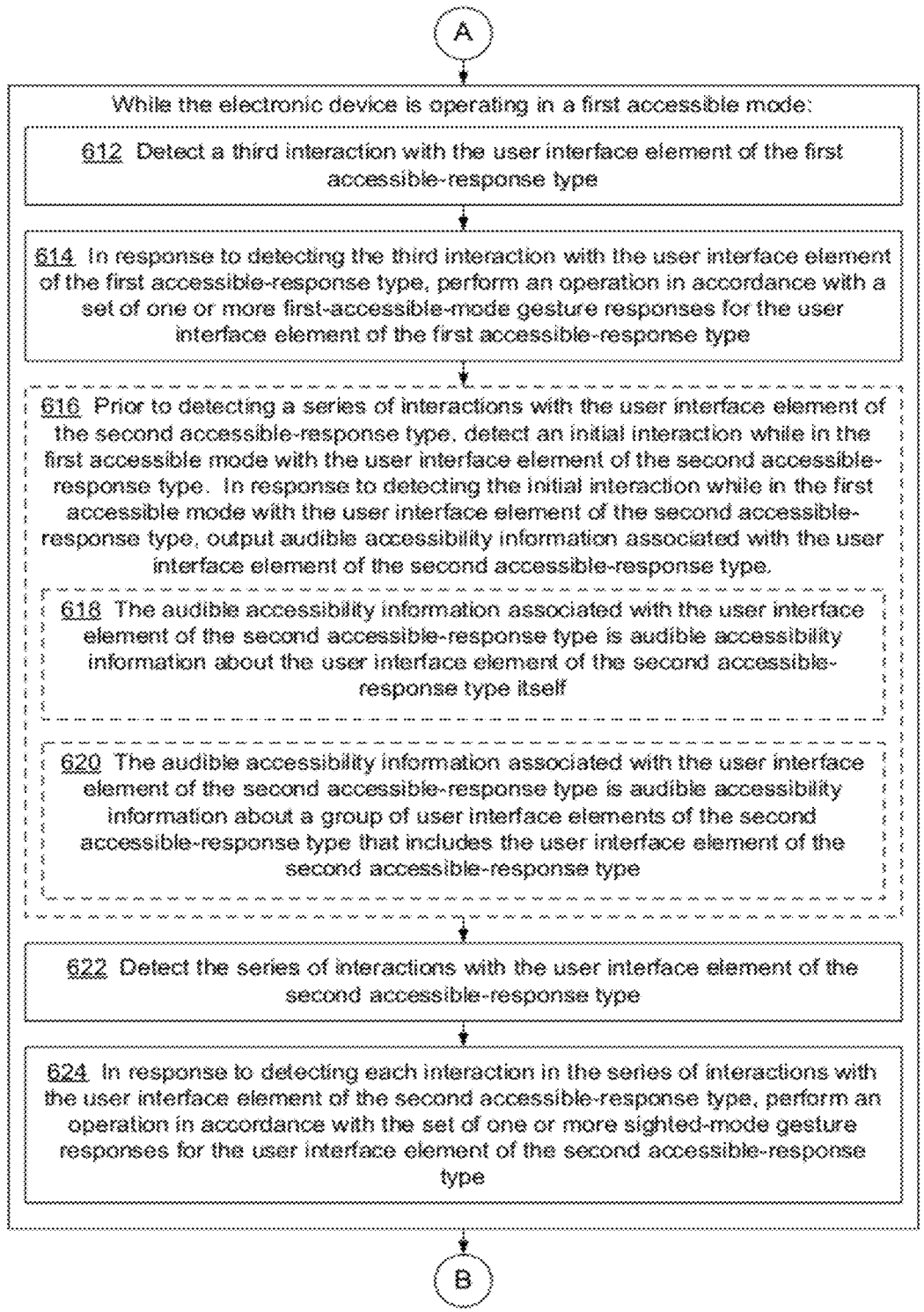

FIGS. 6A-6C are flow diagrams illustrating method 600 of providing accessibility using a touch-sensitive surface in accordance with some embodiments. Method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to provide accessibility using a touch-sensitive surface. The method reduces the cognitive burden on a user when activating user interface elements, thereby creating a more efficient human-machine interface. For battery-operated electronic devices, enabling a user to activate user interface elements faster and more efficiently conserves power and increases the time between battery charges.

The device presents (e.g., displaying and/or making audible) in an application one or more user interface elements of a first accessible-response type (e.g., button 502, button 504, and icon 506, FIG. 5A) and one or more user interface elements of a second accessible-response type distinct from the first accessible-response type (e.g., guitar chords 510, 512, and 514 and guitar strings 516, 518, and 520, FIG. 5A) (602). In some embodiments, the device outputs audible description of at least a subset of the one or more user interface elements of the first accessible-response type and the one or more user interface elements of the second accessible-response type without displaying the one or more user interface elements of the first accessible-response type and the one or more user interface elements of the second accessible-response type. In other words, the device may present the one or more user interface elements of the first accessible-response type and the one or more user interface elements of the second accessible-response type, visually (e.g., by display on touch screen 112), aurally (e.g., with a voice description), or both. The user interface elements of the first accessible-response type and the user interface elements of the second accessible-response type are typically defined by an application developer at the time the application is designed.

While the electronic device is operating in a sighted mode, the device detects (604) a first interaction with a user interface element of the first accessible-response type (e.g., tap gesture 505 on icon 506, FIG. 5A).

In response to detecting the first interaction with the user interface element of the first accessible-response type, the device performs (606) an operation in accordance with a set of one or more sighted-mode gesture responses for the user interface element of the first accessible-response type (e.g., displaying popup menu 508, FIG. 5B).

The device detects (608) a second interaction with a user interface element of the second accessible-response type (e.g., tap gesture 509 on chord 512 or a finger strumming gesture on guitar string 518, FIG. 5C).

In response to detecting the second interaction with the user interface element of the second accessible-response type, the device performs (610) an operation in accordance with a set of one or more sighted-mode gesture responses for the user interface element of the second accessible-response type (e.g., outputting sound that corresponds to playing chord 512 or strumming guitar string 518, FIG. 5C).

While the electronic device is operating in a first accessible mode (e.g., a first screen reader mode such as the direct touch screen reader mode), the device detects (612, FIG. 6B) a third interaction with the user interface element of the first accessible-response type (e.g., tap gesture 511 on icon 506, FIG. 5D).

In response to detecting the third interaction with the user interface element of the first accessible-response type, the device performs (614) an operation in accordance with a set of one or more first-accessible-mode gesture responses for the user interface element of the first accessible-response type (e.g., outputting audible accessibility information about icon 506, FIG. 5E, such as "instrument sound icon" and/or "Liverpool guitar"). In some embodiments, the set of one or more first-accessible-mode gesture responses for the user interface element of the first accessible-response type includes outputting audible accessibility information associated with the user interface element of the first accessible-response type.

In some embodiments, prior to detecting a series of interactions with the user interface element of the second accessible-response type, the device detects (616) an initial interaction while in the first accessible mode with the user interface element of the second accessible-response type (e.g., detecting an initial finger contact on chord 512 or guitar string 518, FIG. 5E). In response to detecting the initial interaction while in the first accessible mode with the user interface element of the second accessible-response type, the device outputs audible accessibility information associated with the user interface element of the second accessible-response type (e.g., outputting audible accessibility information about chord 512 or guitar string 518 or a guitar string area surrounded by accessibility cursor 526 that includes chord 512 and guitar string 518, FIG. 5F, such as "Guitar string area. This is a direct touch area."). This allows a user to quickly identify the user interface element of the second accessible-response type (or a group of user interface elements of the second accessible-response type) without having to switch modes between an accessible mode to hear "Guitar string area" and a sighted mode to play strings in the guitar string area, thereby creating a more efficient human-machine interface.

In some embodiments, the audible accessibility information associated with the user interface element of the second accessible-response type is (618) audible accessibility information about the user interface element of the second accessible-response type itself (e.g., outputting "C chord" when the user touches C chord 512 in FIG. 5E).

Alternatively, in some embodiments, the audible accessibility information associated with the user interface element of the second accessible-response type is (620) audible accessibility information about a group of user interface elements of the second accessible-response type that includes the user interface element of the second accessible-response type (e.g., outputting "Guitar string area. This is a direct touch area." when the user touches C chord 512 or any other user interface element in the group of user interface elements that make up guitar string area surrounded by accessibility cursor 526 in FIG. 5F).

The device detects (622) a series of interactions with the user interface element of the second accessible-response type (e.g., a series of tap gestures 515, 517, and 519 on chord 512, 510, and 514 or a series of finger strumming gestures on guitar strings 518, 520, and 516, FIGS. 5G-5I).

In response to detecting each interaction in the series of interactions with the user interface element of the second accessible-response type, the device performs (624) an operation in accordance with the set of one or more sighted-mode gesture responses for the user interface element of the second accessible-response type, without outputting audible accessibility information associated with user interface element of the second accessible-response type (e.g., outputting sounds that correspond to repeatedly playing a chord, such as chord 512 or repeatedly strumming a guitar string 518, FIG. 5G). Alternatively, the series of interactions may involve playing multiple UI elements of the second accessible-response type that are grouped together, such as the chords 510, 512, and 514 and/or strings 516, 518, and 520 in the guitar string area, FIG. 5A, without outputting audible accessibility information as each of the UI elements in the group is played. In other words, the UI elements of the second accessible-response type respond in the first accessible mode like they do in the sighted mode, without repeatedly outputting audible accessibility information that would interfere with playing the guitar strings in a standard manner. As explained above, however, in the first accessible mode, there may be an initial output of audible accessibility information about the UI element or group of UI elements of the second accessible-response type, which is not repeated during subsequent interactions with the UI element or group of UI elements while in the first accessible mode. In contrast, audible accessibility information about a UI element of the first accessible-response type (e.g., a button) is typically output repeatedly during interactions in the first accessible mode.

In some embodiments, while the electronic device is operating in the first accessible mode, the device detects (626, FIG. 6C) an input (e.g., a rotor gesture on the touch-sensitive surface, such as the two-finger rotation gesture shown in FIG. 5J, with or without additional finger gestures (such as an up or down flick gesture shown in FIG. 5L), to change between the direct touch screen reader mode and the exploratory screen reader mode). In response to detecting the input, the device changes from the first accessible mode to a second accessible mode distinct from the first accessible mode (e.g., changing from the direct touch screen reader mode to the exploratory screen reader mode). Thus, a user with impaired vision can easily switch from the direct touch screen reader mode (which enables some UI element(s) to respond and present standard audible information like in a sighted mode) to an exploratory screen reader mode (which enables more detailed audible accessibility information about the UI element(s)) to be provided to the user as the user explores the user interface.

In some embodiments, while the electronic device is operating in a second accessible mode distinct from the first accessible mode (e.g., a second screen reader mode such as the exploratory screen reader mode), the device detects (628) a fourth interaction with the user interface element of the first accessible-response type (e.g., tap gesture 527 on icon 506, FIG. 5M). In response to detecting the fourth interaction with the user interface element of the first accessible-response type, the device performs an operation in accordance with a set of one or more second-accessible-mode gesture responses for the user interface element of the first accessible-response type (e.g., outputting audible accessibility information about icon 506, FIG. 5N, such as "instrument sound icon" and/or "Liverpool guitar"). The device detects a fifth interaction with the user interface element of the second accessible-response type (e.g., finger contact 529 on chord 512, FIG. 5O). In response to detecting the fifth interaction with the user interface element of the second accessible-response type, the device performs an operation in accordance with a set of one or more second-accessible-mode gesture responses for the user interface element of the second accessible-response type (e.g., outputting "C chord" when the user touches C chord 512 in FIG. 5O). In some embodiments, the set of one or more second-accessible-mode gesture responses for the user interface element of the second accessible-response type includes outputting audible accessibility information associated with the user interface element of the second accessible-response type.

In some embodiments, the set of one or more second-accessible-mode gesture responses for the user interface element of the first accessible-response type is (630) the same as the set of one or more first-accessible-mode gesture responses for the user interface element of the first accessible-response type. In some embodiments, user interface elements of the first accessible-response type (e.g., buttons 502 and 504 and icon 506, FIG. 5A) respond the same way in the second accessible mode as they do in the first accessible mode.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 700 and 800 (e.g., FIGS. 7A-7C and 8A-8B respectively) are also applicable in an analogous manner to method 600 described above with respect to FIGS. 6A-6C. For example, the operations described above with reference to method 600 may have one or more of the characteristics of placing or changing the current focus as described herein with reference to method 800. For brevity, these details are not repeated here.

FIGS. 7A-7C are flow diagrams illustrating a method 700 of providing accessibility using a touch-sensitive surface in accordance with some embodiments. Method 700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to provide accessibility for user interface objects. The method reduces the cognitive burden on a user when activating user interface elements, thereby creating a more efficient human-machine interface. For battery-operated electronic devices, enabling a user to activate user interface elements faster and more efficiently conserves power and increases the time between battery charges.

The device (702) presents (e.g., displaying and/or making audible) in an application one or more user interface elements of a first accessible-response type (e.g., button 502, button 504, and icon 506, FIG. 5A) and one or more user interface elements of a second accessible-response type distinct from the first accessible-response type (e.g., guitar chords 510, 512, and 514 and guitar strings 516, 518, and 520, FIG. 5A). The user interface elements of the first accessible-response type and the user interface elements of the second accessible-response type are typically defined by an application developer at the time the application is designed.

For a respective user interface element of the first accessible-response type (e.g., button 502, button 504, and icon 506, FIG. 5A), when the electronic device is operating in a sighted mode, the device responds (704) to detected interactions with the respective user interface element of the first accessible-response type by performing operations in accordance with a respective set of one or more sighted-mode gesture responses for the respective user interface element of the first accessible-response type (e.g., respond to tap gesture 505 on icon 506, FIG. 5A, by displaying popup menu 508, FIG. 5B).

When the electronic device is operating in a first accessible mode (e.g., a first screen reader mode such as the direct touch screen reader mode), the device responds (706) to detected interactions with the respective user interface element of the first accessible-response type by performing operations in accordance with a respective set of one or more first-accessible-mode gesture responses for the respective user interface element of the first accessible-response type (e.g., the device responds to tap gesture 511 on icon 506, FIG. 5D, by outputting audible accessibility information about icon 506, FIG. 5E, such as "instrument sound icon" and/or "Liverpool guitar"). Table 1 lists exemplary accessible mode gestures and responses that may occur in both the first accessible mode and the second accessible mode, depending on the accessible-response type of the user interface element with the current focus.

For a respective user interface element of the second accessible-response type (e.g., guitar chords 510, 512, and 514 and guitar strings 516, 518, and 520, FIG. 5A), when the electronic device is operating in the sighted mode, the device responds (708, FIG. 7B) to detected interactions with the respective user interface element of the second accessible-response type by performing operations in accordance with a respective set of one or more sighted-mode gesture responses for the respective user interface element of the second accessible-response type (e.g., responding to tap gesture 509 on chord 512 or a finger strumming gesture on guitar string 518, FIG. 5C, by outputting sound that corresponds to playing chord 512 or strumming guitar string 518, FIG. 5C, without outputting accessibility information).

In some embodiments, for the respective user interface element of the second accessible-response type, when the electronic device is operating in the first accessible mode, prior to detecting a series of interactions with the respective user interface element of the second accessible-response type, the device responds (710) to detecting an initial interaction while in the first accessible mode with the respective user interface element of the second accessible-response type by outputting audible accessibility information associated with the respective user interface element of the second accessible-response type (e.g., responding to detecting initial finger contact 513 on chord 512 or guitar string 518, FIG. 5E, by outputting audible accessibility information about chord 512 or guitar string 518 or a guitar string area surrounded by accessibility cursor 526 that includes chord 512 and guitar string 518, FIG. 5F, such as "Guitar string area. This is a direct touch area."). This allows a user to quickly identify the user interface element of the second accessible-response type (or a group of user interface elements of the second accessible-response type) without having to switch modes between an accessible mode to hear "Guitar string area" and a sighted mode to play strings in the guitar string area, thereby creating a more efficient human-machine interface.

In some embodiments, the audible accessibility information associated with the respective user interface element of the second accessible-response type is (712) audible accessibility information about the respective user interface element of the second accessible-response type itself (e.g., outputting "C chord" when the user touches C chord 512 in FIG. 5E).

Alternatively, in some embodiments, the audible accessibility information associated with the respective user interface element of the second accessible-response type is (714) audible accessibility information about a group of user interface elements of the second accessible-response type that includes the respective user interface element of the second accessible-response type (e.g., outputting "Guitar string area. This is a direct touch area." when the user touches C chord 512 or any other user interface element in the group of user interface elements that make up guitar string area surrounded by accessibility cursor 526 in FIG. 5F).

When the electronic device is operating in the first accessible mode, the device responds (716) to each interaction in the series of detected interactions with the respective user interface element of the second accessible-response type by performing operations in accordance with the respective set of one or more sighted-mode gesture responses for the respective user interface element of the second accessible-response type, without outputting audible accessibility information associated with respective user interface element of the second accessible-response type (e.g., responding to a series of tap gestures 515 on chord 512 or a series of finger strumming gestures on guitar string 518, FIG. 5G, by outputting sound that corresponds to repeatedly playing chord 512 or repeatedly strumming guitar string 518, FIG. 5G). Alternatively, the series of interactions may involve playing multiple UI elements of the second accessible-response type that are grouped together, such as the chords 510, 512, and 514 and/or strings 516, 518, and 520 in guitar string area, FIG. 5A, without outputting audible accessibility information as each of the UI elements in the group is played.

In some embodiments, the presenting includes (718, FIG. 7C) presenting audible accessibility information in accordance with the respective set of one or more first-accessible-mode gesture responses for the respective user interface element of the first accessible-response type. For example, in response to tap gesture 511 on icon 506 (FIG. 5D), audible accessibility information about icon 506, such as "instrument sound icon" and/or "Liverpool guitar"), is output. In some embodiments, the presenting also includes presenting standard audible information (e.g., musical sounds from interacting with guitar string UI elements, drum UI elements, or other musical instruments represented as UI elements) in accordance with at least one of the one or more respective sighted-mode gesture responses for the respective user interface element of the second accessible-response type. For example, in response to tap gesture 515 (FIG. 5G) at a location corresponding to chord 512 and guitar string 518, sound that corresponds to chord 512 and guitar string 518 is output, without outputting accessibility information.

In some embodiments, for the respective user interface element of the first accessible-response type, when the electronic device is operating in a second accessible mode distinct from the first accessible mode (e.g., a second screen reader mode such as the exploratory screen reader mode), the device responds (720) to detected interactions with the respective user interface element of the first accessible-response type by performing operations in accordance with a respective set of one or more second-accessible-mode gesture responses for the respective user interface element of the first accessible-response type (e.g., responding to tap gesture 527 on icon 506, FIG. 5M, by outputting audible accessibility information about icon 506, FIG. 5N, such as "instrument sound icon" and/or "Liverpool guitar"). For the respective user interface element of the second accessible-response type, when the electronic device is operating in the second accessible mode, the device responds to detected interactions with the respective user interface element of the second accessible-response type in accordance with a respective set of one or more second-accessible-mode gesture responses for the respective user interface element of the second accessible-response type (e.g., responding to tap gesture 529 on chord 512, FIG. 5O, by outputting "C chord"). The respective set of one or more second-accessible-mode gesture responses for the respective user interface element of the second accessible-response type (e.g., Table 1) includes outputting audible accessibility information associated with the respective user interface element of the second accessible-response type.

In some embodiments, the respective set of one or more second-accessible-mode gesture responses for the user interface element of the first accessible-response type is (722) the same as the respective set of one or more first-accessible-mode gesture responses for the user interface element of the first accessible-response type (e.g., Table 1). In some embodiments, user interface elements of the first accessible-response type (e.g., buttons 502 and 504 and icon 506, FIG. 5A) respond the same way in the second accessible mode as they do in the first accessible mode.

In some embodiments, while the electronic device is operating in the first accessible mode, the device detects (724) an input (e.g., a rotor gesture on the touch-sensitive surface, such as the two-finger rotation gesture shown in FIG. 5J, with or without additional finger gestures (such as an up or down flick gesture shown in FIG. 5L), to change between the direct touch screen reader mode and the exploratory screen reader mode). In response to detecting the input, the device changes from the first accessible mode to a second accessible mode distinct from the first accessible mode (e.g., changing from the direct touch screen reader mode to the exploratory screen reader mode).

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600 and 800 (e.g., FIGS. 6A-6C and 8A-8B respectively) are also applicable in an analogous manner to method 700 described above with respect to FIGS. 7A-7C. For example, the operations described above with reference to method 700 may have one or more of the characteristics of placing or changing the current focus as described herein with reference to method 800. For brevity, these details are not repeated here.

Figure 8A:
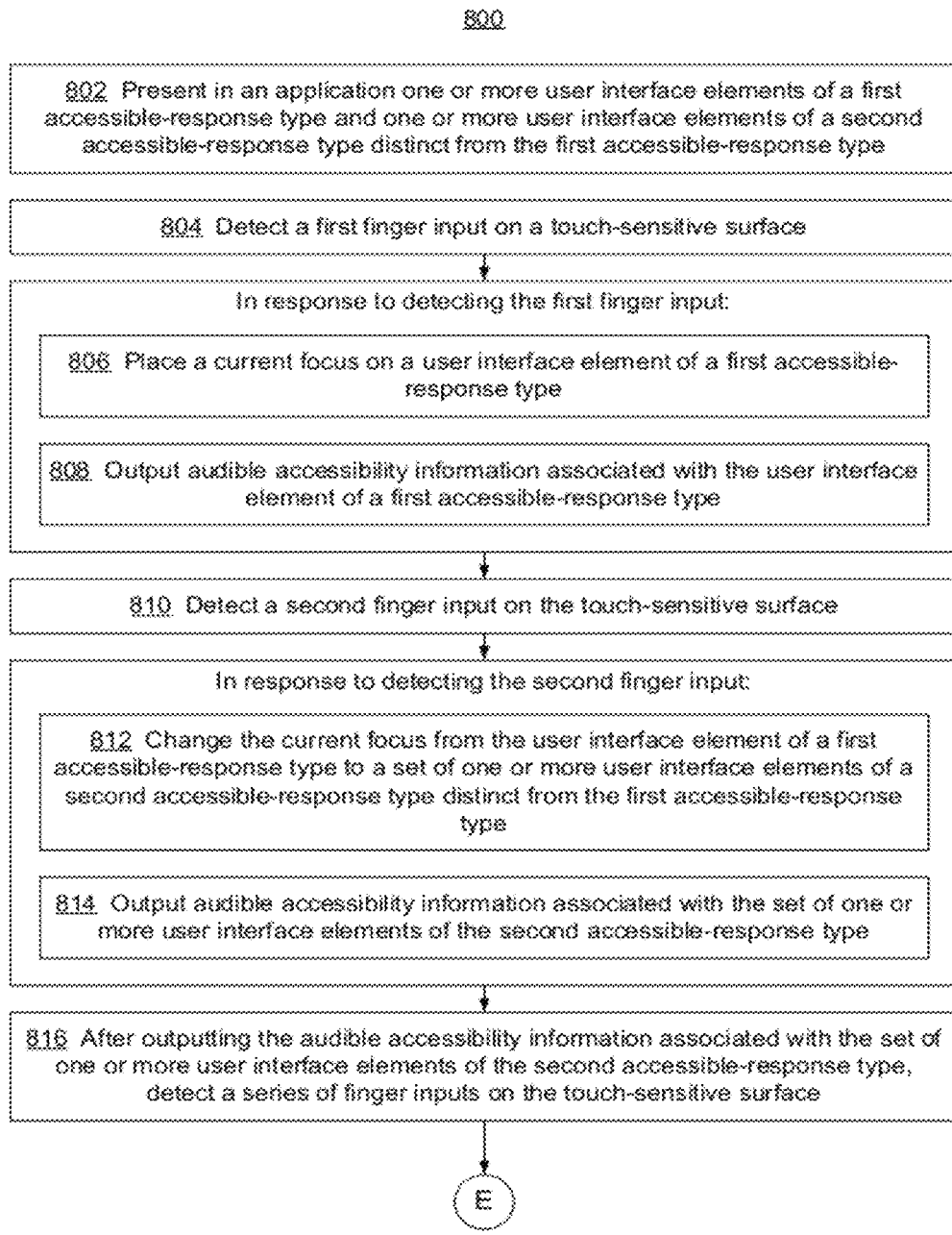
FIGS. 8A-8B are flow diagrams illustrating a method of providing accessibility using a touch-sensitive surface in accordance with some embodiments.
Figure 8B:
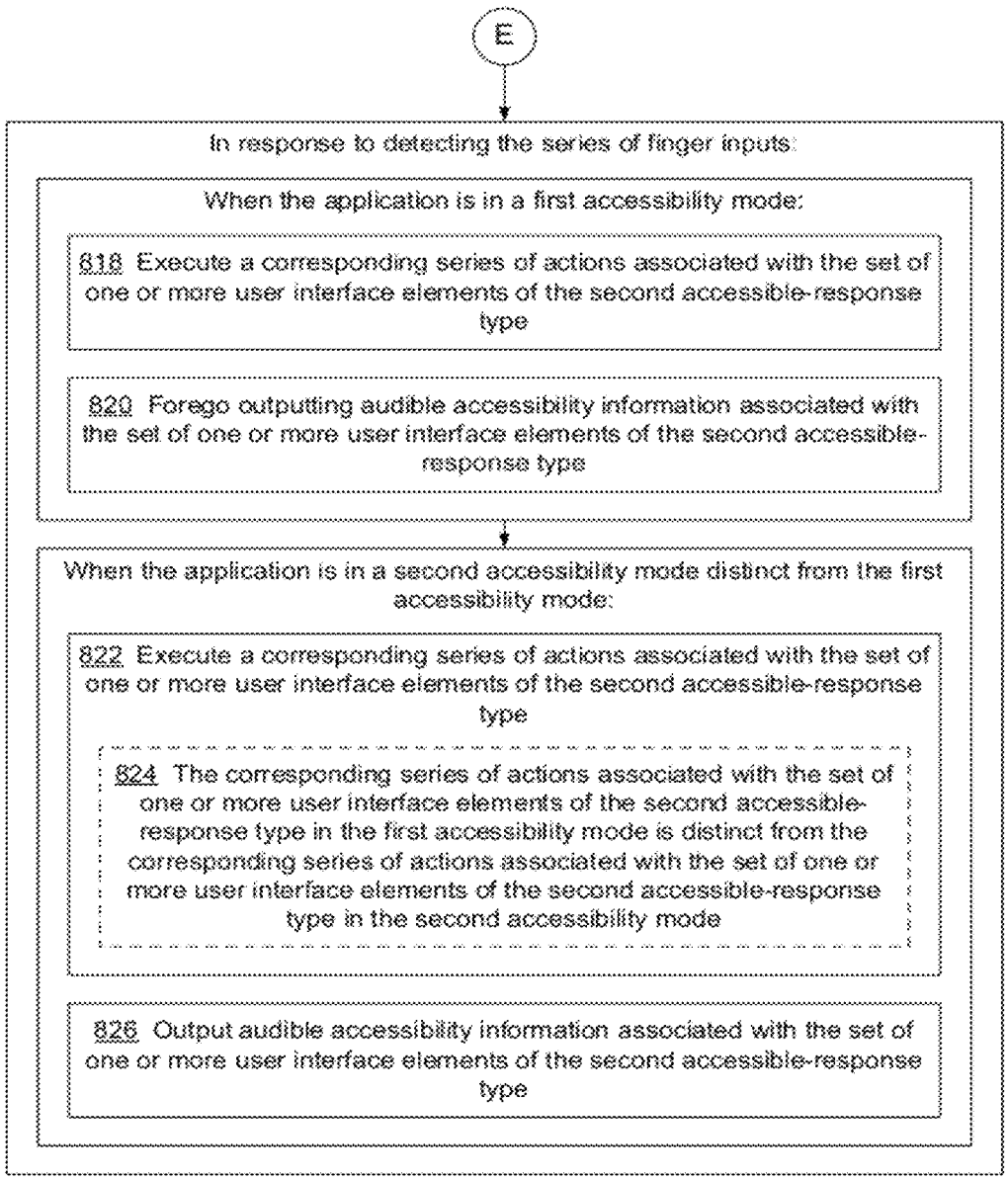

FIGS. 8A-8B are flow diagrams illustrating a method 800 of providing accessibility using a touch-sensitive surface in accordance with some embodiments. Method 800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides an intuitive way to provide accessibility using a touch-sensitive surface. The method reduces the cognitive burden on a user when activating user interface elements, thereby creating a more efficient human-machine interface. For battery-operated electronic devices, enabling a user to activate user interface elements faster and more efficiently conserves power and increases the time between battery charges.

The device presents (802) (e.g., displaying and/or making audible) in an application one or more user interface elements of a first accessible-response type (e.g., button 502, button 504, and icon 506, FIG. 5A) and one or more user interface elements of a second accessible-response type distinct from the first accessible-response type (e.g., guitar chords 510, 512, and 514 and guitar strings 516, 518, and 520, FIG. 5A).

The device detects (804) a first finger input on the touch-sensitive surface (e.g., tap gesture 511 on icon 506, FIG. 5D).

In response to detecting the first finger input, the device places (806) a current focus on a user interface element of a first accessible-response type (e.g., accessibility cursor 524, FIG. 5E, indicating the location of the current focus), and outputs (808) audible accessibility information associated with the user interface element of a first accessible-response type (e.g., outputting audible accessibility information about icon 506, FIG. 5E, such as "instrument sound icon" and/or "Liverpool guitar").

The device detects (810) a second finger input on the touch-sensitive surface (e.g., detecting initial finger contact 513 on chord 512 or guitar string 518, FIG. 5E).

In response to detecting the second finger input, the device changes (812) the current focus from the user interface element of a first accessible-response type to a set of one or more user interface elements of a second accessible-response type distinct from the first accessible-response type. In some embodiments, the set of one or more user interface elements of the second accessible-response type is a set or group of related elements, such as a set of guitar strings or a set of piano keys. The device outputs (814) audible accessibility information associated with the set of one or more user interface elements of the second accessible-response type (e.g., outputting audible accessibility information about guitar string area surrounded by accessibility cursor 526 that includes chord 512 and guitar string 518, FIG. 5F, such as "Guitar string area. This is a direct touch area.").

After outputting the audible accessibility information associated with the set of one or more user interface elements of the second accessible-response type, the device detects (816) a series of finger inputs on the touch-sensitive surface (e.g., a series of gestures 515, 517, and 519 on chords 512, 510, and 514 and/or guitar strings 518, 520, and 516, FIGS. 5G-5I). In some embodiments, the series of finger inputs are detected at a location on the touch-sensitive surface that corresponds to the set of one or more user interface elements of the second accessible-response type.

In response to detecting the series of finger inputs, when the application is in a first accessibility mode (e.g., a first screen reader mode such as the direct touch screen reader mode), the device executes (818, FIG. 8B) a corresponding series of actions associated with the set of one or more user interface elements of the second accessible-response type, and foregoes (820) outputting audible accessibility information associated with the set of one or more user interface elements of the second accessible-response type (e.g., outputting sounds that correspond to playing chords 512, 510, and 514 and/or guitar strings 518, 520, and 516, FIGS. 5G-5I, as if playing in a standard, sighted mode, without outputting audible accessibility information that would interfere with playing the guitar strings in a standard manner).

When the application is in a second accessibility mode distinct from the first accessibility mode (e.g., a second screen reader mode such as the exploratory screen reader mode), the device executes (822) a corresponding series of actions associated with the set of one or more user interface elements of the second accessible-response type (e.g., outputting sounds that correspond to playing chords 512, 510, and 514 and/or guitar strings 518, 520, and 516, and/or updating the user interface to highlight the chords 512, 510, and 514, respectively with or without animating guitar strings 518, 520, and 516, respectively), and outputs (826) audible accessibility information associated with the set of one or more user interface elements of the second accessible-response type.

In some embodiments, the corresponding series of actions associated with the set of one or more user interface elements of the second accessible-response type in the first accessibility mode is distinct (824) from the corresponding series of actions associated with the set of one or more user interface elements of the second accessible-response type in the second accessibility mode. For example, in the first accessibility mode, the series of actions correspond to those that also occur in a sighted mode, such as outputting standard audible information (e.g., guitar, piano, drum, or other sounds from UI elements that represent musical instruments) in response to single tap gestures. In contrast, in the second accessibility mode, the series of actions are output with audible accessibility information and additional gestures (e.g., a double tap gesture or a split tap gesture) may be needed to activate output of the standard audible information.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600 and 700 (e.g., FIGS. 6A-6C and 7A-7C respectively) are also applicable in an analogous manner to method 800 described above with respect to FIGS. 8A-8B. For example, the operations described above with reference to method 800 may have one or more of the characteristics of the mode switching operations described herein with reference to methods 600 and 700. For brevity, these details are not repeated here.

Figure 9:
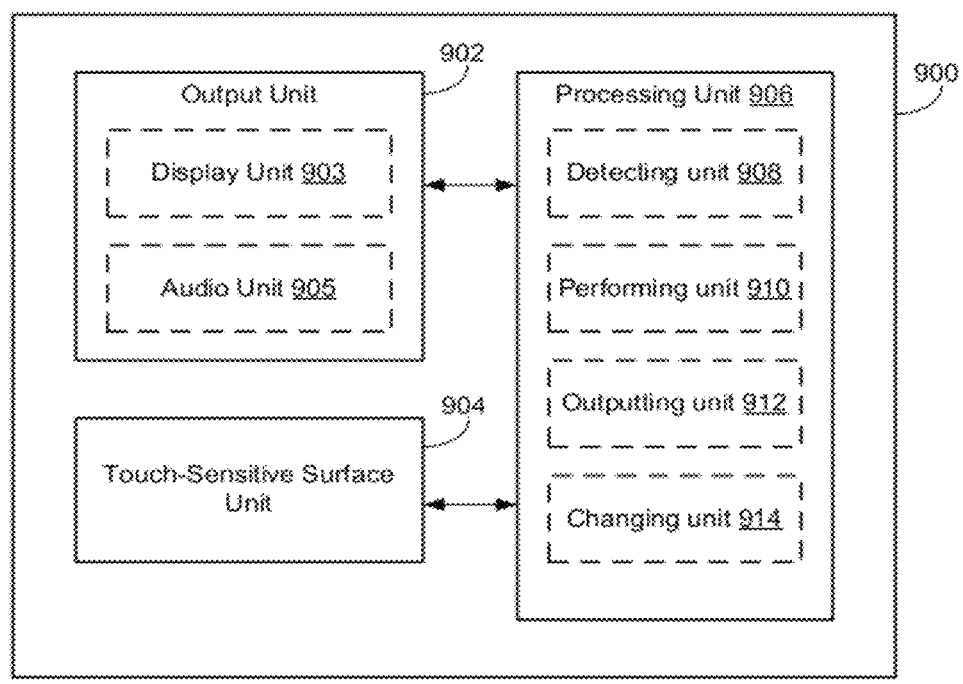
FIG. 9 is a functional block diagram of an electronic device in accordance with some embodiments.

In accordance with some embodiments, FIG. 9 shows a functional block diagram of electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 900 may be combined or separated into sub-blocks to implement the principles of the invention as described above. Therefore, the description herein may support any possible combination or separation or further definition of the functional blocks described herein.

As shown in FIG. 9, electronic device 900 includes output unit 902 configured to present in an application one or more user interface elements of a first accessible-response type and one or more user interface elements of a second accessible-response type distinct from the first accessible-response type; touch-sensitive surface unit 904 configured to receive user interaction with user interface elements; and processing unit 906 coupled to output unit 902 and touch-sensitive surface unit 904. In some embodiments, output unit 902 includes display unit 903 and/or audio unit 905. In some embodiments, processing unit 906 includes detecting unit 908, performing unit 910, outputting unit 912, and changing unit 914.

Processing unit 906 is configured to, while the electronic device is operating in a sighted mode: detect a first interaction with a user interface element of the first accessible-response type (e.g., with detecting unit 908); in response to detecting the first interaction with the user interface element of the first accessible-response type, perform an operation in accordance with a set of one or more sighted-mode gesture responses for the user interface element of the first accessible-response type (e.g., with performing unit 910); detect a second interaction with a user interface element of the second accessible-response type (e.g., with detecting unit 908); and, in response to detecting the second interaction with the user interface element of the second accessible-response type, perform an operation in accordance with a set of one or more sighted-mode gesture responses for the user interface element of the second accessible-response type (e.g., with performing unit 910). Processing unit 906 is configured to, while the electronic device is operating in a first accessible mode: detect a third interaction with the user interface element of the first accessible-response type (e.g., with detecting unit 908); in response to detecting the third interaction with the user interface element of the first accessible-response type, perform an operation in accordance with a set of one or more first-accessible-mode gesture responses for the user interface element of the first accessible-response type (e.g., with performing unit 910); detect a series of interactions with the user interface element of the second accessible-response type (e.g., with detecting unit 908); and, in response to detecting each interaction in the series of interactions with the user interface element of the second accessible-response type, perform an operation in accordance with the set of one or more sighted-mode gesture responses for the user interface element of the second accessible-response type (e.g., with performing unit 910).

In some embodiments, processing unit 906 is configured to, prior to detecting the series of interactions with the user interface element of the second accessible-response type, detect an initial interaction while in the first accessible mode with the user interface element of the second accessible-response type (e.g., with detecting unit 908); and, in response to detecting the initial interaction while in the first accessible mode with the user interface element of the second accessible-response type, output audible accessibility information associated with the user interface element of the second accessible-response type (e.g., with outputting unit 912 and output unit 902).

In some embodiments, the audible accessibility information associated with the user interface element of the second accessible-response type is audible accessibility information about the user interface element of the second accessible-response type itself.

In some embodiments, the audible accessibility information associated with the user interface element of the second accessible-response type is audible accessibility information about a group of user interface elements of the second accessible-response type that includes the user interface element of the second accessible-response type.

In some embodiments, processing unit 906 is configured to, while the electronic device is operating in a second accessible mode distinct from the first accessible mode: detect a fourth interaction with the user interface element of the first accessible-response type (e.g., with detecting unit 908); in response to detecting the fourth interaction with the user interface element of the first accessible-response type, perform an operation in accordance with a set of one or more second-accessible-mode gesture responses for the user interface element of the first accessible-response type (e.g., with performing unit 910); detect a fifth interaction with the user interface element of the second accessible-response type (e.g., with detecting unit 908); and in response to detecting the fifth interaction with the user interface element of the second accessible-response type, perform an operation in accordance with a set of one or more second-accessible-mode gesture responses for the user interface element of the second accessible-response type (e.g., with performing unit 910).

In some embodiments, the set of one or more second-accessible-mode gesture responses for the user interface element of the first accessible-response type is the same as the set of one or more first-accessible-mode gesture responses for the user interface element of the first accessible-response type.

In some embodiments, processing unit 906 is configured to: while the electronic device is operating in the first accessible mode, detect an input (e.g., with detecting unit 908); and, in response to detecting the input, change from the first accessible mode to a second accessible mode distinct from the first accessible mode (e.g., with changing unit 914).

Figure 10:
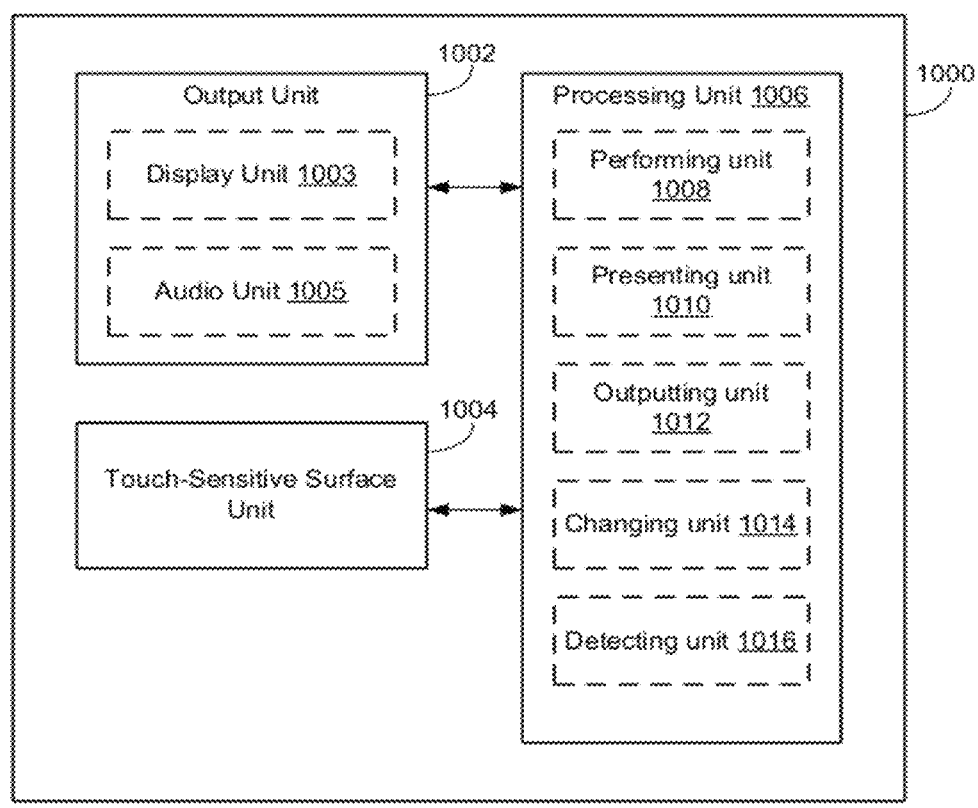
FIG. 10 is a functional block diagram of an electronic device in accordance with some embodiments.

In accordance with some embodiments, FIG. 10 shows a functional block diagram of electronic device 1000 configured in accordance with the principles of the invention as described above. The functional blocks of the device may be implemented by hardware, software, or a combination of hardware and software to carry out the principles of the invention. It is understood by persons of skill in the art that the functional blocks described in FIG. 1000 may be combined or separated into sub-blocks to implement the principles of the invention as described above. Therefore, the description herein may support any possible combination or separation or further definition of the functional blocks described herein.

As shown in FIG. 10, electronic device 1000 includes output unit 1002 configured to present in an application one or more user interface elements of a first accessible-response type and one or more user interface elements of a second accessible-response type distinct from the first accessible-response type; touch-sensitive surface unit 1004 configured to receive user interaction with user interface elements; and processing unit 1006 coupled to output unit 1002 and touch-sensitive surface unit 1004. In some embodiments, output unit 1002 includes display unit 1003 and/or audio unit 1005. In some embodiments, processing unit 1006 includes performing unit 1008, presenting unit 1010, outputting unit 1012, changing unit 1014, and detecting unit 1016.

Processing unit 1006 is configured to, for a respective user interface element of the first accessible-response type: when the electronic device is operating in a sighted mode, respond to detected interactions with the respective user interface element of the first accessible-response type (e.g., detected with detecting unit 1016) by performing operations in accordance with a respective set of one or more sighted-mode gesture responses for the respective user interface element of the first accessible-response type (e.g., with performing unit 1008), and when the electronic device is operating in a first accessible mode, respond to detected interactions with the respective user interface element of the first accessible-response type (e.g., detected with detecting unit 1016) by performing operations in accordance with a respective set of one or more first-accessible-mode gesture responses for the respective user interface element of the first accessible-response type (e.g., with performing unit 1008). Processing unit 1006 is configured to, for a respective user interface element of the second accessible-response type: when the electronic device is operating in the sighted mode, respond to detected interactions with the respective user interface element of the second accessible-response type (e.g., detected with detecting unit 1016) by performing operations in accordance with a respective set of one or more sighted-mode gesture responses for the respective user interface element of the second accessible-response type (e.g., with performing unit 1008), and when the electronic device is operating in the first accessible mode, respond to each interaction in a series of detected interactions with the respective user interface element of the second accessible-response type (e.g., detected with detecting unit 1016) by performing operations in accordance with the respective set of one or more sighted-mode gesture responses for the respective user interface element of the second accessible-response type (e.g., with performing unit 1008).

In some embodiments, the presenting includes: presenting audible accessibility information in accordance with the respective set of one or more first-accessible-mode gesture responses for the respective user interface element of the first accessible-response type (e.g., with presenting unit 1010); and presenting standard audible information in accordance with at least one of the one or more respective sighted-mode gesture responses for the respective user interface element of the second accessible-response type (e.g., with presenting unit 1010).

In some embodiments, processing unit 1006 is configured to, for the respective user interface element of the second accessible-response type: when the electronic device is operating in the first accessible mode, prior to detecting the series of interactions with the respective user interface element of the second accessible-response type, respond to detecting an initial interaction while in the first accessible mode with the respective user interface element of the second accessible-response type (e.g., detected with detecting unit 1016) by outputting audible accessibility information associated with the respective user interface element of the second accessible-response type (e.g., with outputting unit 1012 and output unit 1002).

In some embodiments, the audible accessibility information associated with the respective user interface element of the second accessible-response type is audible accessibility information about the respective user interface element of the second accessible-response type itself.

In some embodiments, the audible accessibility information associated with the respective user interface element of the second accessible-response type is audible accessibility information about a group of user interface elements of the second accessible-response type that includes the respective user interface element of the second accessible-response type.

In some embodiments, processing unit 1006 is configured to, for the respective user interface element of the first accessible-response type: when the electronic device is operating in a second accessible mode distinct from the first accessible mode, respond to detected interactions with the respective user interface element of the first accessible-response type (e.g., detected with detecting unit 1016) by performing operations in accordance with a respective set of one or more second-accessible-mode gesture responses for the respective user interface element of the first accessible-response type (e.g., with performing unit 1008). Processing unit 1006 is configured to, for the respective user interface element of the second accessible-response type: when the electronic device is operating in the second accessible mode, respond to detected interactions with the respective user interface element of the second accessible-response type (e.g., detected with detecting unit 1016) by performing operations in accordance with a respective set of one or more second-accessible-mode gesture responses for the respective user interface element of the second accessible-response type (e.g., with performing unit 1008).

In some embodiments, the respective set of one or more second-accessible-mode gesture responses for the user interface element of the first accessible-response type is the same as the respective set of one or more first-accessible-mode gesture responses for the user interface element of the first accessible-response type.

In some embodiments, processing unit 1006 is configured to, while the electronic device is operating in the first accessible mode, detect an input (e.g., detected with detecting unit 1016); and, in response to detecting the input, change from the first accessible mode to a second accessible mode distinct from the first accessible mode (e.g., with changing unit 1014).

Figure 11:
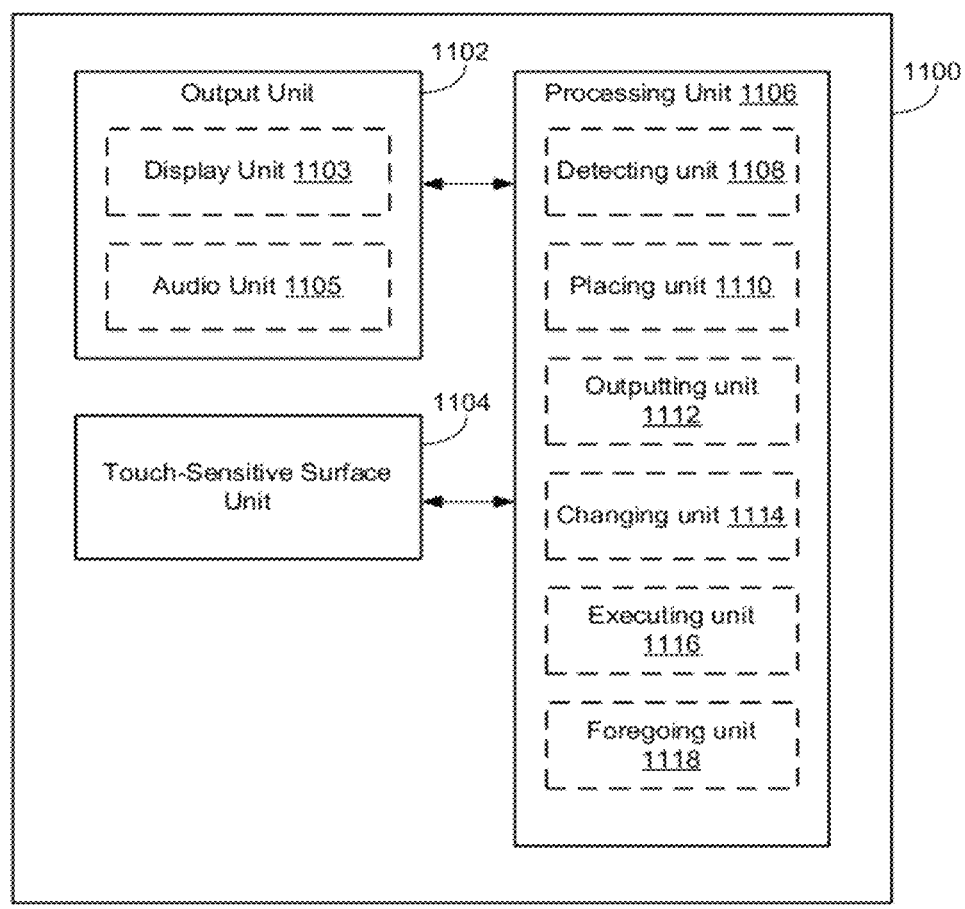
FIG. 11 is a functional block diagram of an electronic device in accordance with some embodiments.

In accordance with some embodiments, FIG. 11 shows a functional block diagram of electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 1100 may be combined or separated into sub-blocks to implement the principles of the invention as described above. Therefore, the description herein may support any possible combination or separation or further definition of the functional blocks described herein.

As shown in FIG. 11, electronic device 1100 includes output unit 1102 configured to present in an application one or more user interface elements of a first accessible-response type and one or more user interface elements of a second accessible-response type distinct from the first accessible-response type; touch-sensitive surface unit 1104 configured to receive user interaction with user interface elements; and processing unit 1106 coupled to output unit 1102 and touch-sensitive surface unit 1104. In some embodiments, output unit 1102 includes display unit 1103 and/or audio unit 1105. In some embodiments, processing unit 1106 includes detecting unit 1108, placing unit 1110, outputting unit 1112, changing unit 1114, executing unit 1116, and foregoing unit 1118.

Processing unit 1106 is configured to: detect a first finger input (e.g., with detecting unit 1108) on the touch-sensitive surface 1104; and, in response to detecting the first finger input: place a current focus on a user interface element of a first accessible-response type, and output audible accessibility information associated with the user interface element of a first accessible-response type (e.g., with outputting unit 1112 and output unit 1102). Processing unit 1106 is configured to: detect a second finger input (e.g., with detecting unit 1108) on the touch-sensitive surface unit 1104; and, in response to detecting the second finger input: change the current focus from the user interface element of a first accessible-response type to a set of one or more user interface elements of a second accessible-response type distinct from the first accessible-response type (e.g., with changing unit 1114), and output audible accessibility information associated with the set of one or more user interface elements of the second accessible-response type (e.g., with outputting unit 1112 and output unit 1102). Processing unit 1106 is configured to: after outputting the audible accessibility information associated with the set of one or more user interface elements of the second accessible-response type, detect a series of finger inputs on the touch-sensitive surface 1104 (e.g., with detecting unit 1108); and, in response to detecting the series of finger inputs, when the application is in a first accessibility mode: execute a corresponding series of actions associated with the set of one or more user interface elements of the second accessible-response type (e.g., with executing unit 1116), and forego outputting audible accessibility information associated with the set of one or more user interface elements of the second accessible-response type (e.g., with foregoing unit 1118). Processing unit 1106 is configured to, when the application is in a second accessibility mode distinct from the first accessibility mode: execute a corresponding series of actions associated with the set of one or more user interface elements of the second accessible-response type (e.g., with executing unit 1116), and output audible accessibility information associated with the set of one or more user interface elements of the second accessible-response type (e.g., with outputting unit 1112 and output unit 1102).

In some embodiments, the corresponding series of actions associated with the set of one or more user interface elements of the second accessible-response type in the first accessibility mode is distinct from the corresponding series of actions associated with the set of one or more user interface elements of the second accessible-response type in the second accessibility mode.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of the claims.

The operations described above with reference to FIGS. 6A-6C, 7A-7C, and 8A-8B may be implemented by components depicted in FIGS. 1A-1B and 3. For example, detection operation 604, performing operation 606, and changing operation 626 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 3.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
   presenting in an application one or more user interface elements of a first accessible-response type and one or more user interface elements of a second accessible-response type distinct from the first accessible-response type;
   while the electronic device is operating in a sighted mode:
      detecting a first interaction with a user interface element of the first accessible-response type;
      in response to detecting the first interaction with the user interface element of the first accessible-response type, performing an operation in accordance with a set of one or more sighted-mode gesture responses for the user interface element of the first accessible-response type;
      detecting a second interaction with a user interface element of the second accessible-response type; and,
      in response to detecting the second interaction with the user interface element of the second accessible-response type, performing an operation in accordance with a set of one or more sighted-mode gesture responses for the user interface element of the second accessible-response type; and,
   while the electronic device is operating in a first accessible mode:
      detecting a third interaction with the user interface element of the first accessible-response type;
      in response to detecting the third interaction with the user interface element of the first accessible-response type, performing an operation in accordance with a set of one or more first-accessible-mode gesture responses for the user interface element of the first accessible-response type;
      detecting a series of interactions with the user interface element of the second accessible-response type; and,
      in response to detecting each interaction in the series of interactions with the user interface element of the second accessible-response type, performing an operation in accordance with the set of one or more sighted-mode gesture responses for the user interface element of the second accessible-response type.

2. The device of claim 1, including instructions for:
prior to detecting the series of interactions with the user interface element of the second accessible-response type, detecting an initial interaction while in the first accessible mode with the user interface element of the second accessible-response type; and
in response to detecting the initial interaction while in the first accessible mode with the user interface element of the second accessible-response type, outputting audible accessibility information associated with the user interface element of the second accessible-response type.

3. The device of claim 1, including instructions for:
while the electronic device is operating in a second accessible mode distinct from the first accessible mode:
detecting a fourth interaction with the user interface element of the first accessible-response type;
in response to detecting the fourth interaction with the user interface element of the first accessible-response type, performing an operation in accordance with a set of one or more second-accessible-mode gesture responses for the user interface element of the first accessible-response type;
detecting a fifth interaction with the user interface element of the second accessible-response type; and
in response to detecting the fifth interaction with the user interface element of the second accessible-response type, performing an operation in accordance with a set of one or more second-accessible-mode gesture responses for the user interface element of the second accessible-response type.

4. The device of claim 1, including instructions for:
while the electronic device is operating in the first accessible mode, detecting an input; and,
in response to detecting the input, changing from the first accessible mode to a second accessible mode distinct from the first accessible mode.

5. A method, comprising:
at an electronic device with a display and a touch-sensitive surface:
presenting in an application one or more user interface elements of a first accessible-response type and one or more user interface elements of a second accessible-response type distinct from the first accessible-response type;
while the electronic device is operating in a sighted mode:
detecting a first interaction with a user interface element of the first accessible-response type;
in response to detecting the first interaction with the user interface element of the first accessible-response type, performing an operation in accordance with a set of one or more sighted-mode gesture responses for the user interface element of the first accessible-response type;
detecting a second interaction with a user interface element of the second accessible-response type; and,
in response to detecting the second interaction with the user interface element of the second accessible-response type, performing an operation in accordance with a set of one or more sighted-mode gesture responses for the user interface element of the second accessible-response type; and,
while the electronic device is operating in a first accessible mode:
detecting a third interaction with the user interface element of the first accessible-response type;
in response to detecting the third interaction with the user interface element of the first accessible-response type, performing an operation in accordance with a set of one or more first-accessible-mode gesture responses for the user interface element of the first accessible-response type;
detecting a series of interactions with the user interface element of the second accessible-response type; and,
in response to detecting each interaction in the series of interactions with the user interface element of the second accessible-response type, performing an operation in accordance with the set of one or more sighted-mode gesture responses for the user interface element of the second accessible-response type.

6. The method of claim 5, further comprising:
prior to detecting the series of interactions with the user interface element of the second accessible-response type, detecting an initial interaction while in the first accessible mode with the user interface element of the second accessible-response type; and,
in response to detecting the initial interaction while in the first accessible mode with the user interface element of the second accessible-response type, outputting audible accessibility information associated with the user interface element of the second accessible-response type.

7. The method of claim 5, further comprising:
while the electronic device is operating in a second accessible mode distinct from the first accessible mode:
detecting a fourth interaction with the user interface element of the first accessible-response type;
in response to detecting the fourth interaction with the user interface element of the first accessible-response type, performing an operation in accordance with a set of one or more second-accessible-mode gesture responses for the user interface element of the first accessible-response type;
detecting a fifth interaction with the user interface element of the second accessible-response type; and,
in response to detecting the fifth interaction with the user interface element of the second accessible-response type, performing an operation in accordance with a set of one or more second-accessible-mode gesture responses for the user interface element of the second accessible-response type.

8. The method of claim 5, further comprising:
while the electronic device is operating in the first accessible mode, detecting an input; and,
in response to detecting the input, changing from the first accessible mode to a second accessible mode distinct from the first accessible mode.

9. A non-transitory computer readable storage medium storing one or more programs, the one or more programs comprising instructions, which when executed by an electronic device with a display and a touch-sensitive surface, cause the device to:
present in an application one or more user interface elements of a first accessible-response type and one or more user interface elements of a second accessible-response type distinct from the first accessible-response type;
while the electronic device is operating in a sighted mode:
detect a first interaction with a user interface element of the first accessible-response type;
in response to detecting the first interaction with the user interface element of the first accessible-response type, perform an operation in accordance with a set of one or more sighted-mode gesture responses for the user interface element of the first accessible-response type;

detect a second interaction with a user interface element of the second accessible-response type; and, in response to detecting the second interaction with the user interface element of the second accessible-response type, perform an operation in accordance with a set of one or more sighted-mode gesture responses for the user interface element of the second accessible-response type; and, while the electronic device is operating in a first accessible mode:

detect a third interaction with the user interface element of the first accessible-response type;

in response to detecting the third interaction with the user interface element of the first accessible-response type, perform an operation in accordance with a set of one or more first-accessible-mode gesture responses for the user interface element of the first accessible-response type;

detect a series of interactions with the user interface element of the second accessible-response type; and, in response to detecting each interaction in the series of interactions with the user interface element of the second accessible-response type, perform an operation in accordance with the set of one or more sighted-mode gesture responses for the user interface element of the second accessible-response type.

10. The computer readable storage medium of claim 9, wherein the instructions further cause the device to:

prior to detecting the series of interactions with the user interface element of the second accessible-response type, detect an initial interaction while in the first accessible mode with the user interface element of the second accessible-response type; and, in response to detecting the initial interaction while in the first accessible mode with the user interface element of the second accessible-response type, output audible accessibility information associated with the user interface element of the second accessible-response type.

11. The computer readable storage medium of claim 9, wherein the instructions further cause the device to:

while the electronic device is operating in a second accessible mode distinct from the first accessible mode:

detect a fourth interaction with the user interface element of the first accessible-response type;

in response to detecting the fourth interaction with the user interface element of the first accessible-response type, perform an operation in accordance with a set of one or more second-accessible-mode gesture responses for the user interface element of the first accessible-response type;

detect a fifth interaction with the user interface element of the second accessible-response type; and, in response to detecting the fifth interaction with the user interface element of the second accessible-response type, perform an operation in accordance with a set of one or more second-accessible-mode gesture responses for the user interface element of the second accessible-response type.

12. The computer readable storage medium of claim 9, wherein the instructions further cause the device to:

while the electronic device is operating in the first accessible mode, detect an input; and, in response to detecting the input, change from the first accessible mode to a second accessible mode distinct from the first accessible mode.

13. An electronic device, comprising:
a display;
a touch-sensitive surface;
one or more processors;
memory; and
one or more programs, wherein the one or more programs are stored in the memory and configured to be executed by the one or more processors, the one or more programs including instructions for:

presenting in an application one or more user interface elements of a first accessible-response type and one or more user interface elements of a second accessible-response type distinct from the first accessible-response type, wherein:

for a respective user interface element of the first accessible-response type:

when the electronic device is operating in a sighted mode, responding to detected interactions with the respective user interface element of the first accessible-response type by performing operations in accordance with a respective set of one or more sighted-mode gesture responses for the respective user interface element of the first accessible-response type, and when the electronic device is operating in a first accessible mode, responding to detected interactions with the respective user interface element of the first accessible-response type by performing operations in accordance with a respective set of one or more first-accessible-mode gesture responses for the respective user interface element of the first accessible-response type; and, for a respective user interface element of the second accessible-response type:

when the electronic device is operating in the sighted mode, responding to detected interactions with the respective user interface element of the second accessible-response type by performing operations in accordance with a respective set of one or more sighted-mode gesture responses for the respective user interface element of the second accessible-response type, and when the electronic device is operating in the first accessible mode, responding to each interaction in a series of detected interactions with the respective user interface element of the second accessible-response type by performing operations in accordance with the respective set of one or more sighted-mode gesture responses for the respective user interface element of the second accessible-response type.

14. The device of claim 13, wherein the presenting includes:

presenting audible accessibility information in accordance with the respective set of one or more first-accessible-mode gesture responses for the respective user interface element of the first accessible-response type; and presenting standard audible information in accordance with at least one of the one or more respective sighted-mode gesture responses for the respective user interface element of the second accessible-response type.

15. The device of claim 13, including instructions for:
for the respective user interface element of the second accessible-response type:

when the electronic device is operating in the first accessible mode, prior to detecting the series of interactions with the respective user interface element of the second accessible-response type, responding to detecting an initial interaction while in the first accessible mode with the respective user interface element of the second accessible-response type by outputting audible accessibility information associated with the respective user interface element of the second accessible-response type.

16. The device of claim 13, including instructions for:
for the respective user interface element of the first accessible-response type:
   when the electronic device is operating in a second accessible mode distinct from the first accessible mode, responding to detected interactions with the respective user interface element of the first accessible-response type by performing operations in accordance with a respective set of one or more second-accessible-mode gesture responses for the respective user interface element of the first accessible-response type; and,
for the respective user interface element of the second accessible-response type:
   when the electronic device is operating in the second accessible mode, responding to detected interactions with the respective user interface element of the second accessible-response type in accordance with a respective set of one or more second-accessible-mode gesture responses for the respective user interface element of the second accessible-response type.

17. The device of claim 13, including instructions for:
while the electronic device is operating in the first accessible mode, detecting an input; and,
in response to detecting the input, changing from the first accessible mode to a second accessible mode distinct from the first accessible mode.

18. A method, comprising:
at an electronic device with a display and a touch-sensitive surface:
   presenting in an application one or more user interface elements of a first accessible-response type and one or more user interface elements of a second accessible-response type distinct from the first accessible-response type, wherein:
      for a respective user interface element of the first accessible-response type:
         when the electronic device is operating in a sighted mode, responding to detected interactions with the respective user interface element of the first accessible-response type by performing operations in accordance with a respective set of one or more sighted-mode gesture responses for the respective user interface element of the first accessible-response type, and
         when the electronic device is operating in a first accessible mode, responding to detected interactions with the respective user interface element of the first accessible-response type by performing operations in accordance with a respective set of one or more first-accessible-mode gesture responses for the respective user interface element of the first accessible-response type; and,
      for a respective user interface element of the second accessible-response type:
         when the electronic device is operating in the sighted mode, responding to detected interactions with the respective user interface element of the second accessible-response type by performing operations in accordance with a respective set of one or more sighted-mode gesture responses for the respective user interface element of the second accessible-response type, and
         when the electronic device is operating in the first accessible mode, responding to each interaction in a series of detected interactions with the respective user interface element of the second accessible-response type by performing operations in accordance with the respective set of one or more sighted-mode gesture responses for the respective user interface element of the second accessible-response type.

19. The method of claim 18, wherein the presenting includes:
presenting audible accessibility information in accordance with the respective set of one or more first-accessible-mode gesture responses for the respective user interface element of the first accessible-response type; and
presenting standard audible information in accordance with at least one of the one or more respective sighted-mode gesture responses for the respective user interface element of the second accessible-response type.

20. The method of claim 18, further comprising:
for the respective user interface element of the second accessible-response type:
   when the electronic device is operating in the first accessible mode, prior to detecting the series of interactions with the respective user interface element of the second accessible-response type, responding to detecting an initial interaction while in the first accessible mode with the respective user interface element of the second accessible-response type by outputting audible accessibility information associated with the respective user interface element of the second accessible-response type.

21. The method of claim 18, further comprising:
for the respective user interface element of the first accessible-response type:
   when the electronic device is operating in a second accessible mode distinct from the first accessible mode, responding to detected interactions with the respective user interface element of the first accessible-response type by performing operations in accordance with a respective set of one or more second-accessible-mode gesture responses for the respective user interface element of the first accessible-response type; and,
for the respective user interface element of the second accessible-response type:
   when the electronic device is operating in the second accessible mode, responding to detected interactions with the respective user interface element of the second accessible-response type in accordance with a respective set of one or more second-accessible-mode gesture responses for the respective user interface element of the second accessible-response type.

22. The method of claim 18, further comprising:
while the electronic device is operating in the first accessible mode, detecting an input; and,
in response to detecting the input, changing from the first accessible mode to a second accessible mode distinct from the first accessible mode.

23. A non-transitory computer readable storage medium storing one or more programs, the one or more programs comprising instructions, which when executed by an electronic device with a display and a touch-sensitive surface, cause the device to:
present in an application one or more user interface elements of a first accessible-response type and one or more user interface elements of a second accessible-response type distinct from the first accessible-response type, wherein:
for a respective user interface element of the first accessible-response type:
when the electronic device is operating in a sighted mode, the device responds to detected interactions with the respective user interface element of the first accessible-response type by performing operations in accordance with a respective set of one or more sighted-mode gesture responses for the respective user interface element of the first accessible-response type, and
when the electronic device is operating in a first accessible mode, the device responds to detected interactions with the respective user interface element of the first accessible-response type by performing operations in accordance with a respective set of one or more first-accessible-mode gesture responses for the respective user interface element of the first accessible-response type; and,
for a respective user interface element of the second accessible-response type:
when the electronic device is operating in the sighted mode, the device responds to detected interactions with the respective user interface element of the second accessible-response type by performing operations in accordance with a respective set of one or more sighted-mode gesture responses for the respective user interface element of the second accessible-response type, and
when the electronic device is operating in the first accessible mode, the device responds to each interaction in a series of detected interactions with the respective user interface element of the second accessible-response type by performing operations in accordance with the respective set of one or more sighted-mode gesture responses for the respective user interface element of the second accessible-response type.

24. The computer readable storage medium of claim 23, wherein the instructions further cause the device to:
present audible accessibility information in accordance with the respective set of one or more first-accessible-mode gesture responses for the respective user interface element of the first accessible-response type; and
present standard audible information in accordance with at least one of the one or more respective sighted-mode gesture responses for the respective user interface element of the second accessible-response type.

25. The computer readable storage medium of claim 23, wherein the instructions further cause the device to:
for the respective user interface element of the second accessible-response type:
when the electronic device is operating in the first accessible mode, prior to detecting the series of interactions with the respective user interface element of the second accessible-response type, respond to detecting an initial interaction while in the first accessible mode with the respective user interface element of the second accessible-response type by outputting audible accessibility information associated with the respective user interface element of the second accessible-response type.

26. The computer readable storage medium of claim 23, wherein the instructions further cause the device to:
for the respective user interface element of the first accessible-response type:
when the electronic device is operating in a second accessible mode distinct from the first accessible mode, respond to detected interactions with the respective user interface element of the first accessible-response type by performing operations in accordance with a respective set of one or more second-accessible-mode gesture responses for the respective user interface element of the first accessible-response type; and,
for the respective user interface element of the second accessible-response type:
when the electronic device is operating in the second accessible mode, respond to detected interactions with the respective user interface element of the second accessible-response type in accordance with a respective set of one or more second-accessible-mode gesture responses for the respective user interface element of the second accessible-response type.

27. The computer readable storage medium of claim 23, wherein the instructions further cause the device to:
while the electronic device is operating in the first accessible mode, detect an input; and,
in response to detecting the input, change from the first accessible mode to a second accessible mode distinct from the first accessible mode.

28. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
presenting in an application one or more user interface elements of a first accessible-response type and one or more user interface elements of a second accessible-response type distinct from the first accessible-response type;
detecting a first finger input on the touch-sensitive surface;
in response to detecting the first finger input:
placing a current focus on a user interface element of a first accessible-response type, and
outputting audible accessibility information associated with the user interface element of a first accessible-response type;
detecting a second finger input on the touch-sensitive surface;
in response to detecting the second finger input:
changing the current focus from the user interface element of a first accessible-response type to a set of one or more user interface elements of a second accessible-response type distinct from the first accessible-response type, and
outputting audible accessibility information associated with the set of one or more user interface elements of the second accessible-response type;
after outputting the audible accessibility information associated with the set of one or more user interface elements of the second accessible-response type, detecting a series of finger inputs on the touch-sensitive surface; and, in response to detecting the series of finger inputs:
   when the application is in a first accessibility mode:
      executing a corresponding series of actions associated with the set of one or more user interface elements of the second accessible-response type, and
      foregoing outputting audible accessibility information associated with the set of one or more user interface elements of the second accessible-response type; and
   when the application is in a second accessibility mode distinct from the first accessibility mode:
      executing a corresponding series of actions associated with the set of one or more user interface elements of the second accessible-response type, and
      outputting audible accessibility information associated with the set of one or more user interface elements of the second accessible-response type.

29. The device of claim 28, wherein the corresponding series of actions associated with the set of one or more user interface elements of the second accessible-response type in the first accessibility mode is distinct from the corresponding series of actions associated with the set of one or more user interface elements of the second accessible-response type in the second accessibility mode.

30. A method, comprising:
   at an electronic device with a display and a touch-sensitive surface:
      presenting in an application one or more user interface elements of a first accessible-response type and one or more user interface elements of a second accessible-response type distinct from the first accessible-response type;
      detecting a first finger input on the touch-sensitive surface;
      in response to detecting the first finger input:
         placing a current focus on a user interface element of a first accessible-response type, and
         outputting audible accessibility information associated with the user interface element of a first accessible-response type;
      detecting a second finger input on the touch-sensitive surface;
      in response to detecting the second finger input:
         changing the current focus from the user interface element of a first accessible-response type to a set of one or more user interface elements of a second accessible-response type distinct from the first accessible-response type, and
         outputting audible accessibility information associated with the set of one or more user interface elements of the second accessible-response type;
      after outputting the audible accessibility information associated with the set of one or more user interface elements of the second accessible-response type, detecting a series of finger inputs on the touch-sensitive surface; and,
      in response to detecting the series of finger inputs:
         when the application is in a first accessibility mode:
            executing a corresponding series of actions associated with the set of one or more user interface elements of the second accessible-response type, and
            foregoing outputting audible accessibility information associated with the set of one or more user interface elements of the second accessible-response type; and
         when the application is in a second accessibility mode distinct from the first accessibility mode:
            executing a corresponding series of actions associated with the set of one or more user interface elements of the second accessible-response type, and
            outputting audible accessibility information associated with the set of one or more user interface elements of the second accessible-response type.

31. The method of claim 30, wherein the corresponding series of actions associated with the set of one or more user interface elements of the second accessible-response type in the first accessibility mode is distinct from the corresponding series of actions associated with the set of one or more user interface elements of the second accessible-response type in the second accessibility mode.

32. A non-transitory computer readable storage medium storing one or more programs, the one or more programs comprising instructions, which when executed by an electronic device with a display and a touch-sensitive surface, cause the device to:
   present in an application one or more user interface elements of a first accessible-response type and one or more user interface elements of a second accessible-response type distinct from the first accessible-response type;
   detect a first finger input on the touch-sensitive surface;
   in response to detecting the first finger input:
      place a current focus on a user interface element of a first accessible-response type, and
      output audible accessibility information associated with the user interface element of a first accessible-response type;
   detect a second finger input on the touch-sensitive surface;
   in response to detecting the second finger input:
      change the current focus from the user interface element of a first accessible-response type to a set of one or more user interface elements of a second accessible-response type distinct from the first accessible-response type, and
      output audible accessibility information associated with the set of one or more user interface elements of the second accessible-response type;
   after outputting the audible accessibility information associated with the set of one or more user interface elements of the second accessible-response type, detect a series of finger inputs on the touch-sensitive surface; and,
   in response to detecting the series of finger inputs:
      when the application is in a first accessibility mode:
         execute a corresponding series of actions associated with the set of one or more user interface elements of the second accessible-response type, and
         forego outputting audible accessibility information associated with the set of one or more user interface elements of the second accessible-response type; and
      when the application is in a second accessibility mode distinct from the first accessibility mode:
         execute a corresponding series of actions associated with the set of one or more user interface elements of the second accessible-response type, and
         output audible accessibility information associated with the set of one or more user interface elements of the second accessible-response type.

33. The computer readable storage medium of claim 32, wherein the corresponding series of actions associated with the set of one or more user interface elements of the second accessible-response type in the first accessibility mode is distinct from the corresponding series of actions associated with the set of one or more user interface elements of the second accessible-response type in the second accessibility mode.

\* \* \* \* \*